US011618584B2

(12) United States Patent
Bosma

(10) Patent No.: US 11,618,584 B2
(45) Date of Patent: Apr. 4, 2023

(54) HELICOPTER WINCH CABLE STABILIZER

(71) Applicant: Modern Technology Solutions, Inc., Alexandria, VA (US)

(72) Inventor: Marinus Bernard Bosma, Tipp City, OH (US)

(73) Assignee: Modern Technology Solutions, Inc., Alexandria, VA (US)

( * ) Notice: Subject to any disclaimer, the term of this patent is extended or adjusted under 35 U.S.C. 154(b) by 291 days.

(21) Appl. No.: 17/093,061

(22) Filed: Nov. 9, 2020

(65) Prior Publication Data

US 2021/0253265 A1   Aug. 19, 2021

Related U.S. Application Data

(60) Division of application No. 16/877,458, filed on May 18, 2020, which is a continuation of application No. (Continued)

(51) Int. Cl.
| *B64D 39/06* | (2006.01) |
| *B67D 7/04* | (2010.01) |
| *B67D 7/40* | (2010.01) |
| *B64C 39/02* | (2023.01) |
| *B64D 5/00* | (2006.01) |
| *B64D 1/06* | (2006.01) |
| *B64D 1/22* | (2006.01) |
| *B64D 1/16* | (2006.01) |
| *B64U 30/10* | (2023.01) |

(Continued)

(52) U.S. Cl.
CPC .......... *B64D 39/06* (2013.01); *B64C 39/024* (2013.01); *B64D 1/06* (2013.01); *B64D 1/16* (2013.01); *B64D 1/22* (2013.01); *B64D 5/00* (2013.01); *B67D 7/04* (2013.01); *B67D 7/40* (2013.01); *B64U 30/10* (2023.01); *B64U 50/12* (2023.01); *B64U 50/34* (2023.01); *B64U 80/82* (2023.01)

(58) Field of Classification Search
CPC ... B64D 1/22; B64D 3/00; B64D 5/00; B64D 25/06

See application file for complete search history.

(56) References Cited

U.S. PATENT DOCUMENTS 5,722,618 A * 3/1998 Jacobs ................. G05D 1/101
244/137.1
9,800,091 B2 * 10/2017 Nugent, Jr. ........... B64C 39/024
(Continued)

FOREIGN PATENT DOCUMENTS

DE    102005006936 A1 *  8/2006  ............. A62B 99/00

*Primary Examiner* — Philip J Bonzell
*Assistant Examiner* — Michael B. Kreiner
(74) *Attorney, Agent, or Firm* — Cynthia S. Lamon; Lamon Patent Sendees

(57) ABSTRACT

A stabilizing system for a winch cable has a winch cable deployed and suspended from a helicopter, a cargo support attached at a deployed end of the winch cable, an end effector attached to the winch cable, the end effector comprising thrusters directed in a plurality of directions orthogonal to a vertical axis of the winch cable, first control circuitry in the helicopter, and second control circuitry in the end effector. Thrust of individual thrusters is controlled through the first and second control circuitry maintaining the axis of the winch cable vertical, damping swinging of the cable.

20 Claims, 46 Drawing Sheets

Related U.S. Application Data

PCT/US2019/030273, filed on May 1, 2019, said application No. 16/877,458 is a continuation-in-part of application No. 15/681,336, filed on Aug. 18, 2017, now Pat. No. 10,654,584.

(60) Provisional application No. 62/665,905, filed on May 2, 2018, provisional application No. 62/377,555, filed on Aug. 20, 2016.

(51) Int. Cl.
*B64U 50/12* (2023.01)
*B64U 50/34* (2023.01)
*B64U 80/82* (2023.01)

(56) References Cited

U.S. PATENT DOCUMENTS

| | | | |
|---|---|---|---|
| 9,849,981 B1* | 12/2017 | Burgess | B64D 1/22 |
| 10,479,503 B2* | 11/2019 | Sikora | B64C 17/00 |
| 10,589,853 B2* | 3/2020 | Lee | B64C 39/024 |
| 10,870,558 B2* | 12/2020 | Sikora | A61G 3/006 |
| 11,154,440 B2* | 10/2021 | Tyler | A61G 3/001 |
| 2017/0341725 A1* | 11/2017 | Skahan | B64C 27/20 |
| 2020/0271270 A1* | 8/2020 | Sikora | F16M 13/005 |
| 2021/0053684 A1* | 2/2021 | Dürr | B64C 39/024 |

* cited by examiner

HELICOPTER WINCH CABLE STABILIZER

CROSS-REFERENCE TO RELATED APPLICATIONS

The present application is a Divisional of U.S. Pat. No. 16,877,458, filed May 18, 2020, which is a Continuation-in-Part of U.S. patent application Ser. No. 15/681,336, filed Aug. 18, 2017, now issued as U.S. patent Ser. No. 10/654,584, and which claims the benefit of U.S. provisional patent application No. 62/377,555 filed on Aug. 20, 2016. U.S. Pat. No. 16,877,458, filed May 18, 2020, is also a Continuation-in-Part of International patent application no. PCT/US2019/30273, filed May 1, 2019, which claims the benefit of U.S. provisional application 62/665,905, filed May 2, 2018. All disclosure of the parent applications is incorporated herein at least by reference.

BACKGROUND OF THE INVENTION

1. Field of the Invention

The present invention is in the technical field of refueling aircraft in flight and pertains more particularly to a system with operation transparent to the receiver of fuel. The present invention is also in the technical field of implementing control effectors with tethers to perform many tasks inaccessible by current methods and apparatus.

2. Description of Related Art

Refueling aircraft in flight is a well-known process, and there are many examples of systems and equipment in the art provided to accomplish refueling of aircraft. In the systems extant at the time of filing this patent application, to the inventor's knowledge, all such systems require automated or user-directed cooperation of an aircraft being refueled to accomplish the process. For example, in many such systems, a tanker aircraft positions proximate an aircraft to be refueled and trails a hose for transferring fuel. Typically, the hose is dry, meaning that there is no fuel in the hose at the time of seeking connection of the hose to a receiver at the aircraft to be refueled. Personnel on board the receiving aircraft are then responsible for maneuvering the receiving aircraft into a position that the fueling hose may be captured and connected to receiving equipment. There are many problems associated with this prior art process, not the least of which is, that the receiving aircraft must be diverted from whatever mission it may be conducting to accomplish the refueling process, and then must redirect back to the mission at hand.

Additionally, helicopter based refueling of other aquatic and satellite vehicles struggle because of the unmanned nature and instability of the vehicle, or inaccessibility of the vehicle. There are numerous instances in the art that may be improved with the use of a tether and effector for control. Human rescue in difficult circumstances where the location of the person is not accessible to rescue apparatus and method know in the art, for example rope, basket and helicopter. Fire fighting in forested areas and in buildings of substantial structure are extremely challenged because fire retardant dispenses by air cannot get close enough because of heat and smoke and firefighter also struggle getting needed fire retardant to upper floors of tall buildings. Rescuing individuals in tall buildings having numerous floors is also a particularly difficult task with known methods and equipment.

Current technology lacks in numerous other ways including an ability to reprogram, update or otherwise exchange data between air, water or satellites and unmanned or even manned vehicles where consistent wireless technology is not accessible including satellites, other space vehicles, marine vehicles, air vehicles, etc. Additionally, some commercial and military systems and applications lack technology and hardware to adequately address problems above and struggle with catch and release systems for deploying drones and other unmanned aerial vehicles (UAVs) from a fixed wing aircraft, and retrieving same. Ordnance deposition and delivery of ordnance close to target is an ongoing issue in military applications. Tankers used in refueling applications have always struggled to efficiently and accurately maneuver rigid booms used in fuel delivery.

What is clearly needed, and is provided in the instant application, is a unique system for stabilizing a winch cable deployed from a helicopter.

BRIEF SUMMARY OF THE INVENTION

In one embodiment of the invention a stabilizing system for a winch cable is provided, comprising a winch cable deployed and suspended from a helicopter, a cargo support attached at a deployed end of the winch cable, an end effector attached to the winch cable, the end effector comprising thrusters directed in a plurality of directions orthogonal to a vertical axis of the winch cable, first control circuitry in the helicopter, and second control circuitry in the end effector. Thrust of individual thrusters is controlled through the first and second control circuitry maintaining the axis of the winch cable vertical, damping swinging of the cable.

In one embodiment the end effector is attached above the cargo support. Also in one embodiment the end effector is attached below the cargo support. Also, in one embodiment thrusters comprise fans in directed ducts, the fans driven by electric motors. And in one embodiment the system further comprises power and control conductors joining the control circuitry in the helicopter with second control circuitry in the end effector, whereby the electric motors of the fans are powered through the power conductors from a power source in the helicopter, and the second control circuitry enables the first control circuitry to vary the rotational velocity of each electric motor.

In one embodiment the system comprises a rechargeable battery in the end effector powering the electric motors. Also, in one embodiment the system further comprises first wireless communication circuitry in the helicopter and second wireless communication circuitry in the end effector, wherein control signals are transmitted from the first control circuitry in the helicopter to the second control circuitry in the end effector wirelessly. Also, in one embodiment the system further comprises an imaging device on an upper region of the end effector, focused on a specific point on the helicopter above the end effector, the imaging device sensing movement of the end effector horizontally relative to the fixed point on the helicopter, and providing the deviation information to the first control circuitry in the helicopter, which uses the deviation information in controlling the individual thrusters in a manner to minimize horizontal movement of the end effector relative to the helicopter. In one embodiment the system further comprises controllable louvres over faces of the directed ducts, the louvres rotatable about vertical axes to deflect air to a side, providing a torque around the axis of the winch cable, wherein the attitude of the louvres is controlled to dampen rotation of the cargo support around the axis of the winch cable. And in one embodiment the system further comprises anti-rotational thrusters and sensors in the second control circuitry in the end effector to sense rotational attitude and rotation, data from the sensors used to control thrust of the anti-rotational thrusters to dampen rotation of the cargo support around the axis of the winch cable.

In another aspect of the invention a winch cable stabilizing method is provided, comprising deploying and suspending a winch cable from a helicopter with a cargo support attached at a deployed end of the winch cable, and an end effector also attached to the winch cable, the end effector comprising thrusters directed in a plurality of directions orthogonal to a vertical axis of the winch cable, and controlling thrust of individual thrusters of the end effector through first control circuitry in the helicopter and second control circuitry in the end effector, maintaining the axis of the winch cable vertical, damping swinging of the cable.

In one embodiment the method comprises attaching the end effector to the winch cable above the cargo support. Also, in one embodiment the method comprises attaching the end effector to the winch cable below the cargo support. In one embodiment thrusters comprise fans in directed ducts, the fans driven by electric motors, comprising controlling thrust by controlling the rotational velocity of the electric motors. And in one embodiment the method comprises power and control conductors joining the control circuitry in the helicopter with second control circuitry in the end effector, whereby the electric motors of the fans are powered through the power conductors from a power source in the helicopter, comprising powering the electric motors and controlling the velocity of the electric motors via the control conductors.

In one embodiment there is a rechargeable battery in the end effector, and the method further comprises powering the electric motors from the rechargeable battery. Also, in one embodiment there first wireless communication circuitry in the helicopter and second wireless communication circuitry in the end effector, and the method comprises controlling the electric motors with signals transmitted from the helicopter to the end effector wirelessly. In on embodiment there is an imaging device on an upper region of the end effector, focused on a specific point on the helicopter above the end effector, the imaging device sensing movement of the end effector horizontally relative to the fixed point on the helicopter, and the method comprises providing the deviation information to the first control circuitry in the helicopter, and controlling the individual thrusters according to the deviation information in a manner to minimize horizontal movement of the end effector relative to the helicopter. In one embodiment there are controllable louvres over faces of the directed ducts, the louvres rotatable about vertical axes to deflect air to a side, providing a torque around the axis of the winch cable, and the method further comprises dampening rotation by controlling the attitude of the louvres, dampening rotation of the cargo support around the axis of the winch cable. And in one embodiment there are anti-rotational thrusters and sensors in the second control circuitry in the end effector sensing rotational attitude and rotation, and the method further comprises using data from the sensors to control thrust of the anti-rotational thrusters to dampen rotation of the cargo support around the axis of the winch cable.

BRIEF DESCRIPTION OF THE SEVERAL
VIEWS OF THE DRAWINGS

DETAILED DESCRIPTION OF THE INVENTION

Figure 1A:
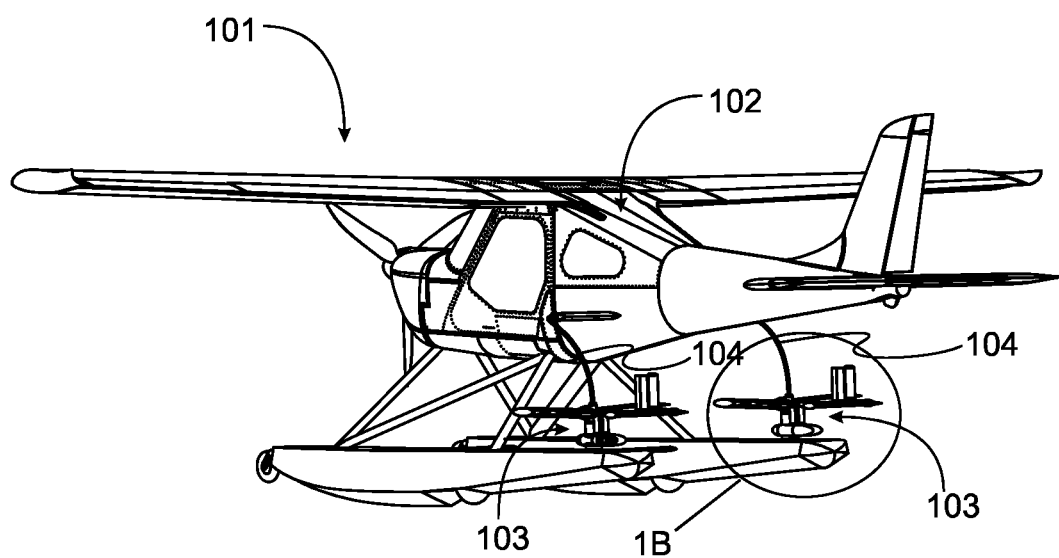
FIG. 1A is an illustration showing a tanker enabled to fuel a second aircraft in an embodiment of the invention.

FIG. 1A is an illustration showing a tanker 101 enabled to fuel a second aircraft in an embodiment of the invention. In various embodiments of the invention a tanker may be characterized as a maneuverable aircraft having fuel tanks within or attached to a body 102, the fuel tanks coupled to supply hoses (104), for providing fuel to receiving aircraft. The tanker aircraft may be piloted, or may be a pilotless drone aircraft controlled remotely, or controlled principally by on-board computer-guided systems, that may be in two-way communication with one or more remote stations that provide periodic or continuous instruction and updates. Tanker 101 is illustrated in FIG. 1A as a single-engine, propeller-driven aircraft, but this is exemplary only, and the tanker may be implemented in a variety of different configurations.

A necessary characteristic of tanker 101 in embodiments of the invention is that there is at least one extendable/retractable fuel hose 104 coupled to a fuel-supply tank, for providing fuel to a receiving aircraft. Another necessary characteristic is that the fuel-supply hose terminates at an end away from the tanker aircraft at a miniature flyer 103, that, by virtue of remotely-operable control surfaces, is capable of manipulating in space to a limited degree, to position the end supply end of the fuel hose, while the hose is extended in a fueling operation. The flyer serves as a hose guide. In various embodiments one tanker aircraft may have one, two, or even more extendable/retractable fuel hoses, with flyers coupled at the ends of the hoses away from the tanker aircraft.

Figure 1B:
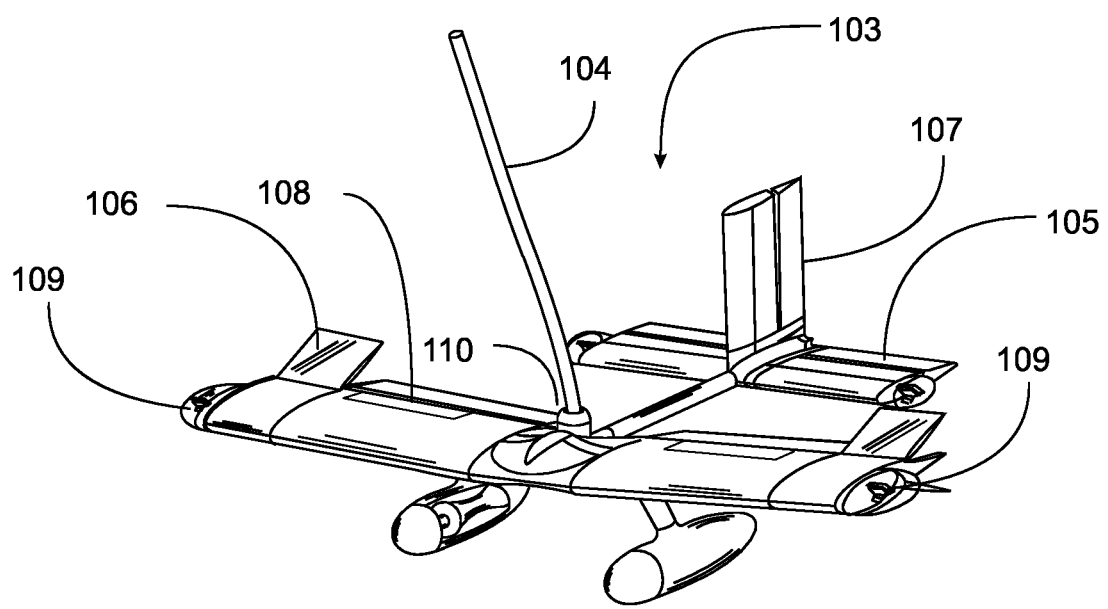
FIG. 1B is an enlarged view of a miniature flyer for positioning a fuel supply hose in an embodiment of the invention.

FIG. 1B is an enlarged view of the miniature flyer 103, shown in a different attitude than shown in FIG. 1A, and coupled to extendible/retractable hose 104. Miniature flyer 103 has essentially all of the systems of an independently functional aircraft, except for an independent propulsion system. The propulsion system of flyer 103 is the force applied by hose 104 coupled substantially at the center-of-gravity of the flyer.

Flyer 103 is a glider towed by tanker 101. Gliders are good examples of unpowered aircraft. When a glider is towed to altitude, thrust is derived from the aircraft towing the glider, through whatever tether connects the towing aircraft and the glider. Some of the horsepower provided by the towing aircraft is used to drive the glider through the air.

Flyer 103 in this example has elevators 105, ailerons 106, rudder 107 and speed brakes 108 to rotate the aircraft through the three axis of rotation namely pitch (elevator), roll (ailerons) and yaw (rudder), and to slow and speed up the flyer as needed. All rotations act through the center of gravity of the aircraft. In the flyer, the hose, in one embodiment, attaches to a ball swivel 110 located at the center of gravity of the flyer. An additional component of flyers in an embodiment of the invention is one or more imaging apparatus, such as video cameras 109. The use and significance of cameras 109 is described in further detail below.

Maneuverability of the flyer is a very important feature of the system, because it allows the flyer to move up and down via the elevator, side to side via the ailerons and rudder and forward and back via the speed brakes. Even though the flyer will point upward when the elevator pitches it up, the end of the hose at the center of gravity simply moves up, rather than pointing in a different direction. Likewise, when the flyer rolls or rotates sideways via the rudder, the end of the hose simply translates. All that is needed is for the end of the hose to move back and forth, up and down and side to side. This is all accomplished without independent power, as the flyer is towed by the tanker aircraft.

Figure 2:
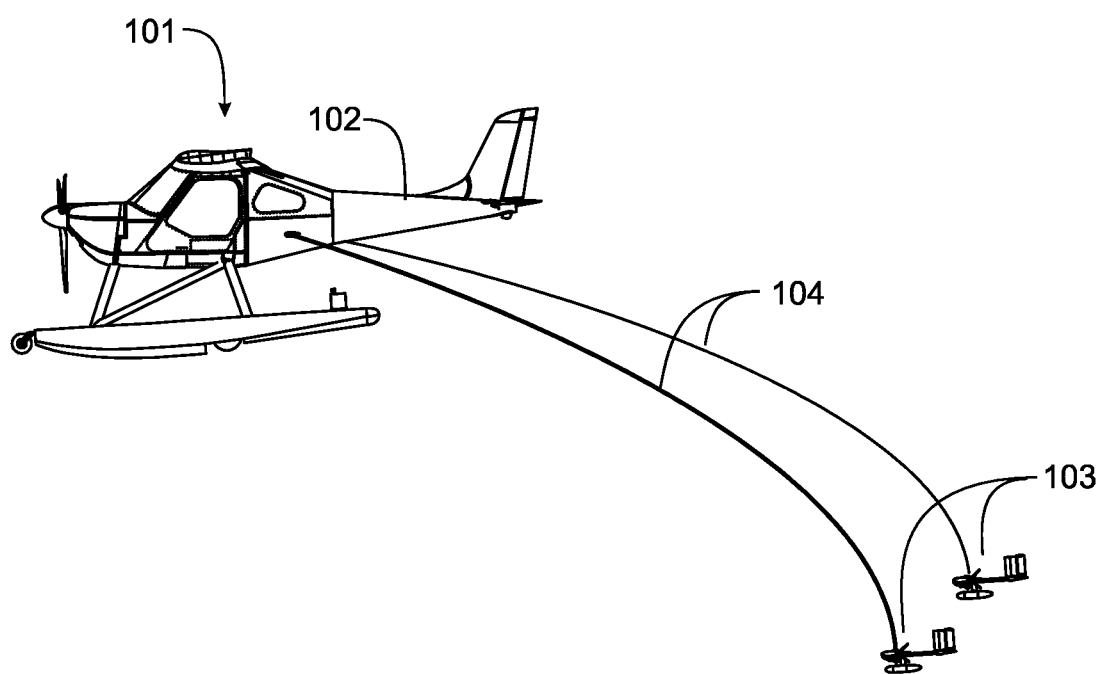
FIG. 2 is an illustration of the tanker of FIG. 1A with hoses extended.

FIG. 2 is a an illustration of tanker 101 similar to the tanker of FIG. 1A, with two hoses extended from reels (not shown), within the body of the tanker, each hose having a flyer 103 attached at the terminal end, stabilizing and directing the end of the hose. In operation other than refueling, the flyers 103 are carried in a secure location on the tanker, as shown in FIG. 1A, with the fuel hoses retracted. The hoses extended with the flyers deployed, as shown in FIG. 2, is only when the tanker has positioned relative to a receiving aircraft in a refueling operation.

Figure 3A:
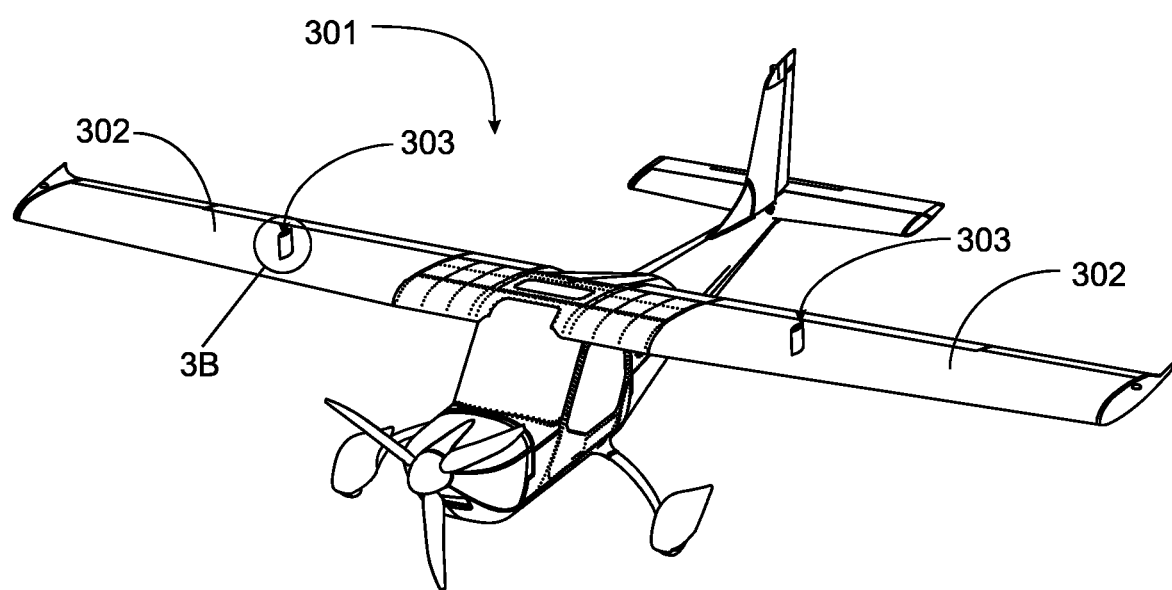
FIG. 3A is a perspective view of a fuel-receiving aircraft in an embodiment of the invention.

FIG. 3A is a perspective view of a fuel-receiving aircraft 301 in an embodiment of the invention. As was explained relative to the tanker aircraft, although receiving aircraft 301 is illustrated as a single-engine, single-wing aircraft, the receiving aircraft may be any of a broad variety of aircraft, piloted, or drone-operated pilotless. The depiction of FIG. 3A is exemplary only. One or more fuel-receiving apparatus 303 is implemented on a wing 302, in this example, of the receiving aircraft. In other embodiments the receiving apparatus might be implemented elsewhere than a top surface of the wing.

Figure 3B:
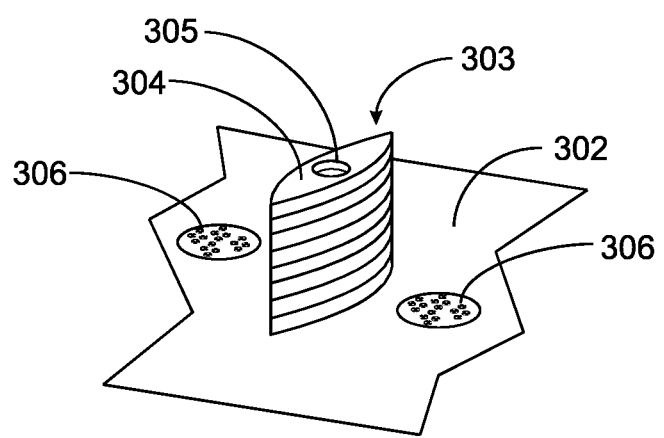
FIG. 3B is an enlargement showing a fuel-receiving port on the receiving aircraft of FIG. 3A.

FIG. 3B is an enlargement showing the fuel-receiving apparatus 303 on a portion of wing 302 of receiving aircraft 301 of FIG. 3A. The receiving apparatus comprises an aerodynamic acquisition blade 304 extending a significant height above the wing, as shown, with the leading and trailing edges aligned in the direction of flight of the receiving aircraft. A fuel-receiving port 305 is implemented at top of acquisition blade 304, and although not explicitly illustrated, is connected to the fuel tank or tanks of the receiving aircraft. Port 305 is implemented in a manner to be automatically coupled to and sealed to an end of a hose 104 carried by a flyer 103, in a coupling operation described more fully below.

A necessary operation in refueling a receiver in an embodiment of the invention is an operation of locating blade 304 and port 305 by an approaching flyer 103, carrying a donor end of hose 104. With flyers 103 configured to fly a level course, and hoses 104 deployed a specific distance, the spatial relationship of the flyer to the tanker is a known relationship. In embodiments of the invention, in a perfect world, the tanker might be positioned in exactly this relationship to the receiving aircraft, and the flyers might dock with the blades. But there are far too many variables for this to be a practical operation.

In embodiments of the invention, flyers 103 have cameras 109 implemented to capture images, preferably at a rapid video rate, of objects in their immediate vicinity. In the present example, cameras 109 are implemented in transparent bubbles on the end of wings of flyer 103, as seen in FIG. 1B. In some embodiments, cameras may also be implemented on ends of rear stabilizer wings of the flyer. Multiple cameras with known spatial relationships provide for efficient computation in location operations. Also in embodiments of the invention, machine intelligence may be implemented in the flyer, in the tanker, or partially in both. In one implementation, computer code may be provided and executed that allows the cameras to seek and identify blade shapes, like blade 304 on a wing of the receiving aircraft. This, however, is a computationally intensive operation.

In one embodiment of the invention, indicia are provided on or near blade 304, the indicia sought and acquired by the cameras, and from known spatial relationships of indicia to blade, the machine intelligence in cooperation with the acquired images of the cameras, may be executed to operate the elevators 105, ailerons 106, rudder 107 and speed brakes 108 of the flyer, to cause the flyer to approach the blade on the receiving aircraft, and to position and engage the blade, to connect hose 104 to port 305, and to supply fuel to the receiving aircraft.

FIG. 3B shows indicia 306, affixed to an upper surface of wing 302, at a known dimension from blade 304. There are different candidates for indicia 306. In one embodiment of the invention indicia 306 are what are termed AprilTags. AprilTag is a visual fiducial system, known in the art, useful for a wide variety of tasks including augmented reality, robotics, and camera calibration. AprilTag targets may be created from an ordinary printer, and the machine coded AprilTag detection software computes the precise 3D position, orientation, and identity of the tags relative to the camera.

Implementations of AprilTag software are available in Java, as well as in C. Notably, the C implementation has no external dependencies and is designed to be easily included in other applications, as well as portable to embedded devices. Real-time performance can be achieved even on cell-phone-grade processors. The AprilTag fiducial design and coding system are based on a near-optimal lexicographic coding system, and the detection software is robust to lighting conditions and view angle.

A refueling operation, practicing principles of the present invention, may proceed in a variety of ways, and under a variety of circumstances and conditions. In all cases there will be a tanker aircraft to supply fuel, and a receiver aircraft to be fueled. The tanker may have widely variable characteristics, and may be either piloted or unpiloted, remotely controlled or self-controlled. In all cases a commonality is that the tanker will have at least one extendable/retractable fueling hose, in many cases manipulated by a reel mechanism, and a flyer as shown generally as element 103 in FIGS. 1A and 1B will be coupled at the fueling end of the hose. The receiving aircraft will have at least one of the blades 304 implemented on a surface, such as a wing, in a position where the blade may be accessed by the flyer.

Acquisition is done in stages. Firstly, the tanker, which is the aircraft that carries the flyer to the receiving aircraft, flies to a pre-determined position based on the known position of the receiver. The location of the receiver is known by flight plan, GPS or visual systems, or by a combination of these procedures. In a prior art refueling operation, the tanker flies a predetermined and standardized track. With the system in embodiments of the invention, the receiver is flying a predictable and standardized track, which may be a Combat Air Patrol or CAP. A CAP is usually a circular path at constant altitude that takes, in one example, about four minutes to complete. Four minutes to make a 360-degree turn is called a standard rate turn. The receiver doesn't have to be in a standard rate turn for the system and procedure of the invention to be practiced, but if intelligence directing the tanker knows the path size and duration of the receiver, whether standard or not, the tanker can be directed to a position where the receiver will be when the tanker arrives. Global Positioning Systems (GPS) and very accurate navigational computer algorithms may compute the relative positions of the tanker and the receiver and may fly the tanker to a rendezvous well within a meter of a destination point in three axes. With the two aircraft sharing data via radio link or some other means of direct communication, the locations and rendezvous trajectories may be enhanced.

In an important embodiment of the invention, the entire operation may be transparent to the receiving aircraft, except for the addition of fuel, for the weight of which the receiver aircraft may automatically adjust power and navigation to maintain a planned operation. In this example, the receiver does not maneuver relative to the tanker, but simply continues to fly a pre-planned mission. The receiver is passive in the operation.

The tanker maneuvers to a position above and in front of the receiving aircraft. The flyer, or multiple flyers, will stabilize at a certain position below and behind the tanker, with control surfaces stabilized. The destination position for the tanker is therefore this known spatial offset. If the tanker could fly accurately enough, the flyer would not be necessary. That accuracy in the acquisition operating is not realistic, so the final stage of a rendezvous and contact is accomplished with fine maneuvering by the flyer.

This final positioning may be done in different ways. For example, a two-way data link between the two assets may periodically share precision GPS data, and with such updates, the flyer may be directed to the refueling blade, which may be on the top of a wing of the receiving aircraft. This technology is called Real-Time-Kinematics (RTK) and is used by many industries to get precision location data down to a cm level. But with RTK the tanker and receiver must talk to each other. A goal of the invention is to have the receiver do as little as possible.

In one embodiment of the invention a video camera vision system, sometimes termed computer vision (CV) or machine vision (MV), is used to guide final positioning. CV can locate and map objects to mm accuracy. A crude CV system can locate the receiver from a mile away without difficulty and can discern objects on the aircraft, such as the refueling receptacle, or AprilTags, from 500 ft on in.

So, in one embodiment a CV system using cameras, such as cameras 109 in FIG. 1B, may be used in conjunction with executing software in a processor in the flyer or the tanker, to do final positioning. Training the system to look for objects shaped like blade 304 is one option, but this will challenge a processor, because the process is computer intensive.

Figure 4:
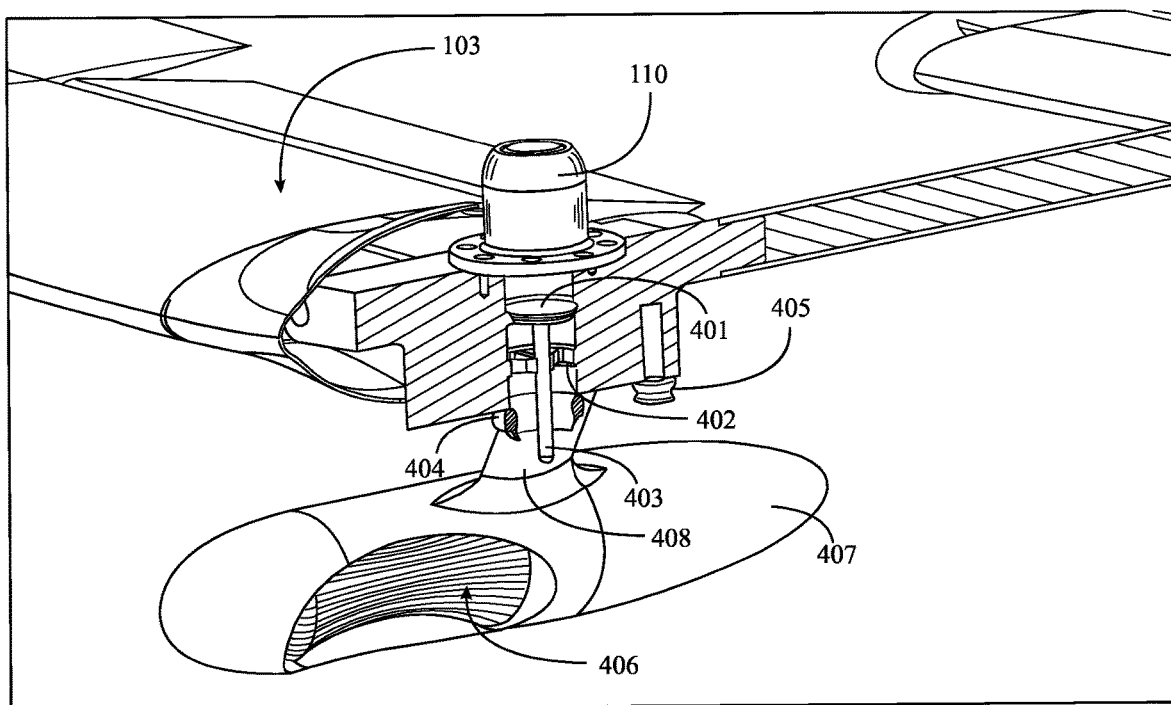
FIG. 4 is a cutaway illustration of elements of a flyer in an embodiment of the invention.

FIG. 4 illustrates a flyer 103 according to one embodiment of the invention, shown in partial section, to illustrate elements of the flyer that are associated with connection of the flyer and the hose carried to a receiving port on a receiving aircraft. In this example the hose is not shown but connects to the flyer at the ball swivel 110 shown in FIG. 4, and described above, located at the center of gravity of the flyer. Below ball swivel 110 there is a vertically translatable valve 401 in a vertical fuel passage through the body of the flyer. This valve, when the flyer is not coupled to a receiving port is normally seated in a valve seat 402, and held thus either by spring tension, or by pressure in the fuel line, or both. The valve has a valve stem 403 guided through the center of seat 402. This stem encounters a triggering element in a port in an acquisition blade as the flyer lowers to the receiver and opens the valve at the proper time.

In embodiments of the invention, flyer 103 has two roller clamp fairings 407 (one shown in FIG. 4), that have each a powered, curved roller 406. These fairings each carry a controllable electric motor to drive the roller, and the fairing connect to the flyer by a strut 408 that may be rotated relative to the body of the flyer, to move the rollers toward one another until they clamp onto the acquisition blade, and then roll to pull the flyer down until a seal 404 encounters port 305. The process of acquiring an acquisition blade on a receiving aircraft and docking the hose to a port is described in further detail below.

Figure 5:
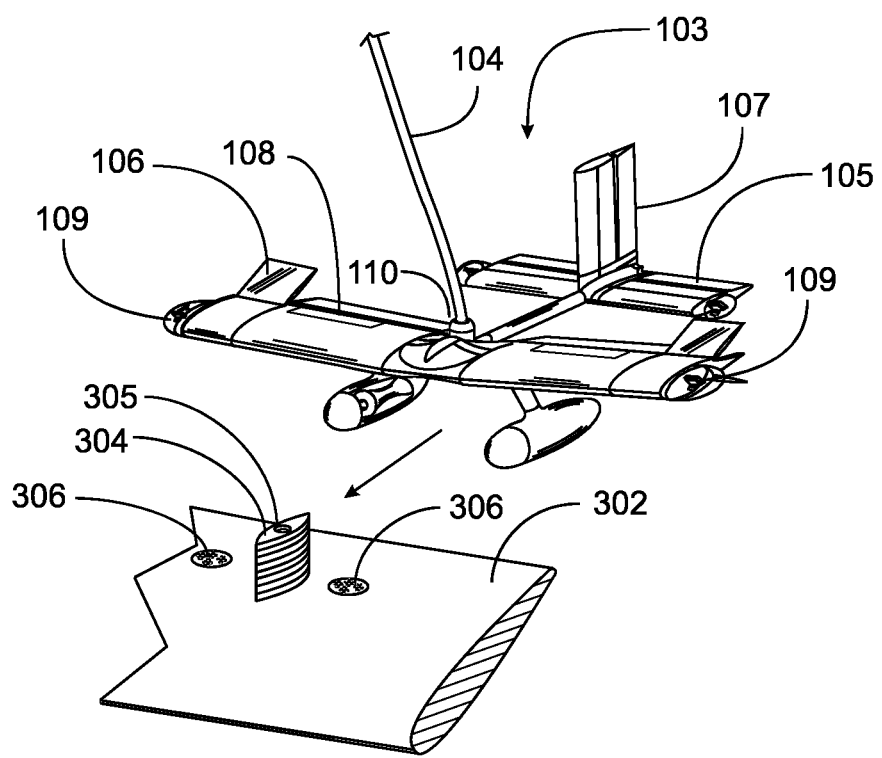
FIG. 5 is a perspective illustration of a flyer, towed by a hose, approaching position to an acquisition blade on a receiving aircraft.

FIG. 5 illustrates a flyer 103, carrying a fuel hose 104 from a tanker, approaching an acquisition blade 304 implemented on a wing 302 of a receiving aircraft. Blade 304 has a receiving port 305 for hose 104, and there are two AprilTags 306 placed on wing 302 in a known relationship to blade 304, as described above with reference to FIG. 3. The tanker from which the fuel hose trails is not shown in FIG. 5, but the tanker and the flyer each have circuitry, including two-way wireless communication, for sharing information and coordinating actions in the process of causing the flyer to acquire acquisition blade 304, and to engage the fuel hose to fueling port 305 at the top of the acquisition blade.

Figure 6:
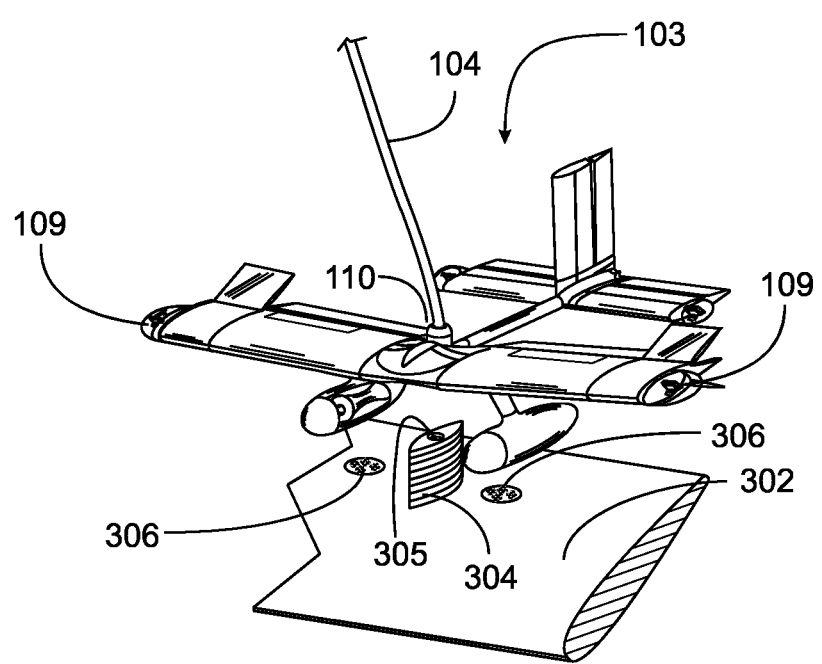
FIG. 6 is a perspective illustration of the flyer and acquisition blade of FIG. 5, with the flyer in position to acquire the blade.

FIG. 6 is a perspective illustration of the flyer 103 and acquisition blade 304 of FIG. 5, with the flyer in position to acquire the blade. In FIG. 6, the control circuitry and processor in the flyer, has acquired positioning information by image capture of one or both AprilTags 306, and has operated the elevators 105, ailerons 106, rudder 107 and speed brakes 108, as necessary to maneuver the flyer so that the hose attachment to the flyer is directly over port 305, and the flyer is at a distance above wing 302 such that the roller fairings (407, FIG. 4), may be rotated together such that the rollers may contact acquisition blade 304 from each side.

Figure 7:
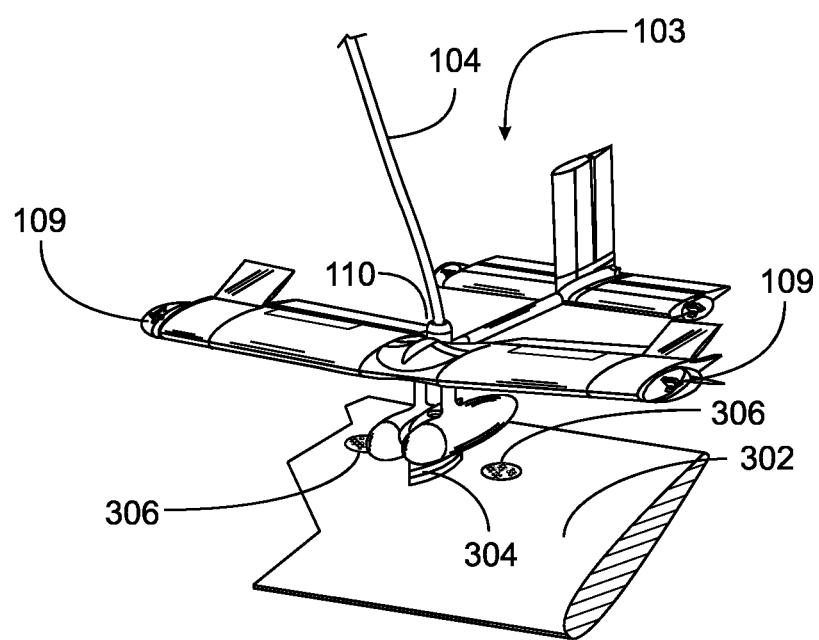
FIG. 7 is a perspective view of the flyer and acquisition blade of FIG. 6, with the roller fairings closed, acquiring the blade with the rollers.

FIG. 7 is a perspective view of the flyer 103 and acquisition blade 304 of FIG. 6, with the roller fairings 407 closed, acquiring the blade with the rollers. With the blade thus acquired by the rollers, which may be sensed by sensors in the drives for moving the struts to close the fairings, the flyer is at this point joined securely to the acquisition blade, and the rollers may be started to lower the flyer until seal 404 (see FIG. 4) engages port 305 securely. It may be noted that the curved nature of the acquisition blade and the rollers in the roller fairings of the flyer provide a final positioning resource for the engagement of the flyer and the blade, such that, if the flyer is a bit off, the closing of the fairings to press the blades against the blade will move the flyer into final, and perfect, position.

Figure 8:
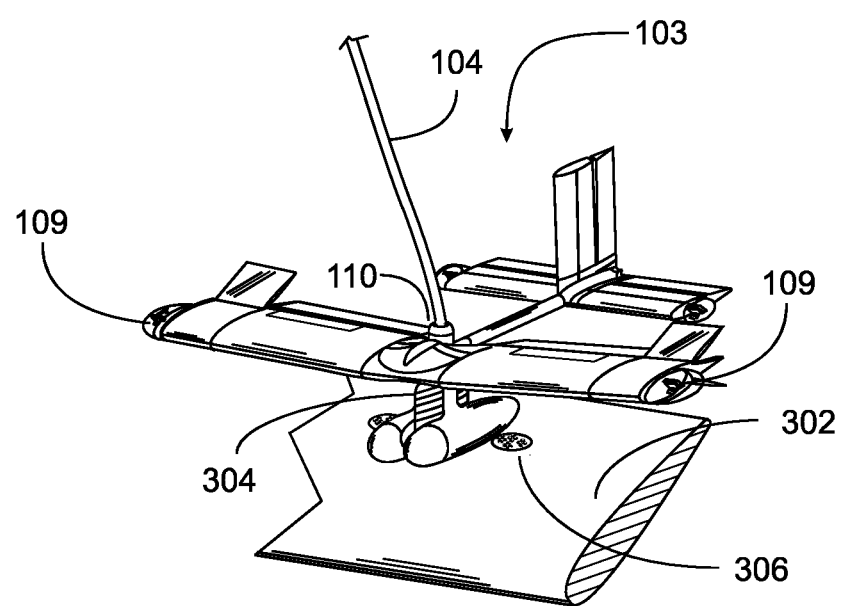
FIG. 8 is a perspective view of the flyer and acquisition blade of FIG. 7, with the flyer lowered to the wing of the receiving aircraft.

FIG. 8 is a perspective view of the flyer and acquisition blade of FIG. 7, with the flyer lowered to the wing of the receiving aircraft by operation of the rollers in the roller fairings of the flyer, and engagement of seal 404 (FIG. 4) with port 305 at the top of the acquisition blade. With seal 404 engaged securely with port 305, fuel may be safely transferred.

Referring now to FIG. 4, it may be noted that valve stem 403 is of a length that it extends below seal 404. Therefore, with seal 404 engaged in port 305, stem 403 may extend into port 305 in acquisition blade 304. In one embodiment of the invention there may be an actuator to contact stem 403 to lift valve 401 from seat 402. In embodiments of the invention wherein fuel hoses 104 are pressurized with fuel, even while the hoses are extended and retracted, and before engagement with an acquisition blade, this actuation will immediately start flow of fuel into tanks of the receiving aircraft. In another embodiment there may be an electromechanical actuator to operate valve 401, in which case, once the flyer senses that seal 404 is seated in port 305, the actuator may be triggered to begin fuel flow.

It is important to note that fuel tanks on typical aircraft are not designed and manufactured to withstand a great deal of internal pressure. Fuel tanks in most aircraft, in fact, may withstand only a nominal internal pressure before failing. In view of the fact that a tanker aircraft, in an embodiment of the invention, will necessarily have to fly at a significant altitude above that of a receiving aircraft, if the flyer were to join the fuel hose to a fuel tank of a receiving aircraft in a liquid and airtight manner, the pressure head of the fuel at the acquisition blade and in the tanks of the receiving aircraft would be far above any safe pressure to which the tanks should be subjected. For this reason, fuel tanks in the receiving aircraft are vented, and the fuel system including the fuel hose during fuel transfer is also vented.

Referring again to FIG. 4, element 405 is a seal over a vent channel in the flyer. A sensor, not shown, will sense fuel at the vent, indicating that the tanks of the receiving aircraft are full, and the control systems will stop the fueling process. In one embodiment this simply involves activating the rollers in the roller fairings to lift the flyer from the wing of the receiving aircraft, which allows valve 401 to close at or before the point that seal 404 unseats from port 305.

When the receiving aircraft tank or tanks are full, or when a pre-programmed quantity of fuel has been transferred, disengagement may begin. There are a variety of ways in different implementations that the fact of sufficient fuel transfer may be known. As it is an object of the invention that the refueling operation may be transparent to a receiving aircraft, the end of the fueling operation is sensed by the flyer. In one embodiment the flyer may meter fuel flow. In another embodiment, the fuel transfer may be a timed operation. In most embodiments, fuel at a vent is detected, as described above.

When fuel transfer is complete, disengagement is, in early steps, a reversal of the final steps of engagement. Once transfer is finished, the rollers in the roller fairings of the flyer are operated again in the reverse of the rotation for engagement, raising the flyer from the position of FIG. 8, until seal 404 breaks contact with port 305. In an embodiment wherein valve 401 is opened by a mechanical contact with stem 403, pressure in the fuel line will close the valve as contact is broken. In an embodiment wherein an electromechanical actuator closes the valve, this may be triggered by sensing when contact is about to be broken.

Once contact is broken, and valve 401 is closed, the flyer may rotate the struts to open the rollers from the acquisition blade, and the flyer is then free of the receiving aircraft. The flyer at this point may signal the tanker aircraft, or the tanker aircraft may sense the condition, and the tanker aircraft may proceed to retract hoses 104, and may proceed on a further mission for refueling another receiving aircraft, or may return to a base to be replenished with fuel for further missions.

In exemplary embodiments of the invention, as described above, the entire operation may be transparent to the receiving aircraft, which simply continues with its mission. It is, however, necessary that the control systems in the tanker aircraft, and perhaps to some extent in the flyer(s), are aware of the mission of the receiving aircraft, and its geographic location and course, and especially of any alterations in the course of the receiving aircraft. It is preferable, and in some cases required, that the refueling operation be carried out while the receiving aircraft is flying a straight and level course.

Figure 9:
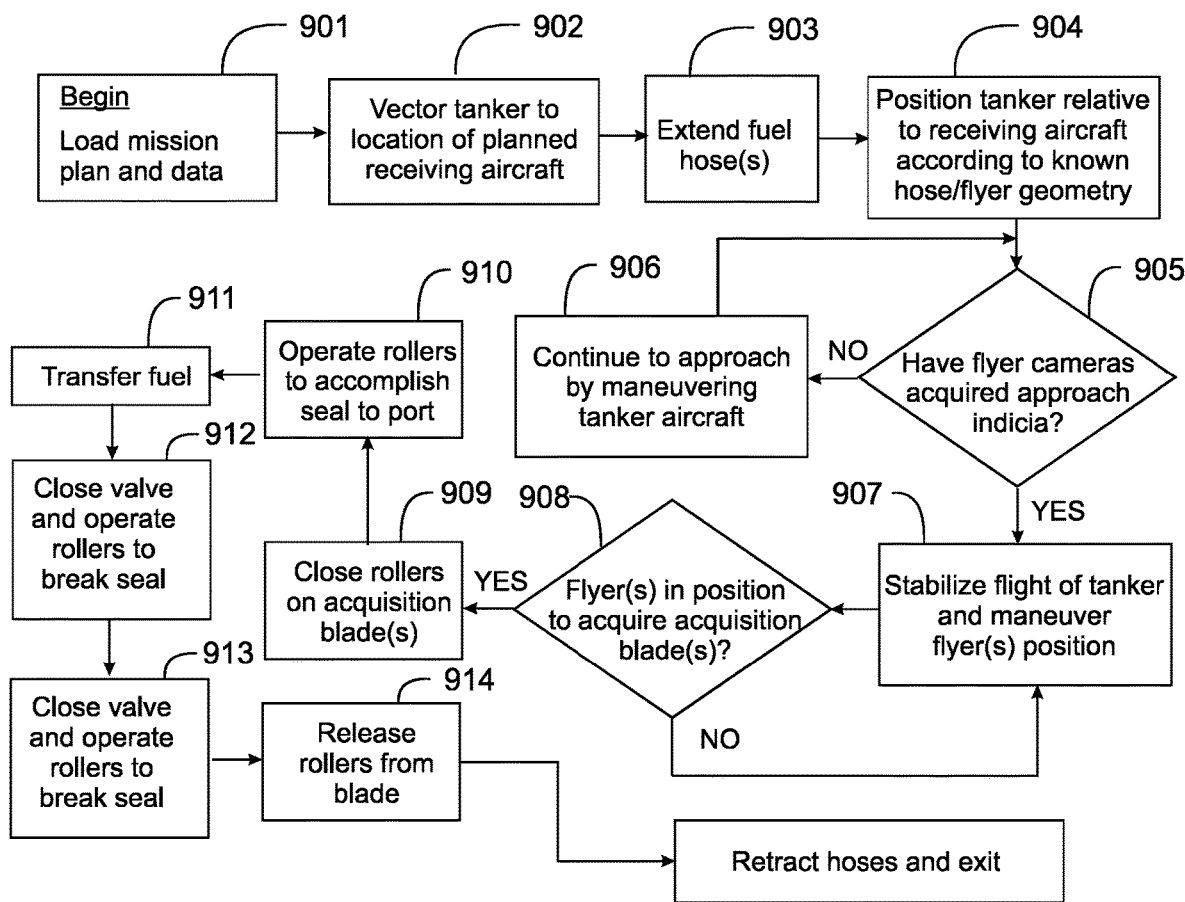
FIG. 9 is a flow diagram illustrating step-by-step activity in refueling a receiving aircraft in an embodiment of the invention.

FIG. 9 is a flow diagram illustrating step-by-step activity of a tanker having one or more fuel hoses and flyers at the end of the hoses, according to an embodiment of the invention, in a refueling operation. At step 901 tanker aircraft loads a mission plan and data. The plan will identify a receiving aircraft to be refueled, and the data will include the location geographically of the receiving aircraft (GPS), and details of the mission and flight activity of the receiving aircraft.

At step 902 the tanker aircraft vectors to the known position of the receiving aircraft. This, of course is done by calculating where the receiving aircraft will be according to details of its mission and flight plan. When the tanker arrives in the proximity of the receiver aircraft, at step 903 the tanker extends its fuel hose or hoses to a predetermined extent. Each hose has a flyer at the end, with flight apparatus set to a level and steady flight for the end of the respective fuel hose.

Once the hose or hoses are fully extended, the tanker aircraft in step 904 maneuvers to bring the flyers at the ends of the hoses closer to acquisition apparatus on the receiving aircraft. During this operation the image acquisition system of the flyer or flyers, looks for indicia to acquire positioning data. At step 905 the control systems query for acquisition of indicia. If indicia are not acquired, control goes to step 906, and the tanker aircraft continues to close the distance to acquire indicia.

When indicia are acquired, at step 907 the tanker flight is stabilized, and the flyers, having uploaded data provided by the indicia, at step 908 operate flight apparatus to close to a position where the flyer may acquire an acquisition blade by the rollers in the roller fairings. The controls periodically or continually check, and the flyers continue to maneuver, until at step 909, the flyer is in position, and signals to close the rollers on the acquisition blade. If there is more than one hose and flyer, the closure may be at a different point for each flyer and blade. The rollers are operated at step 910 to lower the flyer(s) to engage seal 404 with port 305.

When seal is accomplished, fuel is transferred at step 911. After fuel transfer is sensed as complete, the fuel valve in the flyer is closed at step 912, and the rollers are reversed to disengage the seal from the port at step 913. At step 914 the rollers are released from the blade, freeing the flyer(s) from the receiving aircraft, and at step 915 the tanker retracts the hoses, and exits to any further mission.

The application of a flyer to manipulate the end of a fuel hose extended from a tanker aircraft, as described in embodiments above, is but one application of practice of the present invention. Other applications are described in following paragraphs.

As a prelude to further, and broader, application of practice of the invention, consider that flyer 103 in the embodiments described thus far is in essence an unpowered glider, towed by the tanker aircraft by the fuel hose. In a more abstract sense, the flyer is a mobile end effector for providing limited maneuvering to an end of a supple, that is, limber, tether, which is a fuel hose in the embodiments described above in enabling detail. Operating the maneuvering apparatus of the flyer enables the end of the hose to be precisely placed to a fuel port of a receiving aircraft.

Operation, strictly as a glider is feasible in many practices of the invention, but in some applications, the flyer may be powered, and the power may be by conventional propeller (s), or may be by thrusters, such as jet, rocket, or turbine operation. In some embodiments the conventional ailerons, etc., described with reference to FIG. 1B, for example, may not be necessary at all, as all maneuvering, as well as powered flight, might be provided by directional thrusters.

Powered flight by an end effector will be desirable in applications where a limber tether is used from such as a helicopter. Consider, for example, rescue situations where a helicopter may be used with a harness to reach and reel in a person stranded on a face of a cliff. In traditional operation the helicopter lowers (extends) a tether with a harness, or a person and a harness, the person to help in applying the harness to a subject. Suppose the cliff face has a negative slope and/or an overhang, such that the subject is not in line of vertical sight from the helicopter. If a powered end effector is incorporated at or near the end of the tether, and is controllable from the helicopter, the lower end of the tether may move under an overhang, for example, and deliver the harness to a person that could otherwise not be reached.

In another circumstance, a subject might be in line of sight from the helicopter, but turbulence and prevailing wind may make it very difficult to deliver the end of the tether where wanted. Having a powered end effector, and ability to control same, may make such a rescue operation more efficient, and result in a higher success rate.

In circumstances wherein a destination point for and end of a tether, or other flexible conduit or hose, might be obscured from sight of an operative on an aircraft, as in the case of guiding a harness on a tether to a person isolated on a cliff, for example, the tether might include one or more data lines by which a video camera or other imaging device at the end effector might provide a display to the operative in the aircraft. The operative, by virtue of the control system and imaging device could fly the end effector with the harness right to the person needing the harness for rescue.

There are many other applications for such a remotely controllable end effector with video sight capability.

In another application, a tether may not be a fuel hose, but, for example, a data cable. There may well be applications in which a providing aircraft, or even a satellite or a space voyager may collect large quantity of data. Consider, for example, video camera operation for mapping, or for simply collecting a great deal of information. Wireless transfer may be considerably slower than collection, resulting in backup of data. A collecting vehicle might extend a tether, comprising a data cable, and a flyer or other end effector at the end of the tether, might operate, as in the fueling operation, to connect to a receiving aircraft, for a hard-wired transfer of large amounts of data quickly.

In one circumstance, a glider might be utilized as transport for cargo or people, or both. If the transporter is not directly powered, it need not be refueled. Some way is needed, however, to keep the glider aloft and moving toward a planned destination. In one embodiment a powered towing aircraft might be provided with an extendable/retractable towing tether having a mobile end effector, such that the tether may be extended, and may hook up to the glider transparently to the glider. The towing aircraft need not have cargo capability and may be designed for efficiency as a towing unit. In some embodiments the towing aircraft may disconnect when its own fuel runs low, and a hand off to a second, or a next, towing aircraft, in a relay. At a destination the glider may be cut free to glide to a safe landing, either guided by an on-board pilot or by automatic systems. Alternatively, the glider might be guided to land while still attached by tether to a towing aircraft. In this latter case, the tether may include communication and data cables through which control circuitry in the towing aircraft may operate apparatus and control systems in the glider.

In the circumstance of towing a glider, carrying either cargo or people, or both, there may be a plurality of towing aircraft, and a plurality of attachment points and apparatus on the glider where towing aircraft may attach and detach. Tethers from the towing aircraft may have end effectors much like the flyers described above, or having alternative apparatus, such as thrusters, to accomplish necessary maneuvering about the three axes around a center-of-gravity, to seek, find, and accomplish attachment to physical points of engagement to affect towing. The end effectors in this circumstance may have imaging devices, and there may be target indicia affixed to surfaces on the glider, for acquisition by the end effectors to home in on attachment points.

There are many other applications for end effectors for otherwise limp tethers, hoses and communication lines. In a further example, fire hoses, used by firefighters, might benefit from such end effecters. Fire hoses with video capability and flying end effectors may be deployed at a fire to take the end of a fire hose into a window or through a doorway, to be moved within a burning structure to a point of maximum effect, before water, foam or fire retardant may be ejected from the hose. In some cases, intermediate flyers might be joined to a hose at points along the hose to support the hose as the end effector flyer carries the end of the hose.

In yet another potential application of embodiments of the invention, it is known that an object, suspended by a lengthy tether from a fixed wing aircraft, may maintain, at the altitude of the object, a relatively stable fixed position, if the fixed wing aircraft were to fly a circular course at a speed and at a radius that just compensates for the pendulum motion that the object would exhibit at any moment as tethered to the aircraft. This is simply a problem in math, with the weight of the object known, and the weight and nature of the tether known.

In such a situation, an end effector as described in many embodiments herein might be used to correct for discrepancies such as wind variables, etc., and a fixed wing aircraft could then be employed in many applications which otherwise belong to helicopters, drones, and other aircraft capable of hover operation.

In still another operation, a weapon pod might be suspended from either a fixed wing aircraft, as described just above, or from a hover craft, with an end effector that could translate the pod in essentially an X/Y plane, to position the pod, capable of dropping grenades and the like, precisely over targets.

Helicopter Cliff-Side Rescue

As was described briefly above, powered flight by an end effector will be desirable in applications where a limber tether is used from such as a helicopter, to deliver an escape harness, for example, to a person isolated on a side of a cliff or a ravine, and perhaps obscured from above by an overhang or another obstruction. In conventional operation the helicopter lowers (extends) a tether with a harness, or a person and a harness, the person to help in applying the harness to a subject. Suppose the cliff face has a negative slope and/or an overhang, such that the subject is not in line of vertical sight from the helicopter. In an embodiment of the invention, a powered end effector is incorporated at or near the end of the tether and is controllable in one implementation from the helicopter. The lower end of the tether, carry a rescue harness for example, may move under an overhang and deliver the harness to a person that could otherwise not be reached.

In another circumstance, a subject might be in line of sight from the helicopter, but turbulence and prevailing wind may make it very difficult to deliver the end of the tether where required. Having a powered end effector, and ability to control same, makes such a rescue operation more efficient, and result in a higher success rate.

In some embodiments the tether from the helicopter might include one or more data lines by which a video camera or other imaging device at the end effector might provide a display to an operative in the aircraft. The operative, by virtue of the control system and imaging device could fly the end effector with the harness right to the person needing the harness for rescue.

Figure 10:
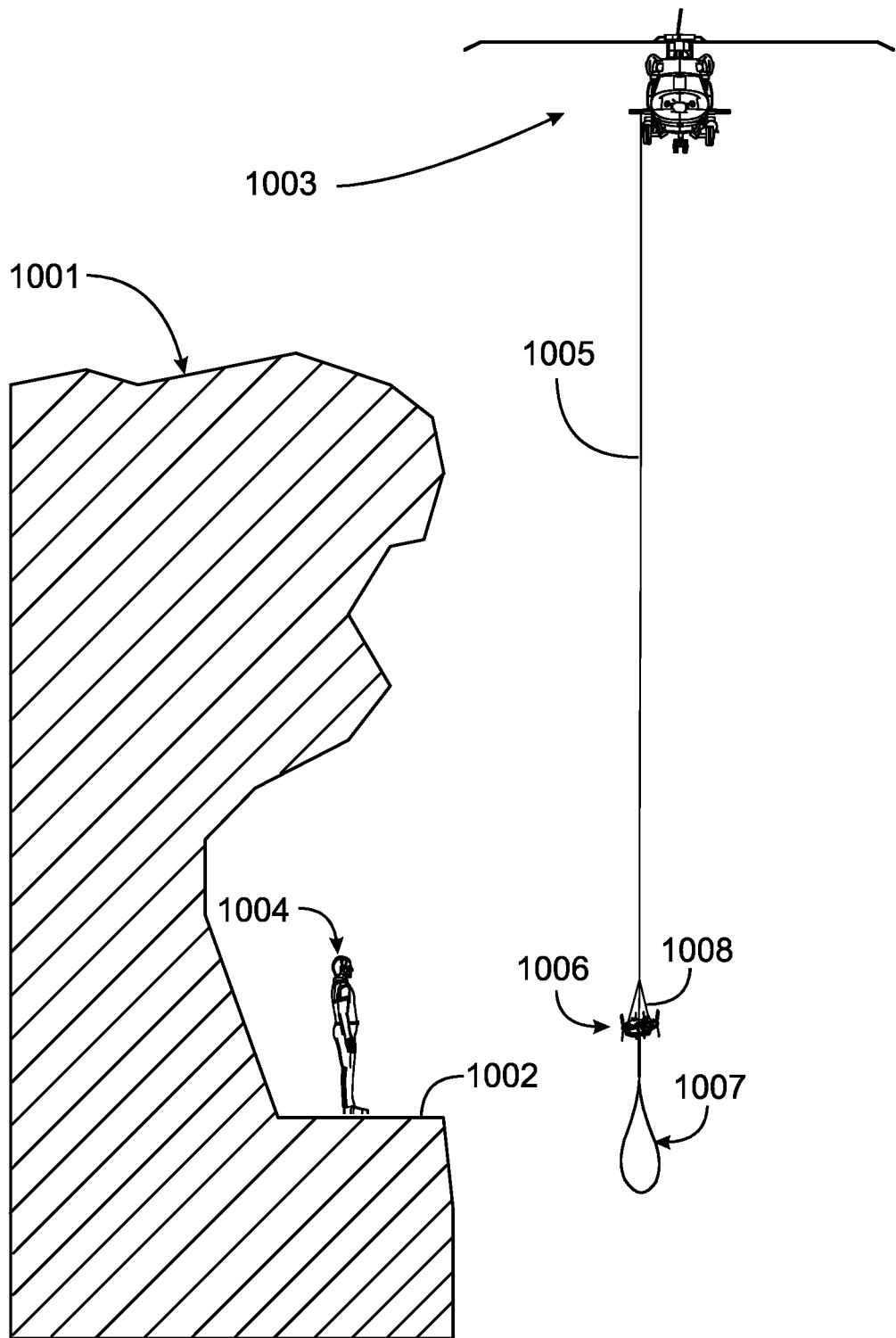
FIG. 10 is a perspective view of a helicopter delivering a harness to a person stranded, in an embodiment of the invention.

FIG. 10 is an overall view of a system in the application of rescue from a helicopter. Section 1001 represents a vertical section through a cliff having a ledge 1002. A person 1004 needing rescue is shown standing on the ledge. The skilled person will understand that this representation is entirely exemplary, and is meant to represent a wide variety of circumstances where a person in need of aid may be substantially inaccessible from directly above, making lowering of an escape harness directly downward to the person difficult or impossible.

A helicopter 1003 is illustrated hovering above the cliff face and to some distance outside the cliff face. The operatives in the helicopter have caused a tether 1005 carrying an end effector 1006 and a rescue harness 1007 below the end effector 1006, to be lowered to a point in this example below the height of the ledge 1002.

End effector 1006 in this example is a powered unit with thrusters facing in multiple directions to move the end of the tether. Tether 1005 is a cable strong enough to support the person needing rescue and also includes electrical conductors enabling control signals to be communicated to the end effector from an operative with a control unit in the helicopter. The control unit in this example enables the operator to fly the end effector upward from the position shown in FIG. 10 to a new position as shown in FIG. 11, carrying the rescue harness to the person 1004 on the ledge.

In practice tether 1005 is a heavy winch cable, attached to a winch at a door of the helicopter. The process for delivering the rescue harness to the person on the ledge under an overhang involves lowering the harness, carried by the end effector to a point as shown in FIG. 10. Then the operative in the helicopter operates the thrusters of the end effector are activated from the helicopter to fly the end effector with the rescue harness upward and in toward the ledge to a position as shown in FIG. 11.

Figure 11:
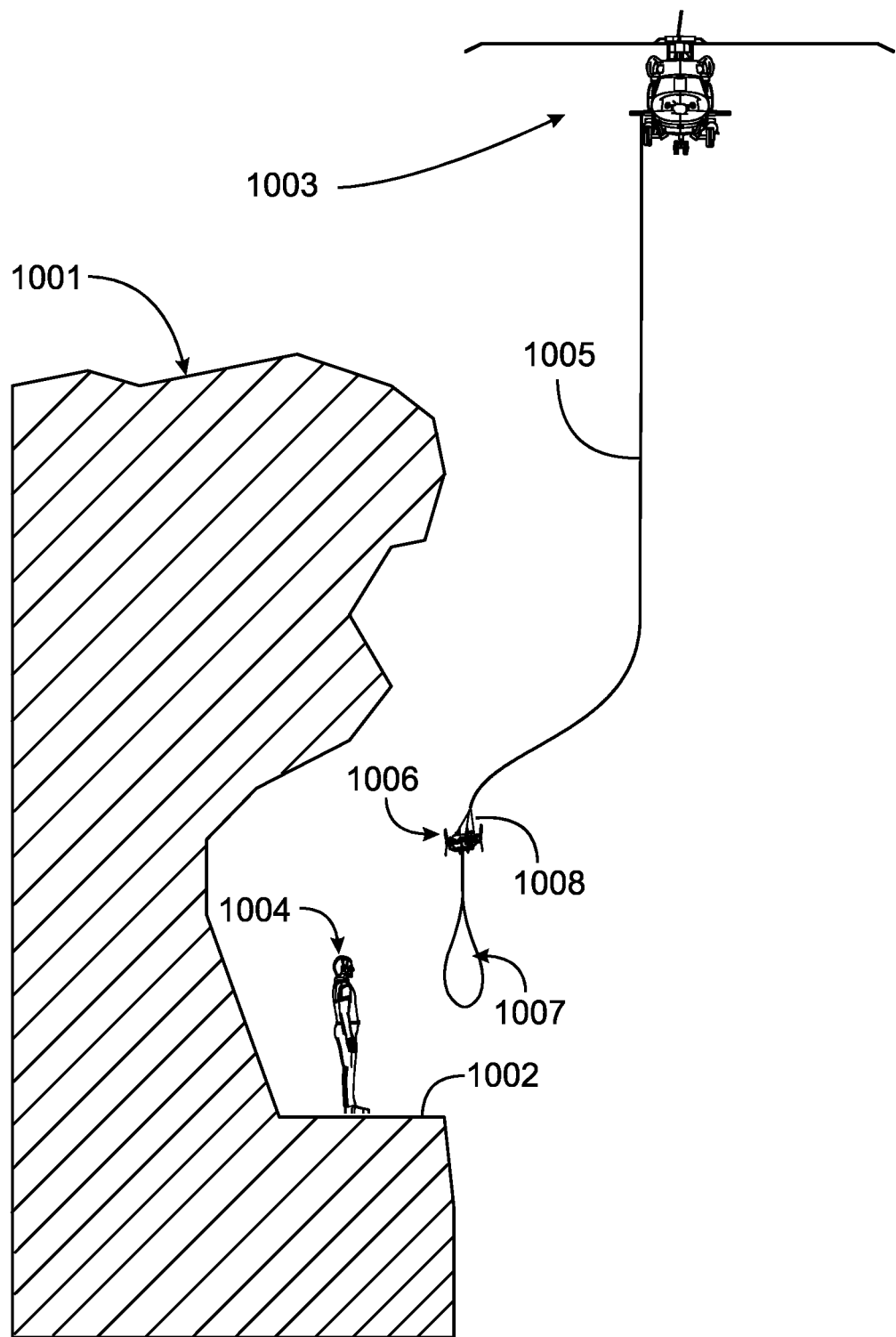
FIG. 11 is a perspective view of an end effector in use in the embodiment as shown in FIG. 10.
Figure 12:
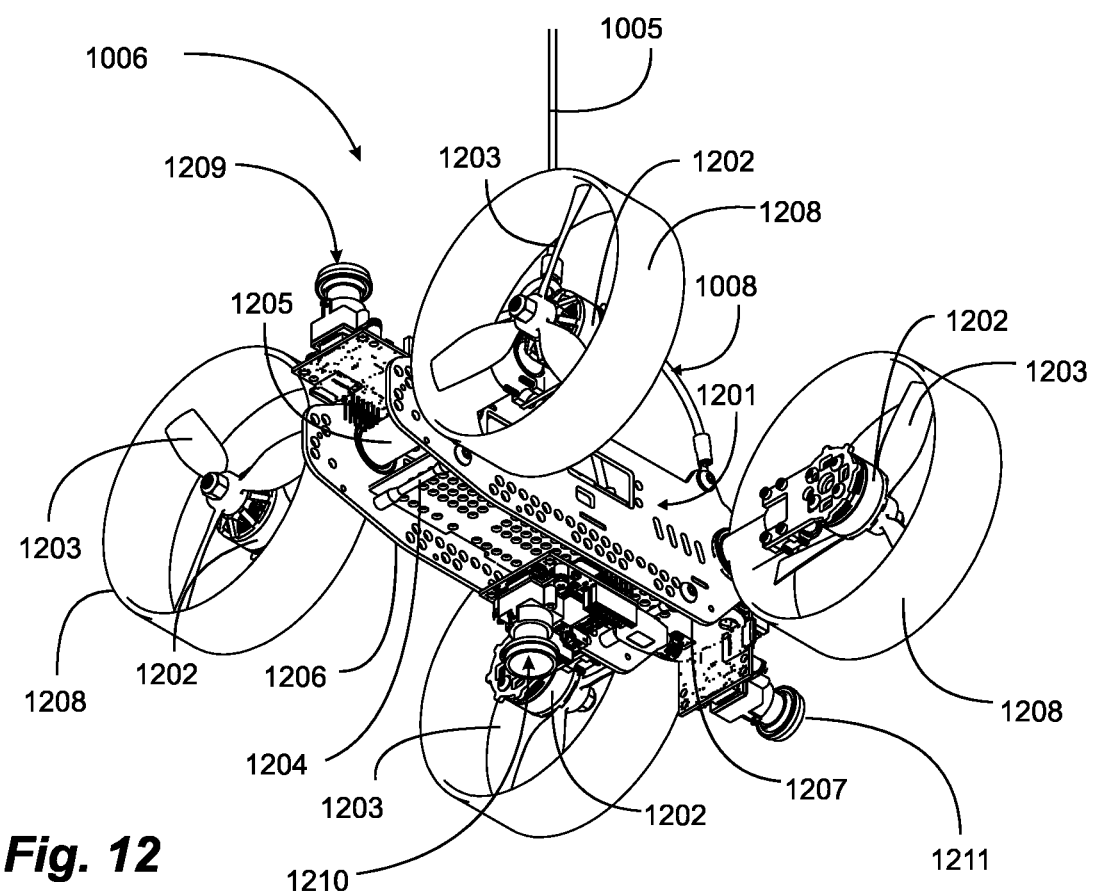
FIG. 12 is a perspective view of the end effector of FIGS. 10 and 11 in an embodiment of the invention.

FIG. 12 is a perspective view of end effector 1006 of FIGS. 10 and 11. In this example end effector 1006 has a frame 1201 comprising two parallel vertical plates 1206 and 1207, spaced apart by spacers such as elements 1204. There are two parallel shafts 1205 in this example implemented through the frame (one is apparent in the figure), and electric motors 1202 with propellers 1203 mounted at the ends of each one of the shafts 1205, effectively providing four thrusters. Shafts 1205 are rotated by one or more independently controllable electric motors, not shown, that may direct the thrusters in any direction orthogonal to shafts 1205. Each of motors 1202 is independently controllable, as well, so the magnitude of the thrust produced by each may be varied by an operative in the helicopter. With the four thrusters directed downward the effector may hover, and rotation of shafts 1205 and varying thrust on the motors may propel the effector in essentially any direction. Each thruster has a shroud 1208 protecting individuals and apparatus from the spinning propellers.

In this embodiment there are three cameras, camera 1209 directed upward, camera 1210 directed downward, and camera 1211 directed forward. All three cameras provide imaging to the helicopter, either through conductors in parallel with the tether 1005, or by wireless transmission. Operatives in the helicopter may use the images selectively for maneuvering the end effector, and the upward-facing camera 1209 provides a visual coordination between the end effector and the helicopter, for maintaining orientation with the host.

Figure 13:
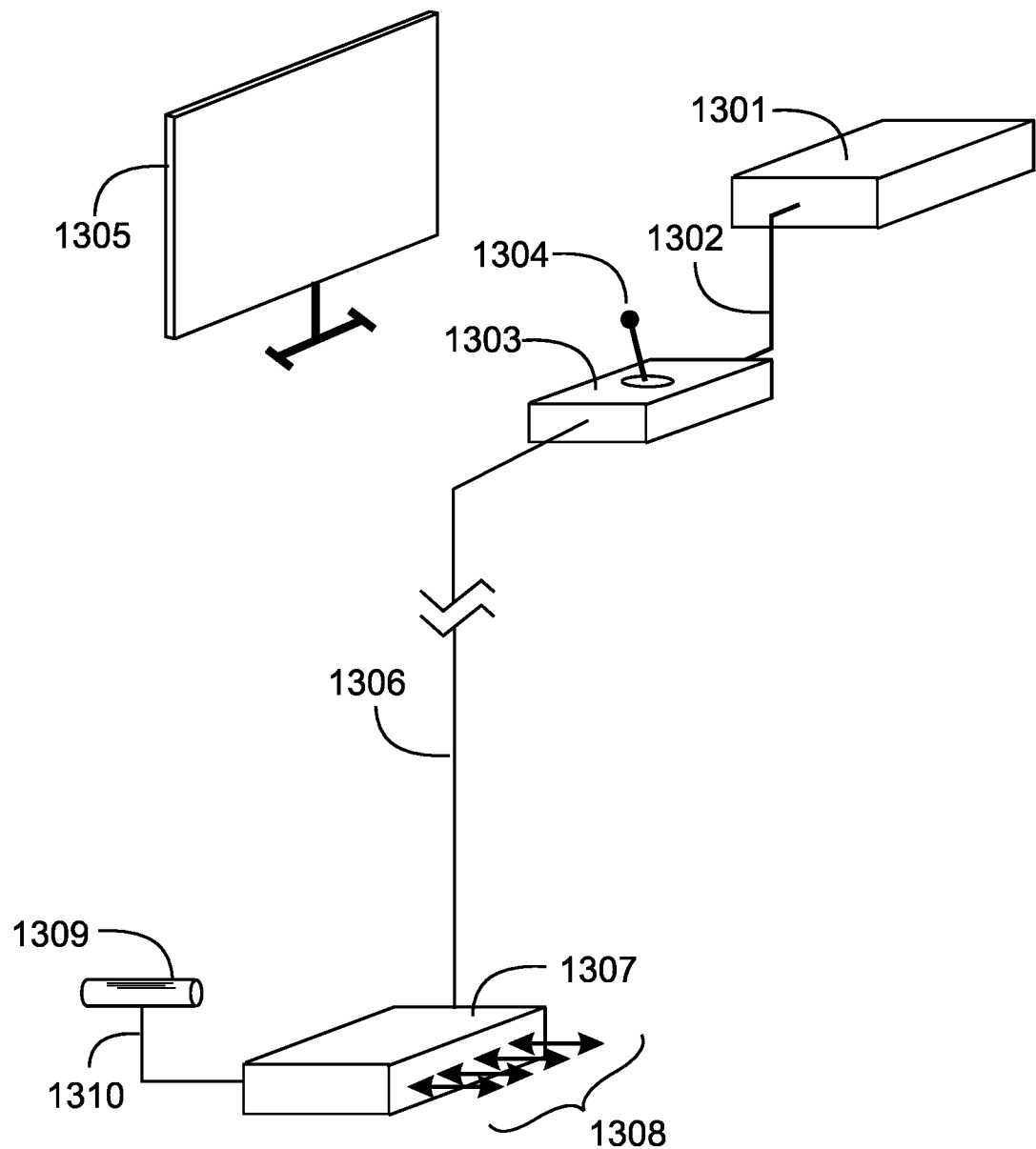
FIG. 13 is a control diagram depicting control apparatus and connections by which an operative in the helicopter may control the end effector in an embodiment of the invention.

FIG. 13 is a control diagram depicting control apparatus and connections by which an operative in the helicopter may control end effector 1006. A power supply 1301 in the helicopter is connected by electric power lines 1302 to a control apparatus 1303 that has physical inputs represented in this example by a control stick 1304. There may be other inputs as well, as needed for commands to control the end effector. Control lines 1306 providing two-way communication with a control apparatus 1307 in the end effector are implemented along with the winch cable 1005 illustrated in FIGS. 10 and 11. Arrows 1308 represent control signaling to motors in an end effector and signals from sensors in the end effector as well.

In one embodiment there may be an imaging device 1309 on the end effector signaling on line 1310 back to control apparatus 1307 and thence via lines 1306 to the apparatus at the helicopter. Imaging signals from device 1309 may be processed and images displayed on monitor 1305 in the helicopter.

Operatives in the helicopter are enabled by the control system depicted in FIG. 13 to lower a rescue harness on the main winch cable, along with end effector 1006. End effector 1006 may be activated to carry the harness, and an operative may use the control inputs in the helicopter, along with images from device 1309 to fly the end effector and deliver the harness to the person on the ledge.

In one embodiment the end effector may have on-board power supply, such as rechargeable batteries for thruster power, but preferably the thrusters may be powered from the helicopter to reduce the weight of the end effector.

Figure 14:
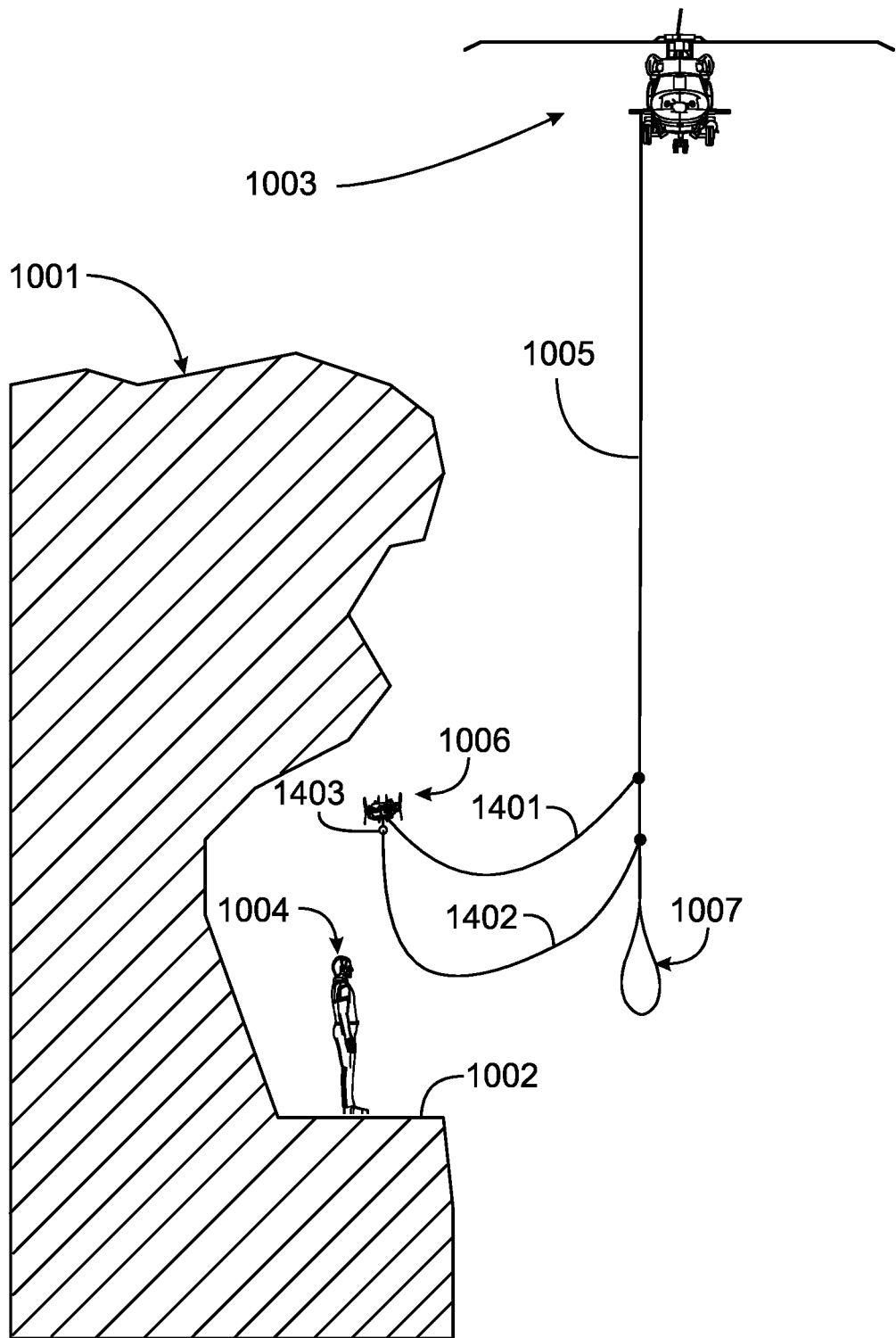
FIG. 14 depicts an alternative embodiment of the invention in which the end effector may be connected to the winch cable by a separate line in an embodiment of the invention.

FIG. 14 depicts an alternative embodiment of the invention in which the end effector may be connected to the winch cable by a side line 1401, carrying the power line and control signaling, and there may be a separate, lightweight tether 1402 connected to the winch cable and to the end effector by a releasable link 1403. An operative in the helicopter may fly the effector 1006 to arrange the lightweight tether 1402 to a position that the person expecting rescue may grab the lightweight tether, which may then be released from the end effector by releasing link 1403. The person on the ledge may then use the lightweight tether 1402 to draw the heavier cable 1005 with the rescue harness close enough to be able to don the harness.

In one embodiment the lightweight tether may also have a communication device with a speaker and a mic by which the person on the ledge may talk directly with an operative in the helicopter.

The skilled person will understand that the descriptions of embodiment are exemplary only, and not limiting, and that implementations of the invention may use any one or a combination of the elements and functions described, and equivalents as well.

Tethered Sensor for Close-Up Investigation and Viewing.

In yet another embodiment of the invention apparatus and functionality is provided whereby operatives in a fixed wing aircraft, having a need to view objects, people, buildings and the like, or anything far below the operating altitude of the aircraft, may get a close-up view. This may be necessary in situations where operations from the ground are not practical or possible. There are known in the art high resolution and powerful imaging devices that may be used in aircraft to capture still or video images of terrain and infrastructure on surface far below. Such imaging apparatus is used in satellites and provide resolved images of objects on the Earth's surface with resolution of a few feet. Nevertheless, it is still true that if the imaging device is substantially closer to the subject objects to be imaged, far better resolution may be obtained.

It is known to the inventor that an object, suspended by a lengthy tether from a fixed wing aircraft, may maintain, at the altitude of the object, a relatively stable fixed position, if the fixed wing aircraft is flying a substantially circular orbit at a speed and at a radius that just compensates for the pendulum motion that the object would exhibit at any moment as tethered to the aircraft. This is simply a problem in mathematics, with the mass of the object known, and the mass physical and nature of the tether known.

Figure 15:
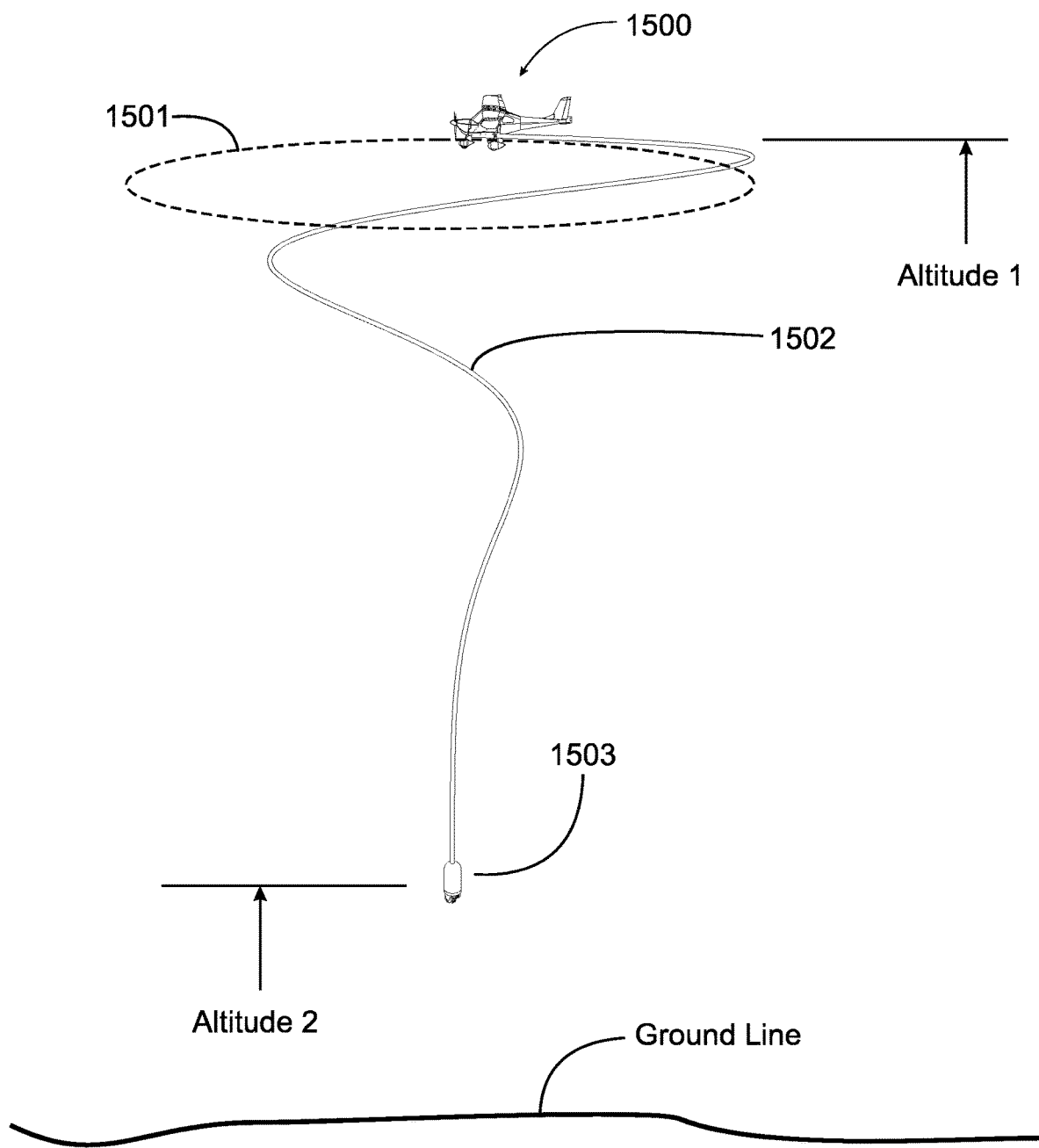
FIG. 15 illustrates an aircraft in orbit trailing a tether and an imaging apparatus in an embodiment of the invention.

FIG. 15 illustrates a fixed wing aircraft 1500 flying in a substantially circular orbit 1501 at an altitude rendered as Altitude 1. The aircraft trails a lengthy tether 1502 having an imaging apparatus 1503 attached at a lower end. Tether 1502 in this circumstance establishes a spiral pattern, and imaging apparatus 1503, depending on the length and nature of the tether, the mass of the imaging apparatus, and the diameter of orbit 1501 may maintain a fixed position in space, at an altitude indicated as Altitude 2.

Altitude 2 may be adjusted by causing the aircraft to spiral slowly upward or downward to a new altitude 1, while still orbiting at the diameter of orbit 1501. Tether 1502 in one embodiment has one or more control lines implemented with the tether that enables an operative in the aircraft to power imaging device 1503 and to manipulate the direction and angle of viewing.

Figure 16:
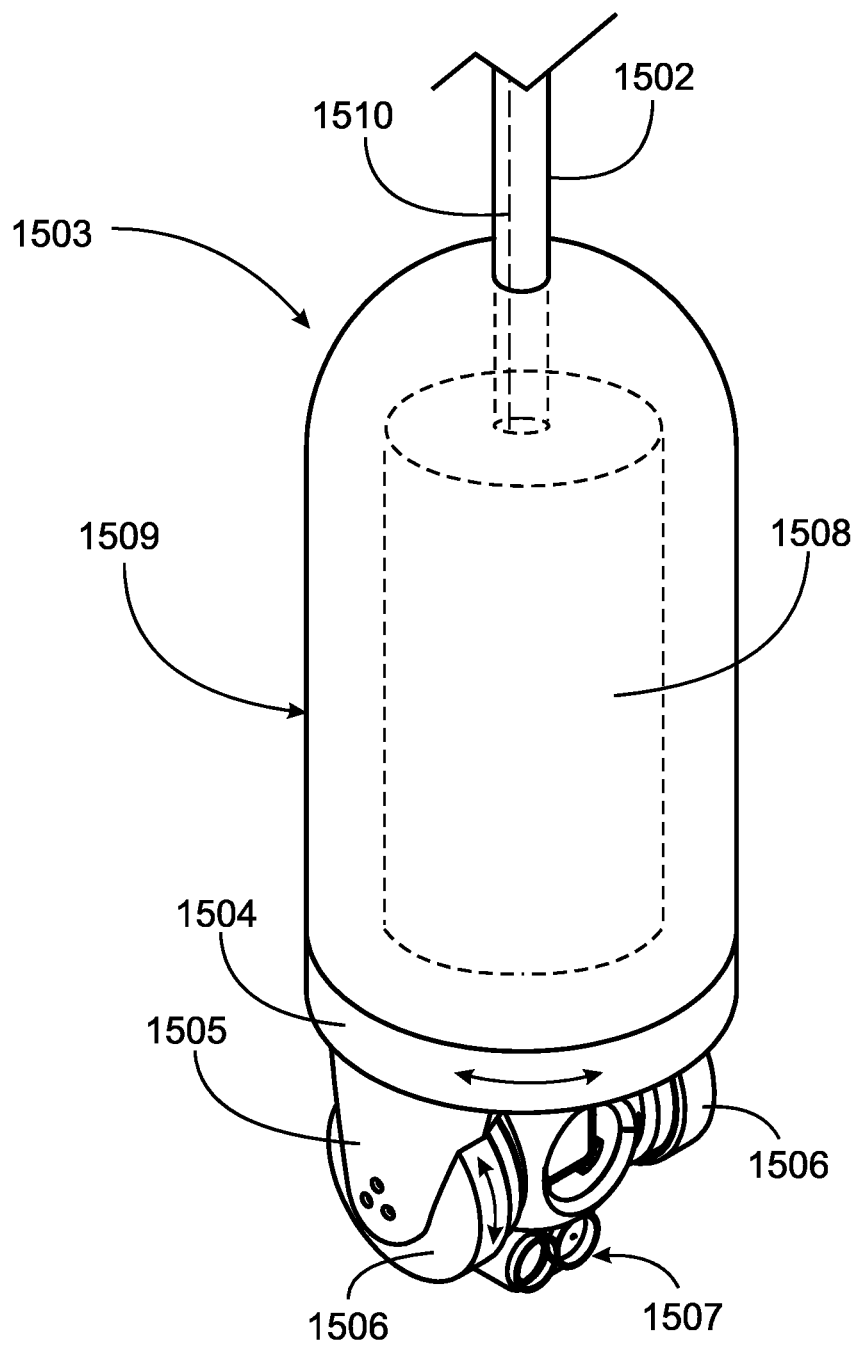
FIG. 16 is an enlarged view of the imaging apparatus from FIG. 15.

FIG. 16 is an enlarged view of imaging device 1503. Device 1503 has a sturdy metal housing 1509 protecting internal circuitry and devices 1508, which may include a power supply, such as a rechargeable battery and computerized circuitry adapted to operate mechanisms adapted to aim and focus the imaging device, and to transmit images to the aircraft above via conductors in the tether. The computerized circuitry is coupled to circuitry in the aircraft through conductors in tether 1502, such as conductor 1510.

A revolving base 1504 may be rotated in either direction to rotate a pair of descending structures 1505 that carry gimbals 1506 that are adapted to tilt cameras 1507 from horizontal to vertical. Mechanisms internal to the device may be operated by electric motors (not shown) that may be commanded from the fixed wing aircraft. An operative may monitor the images from the device in making adjustments for aim and focus, and by rotating and tilting all terrain below the device may be scanned.

The system as described above enables imaging from a vantage better than high above where atmospheric conditions, clouds, ice and obstacles such as buildings, terrain or trees may obscure the subject.

The skilled person will understand that the figures and descriptions are examples only, and that there may be embodiments within the scope of these figures and descriptions that are not described above.

Satellite Refueling

Figure 17:
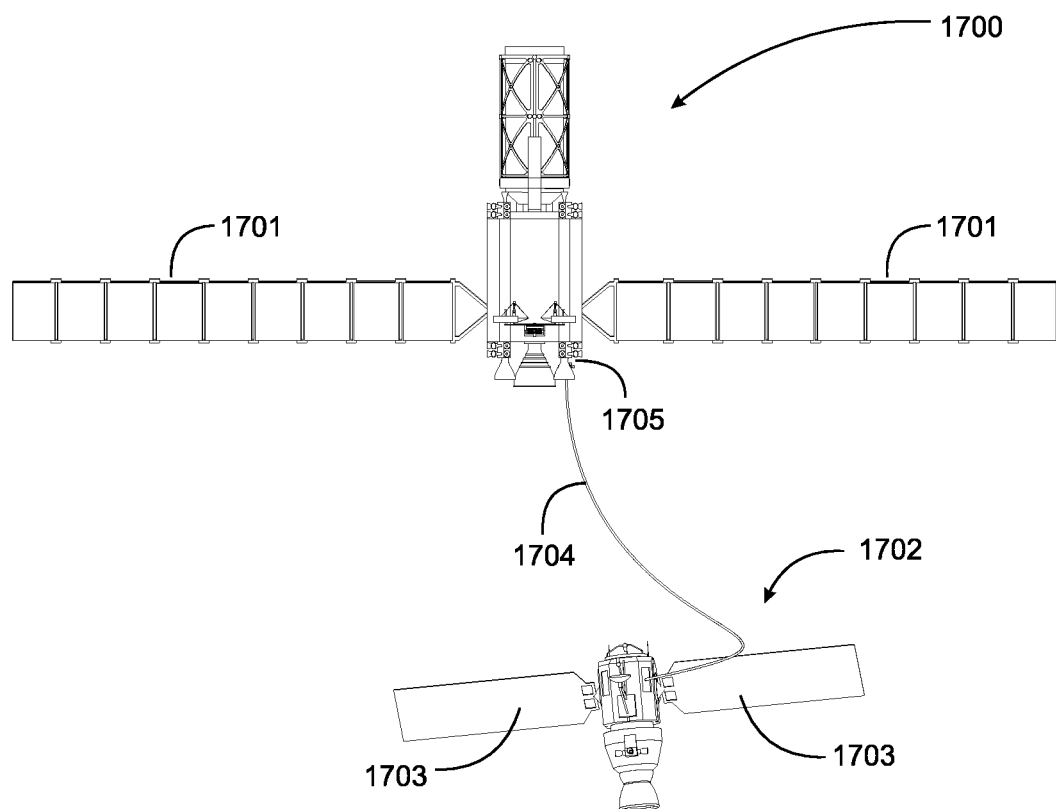
FIG. 17 illustrates a satellite having deployed solar panels being refueled in space in an embodiment of the invention.

In an embodiment of the invention principles of the invention may be applied to refueling satellites in orbit, or spacecraft in a flight path. FIG. 17 illustrates a satellite 1700 having deployed solar panels 1701 being refueled in space by a refueling vehicle 1702, also in the nature of a satellite having deployed solar panels 1703. Vehicle 1702 is inserted by known launch and navigation techniques into a compatible orbit to be proximal to satellite 1700. Vehicle 1702 carries fuel to be transferred to satellite 1700. The fuel is typically liquid but could be vapor, or even in some circumstances, powder.

Vehicle 1702 has a flexible fuel hose 1704 having also communication conductors that permit communication from vehicle 1702 to and from a maneuverable end effector 1705 not clearly seen in FIG. 17. The end effector is at the end of hose 1704, and is maneuverable to seek, find and connect to a refueling port on satellite 1700.

Figure 18:
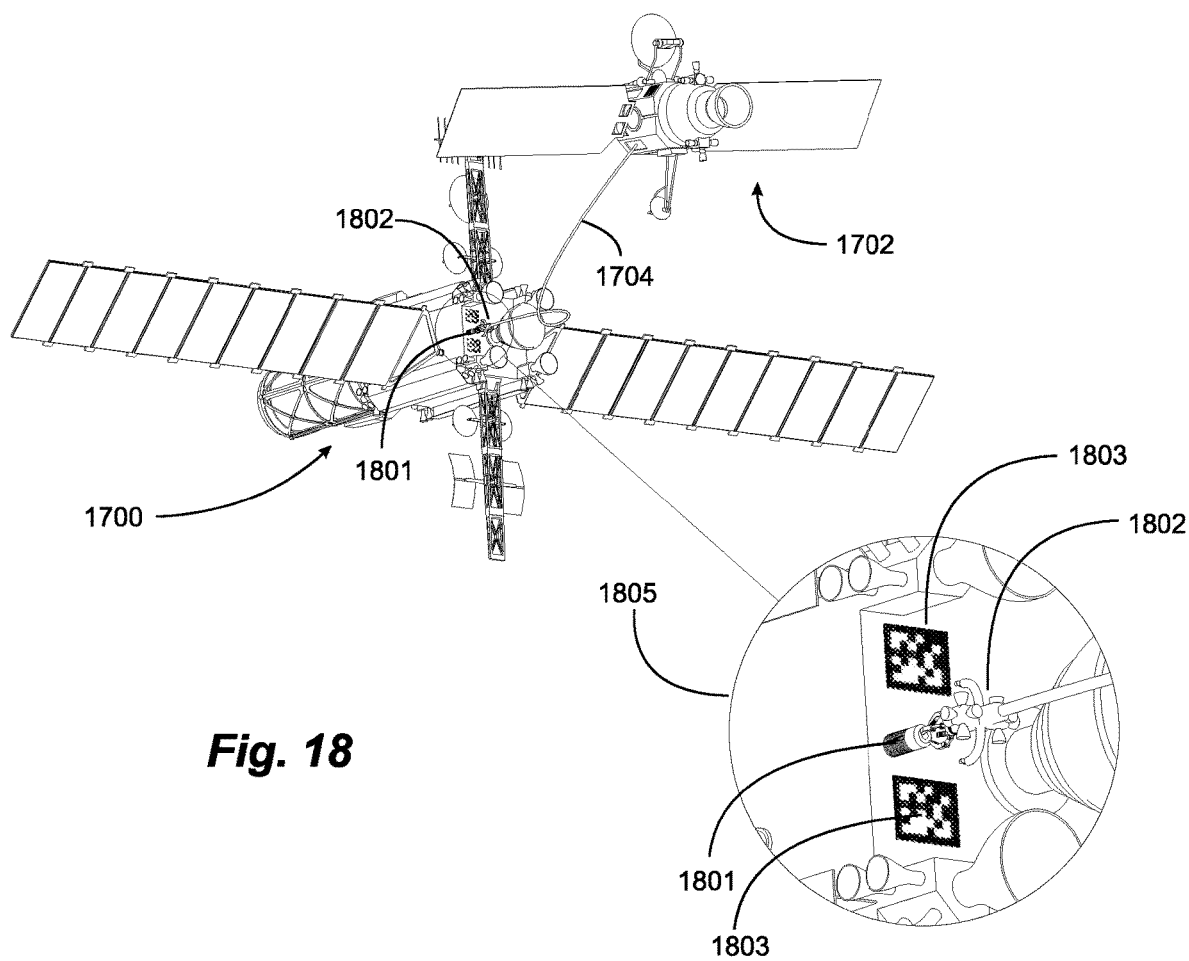
FIG. 18 is an illustration of the satellite and refueling vehicle of FIG. 17 from a different viewpoint, showing additional detail.

FIG. 18 is an illustration of satellite 1700 and refueling vehicle 1702 from a different viewpoint, showing additional detail. In the view of FIG. 18 the refueling port 1801 on the satellite to be refueled is visible, and the end effector 1802 that seeks and connects to the refueling port. An enlarged view 1803 of a portion of the satellite including the refueling port shows the port and end effector in better detail in FIG. 18.

View 1805 shows two indicia, in this embodiment AprilTags 1803 bracketing port 1801. The use and function of AprilTags was described above with reference to FIG. 6. These tags are similar to QR codes, in that they convey a significant quantity of information in a matrix if black and white or color-coded dots or squares. In this application the AprilTags convey information to imaging apparatus in end effector 1802, to guide the end effector in docking at the refueling port 1801.

Figure 19:
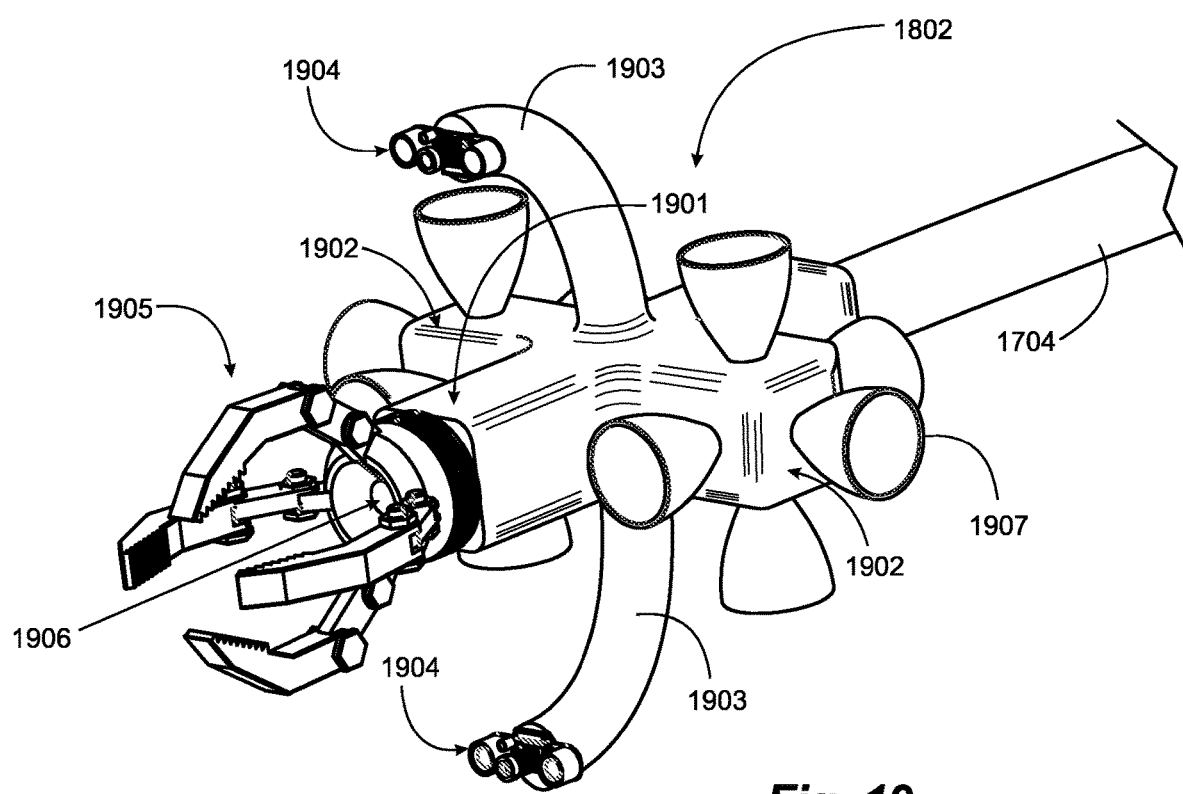
FIG. 19 is an enlarged view of an end effector in an embodiment of the invention.

FIG. 19 is an enlarged view of end effector 1802 in an embodiment of the invention. The end effector has a body 1901 that may be metal or polymer, that houses internal elements including at least computerized circuitry that controls operation of elements of the end effector, and communication with the refueling vehicle. There are in this example two thruster clusters 1902, which in this example each present five thrusters in five directions. The thrusters operate in this example on gas stored in a compartment under pressure and is valved to individual thrusters as needed for navigation.

Two appendages 1903 in this embodiment each terminate in imaging apparatus 1904 that provide a view of the satellite, and in particular the AprilTags as the end effector approaches the refueling port. There is in addition in this embodiment a set of articulated jaws 1905 surrounding the fuel delivery nozzle 1906.

In this case the hose is maneuvered by the array of thrusters to navigate the end of the hose in space. Use of machine vision via imaging apparatus 1904 on the end effector and the AprilTags proximate the refueling port enable precise location data to be provided to the onboard circuitry of the end effector. Jaws 1905 act as fingers to grip and draw the port to the delivery nozzle.

Control of the end effector is by means of a computer in the end effector that communicates with the refueling vehicle with simple commands to keep slack in the tether but more detailed commands to the thrusters to move it. The imaging apparatus on the end effector provide imagery that is processed by machine vision, calculating pitch, roll, yaw and distance from the nozzle by means of the AprilTags stuck on the receiving satellite.

A benefit of connecting with a flexible hose is that the physics of two rigid bodies joined suddenly in orbit is very different and complex compared with two bodies joined with a flexible tether, because the inertias between the two don't communicate well through that flexible structure in either direction if it remains slack. That's why astronauts who are on tethers keep them slack as possible.

Ordnance Delivery

Figure 20:
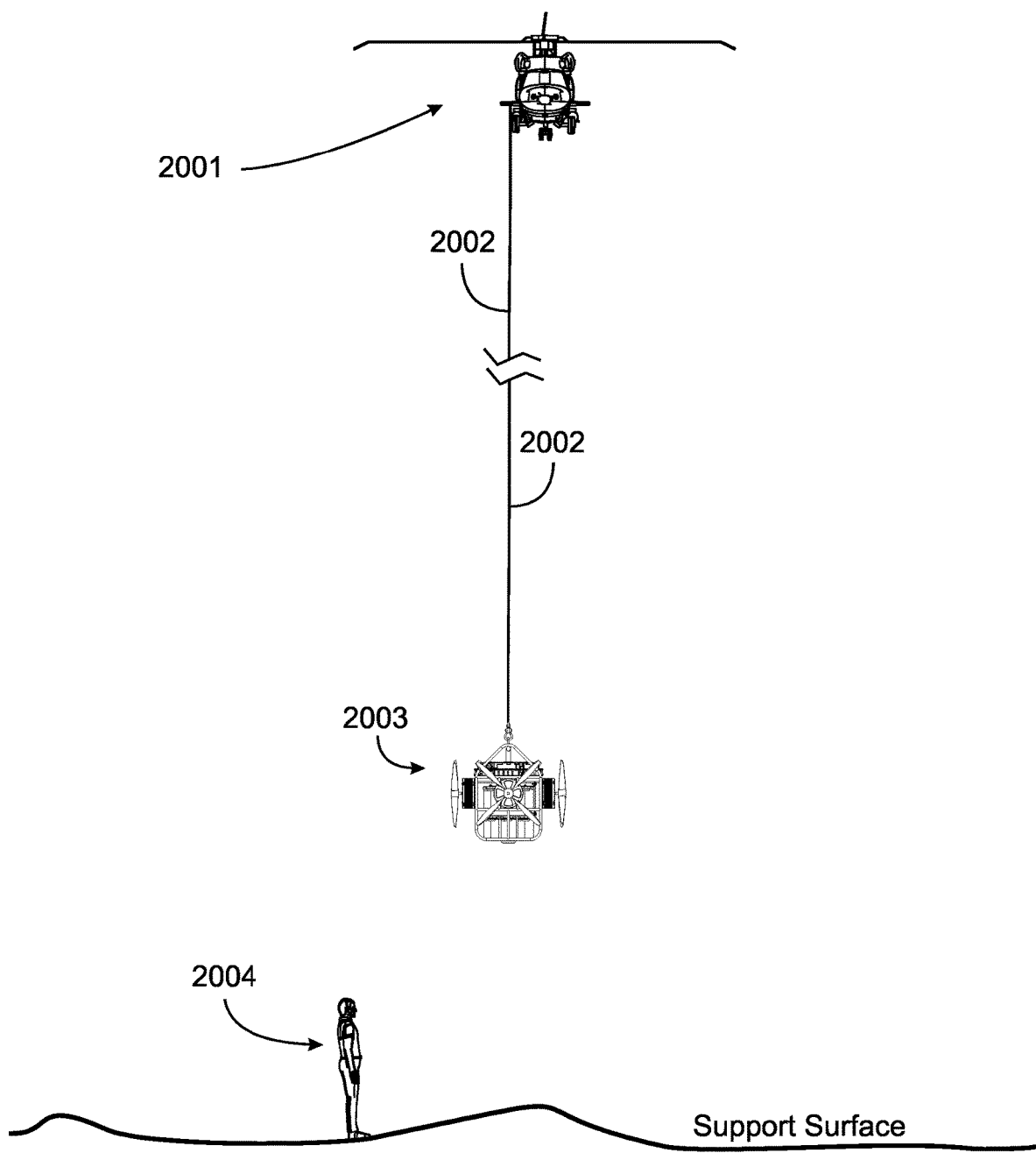
FIG. 20 illustrates a helicopter having a winch cable, suspending an end effector apparatus.

In yet another embodiment of the invention a system for delivery of ordnance close to a target with a winch cable and an end effector is provided. FIG. 20 illustrates a helicopter 2001 having a winch cable 2002, suspending an end effector apparatus 2003 at a lowermost end of the tether. End effector apparatus 2003 has thrusters, in this embodiment propellers driven by DC motors, the thrusters facing in orthogonal directions.

An important motivation for this embodiment of the invention is the fact that releasing ordnance, such as explosive shells, bombs, grenades and the like from a considerable altitude results in compromised accuracy, and the closer the release may be to a target, the more accurate the delivery is likely to be. However, bringing a manned delivery vehicle, such as a helicopter or other aircraft closer to the target increases the likelihood of discovery and counterattack.

It is to be understood that the system is not limited to suspension from a helicopter, as described in this example, but may be implemented from a fixed wing aircraft in an orbit as described above. In the circumstance of FIG. 20, end effector apparatus 2003 is controlled from helicopter 2001 by an operative having access to control apparatus, as also shown in FIG. 13 described above for the circumstance of cliff-side rescue. A potential target 2004 (a person) is illustrated some distance over a support surface, which may be ground or in other circumstances buildings or vehicles, rather than directly below the end effector. Targets may be many and varied. End effector apparatus 2003 is maneuverable to be positioned directly over the target before ordnance is released.

Figure 21:
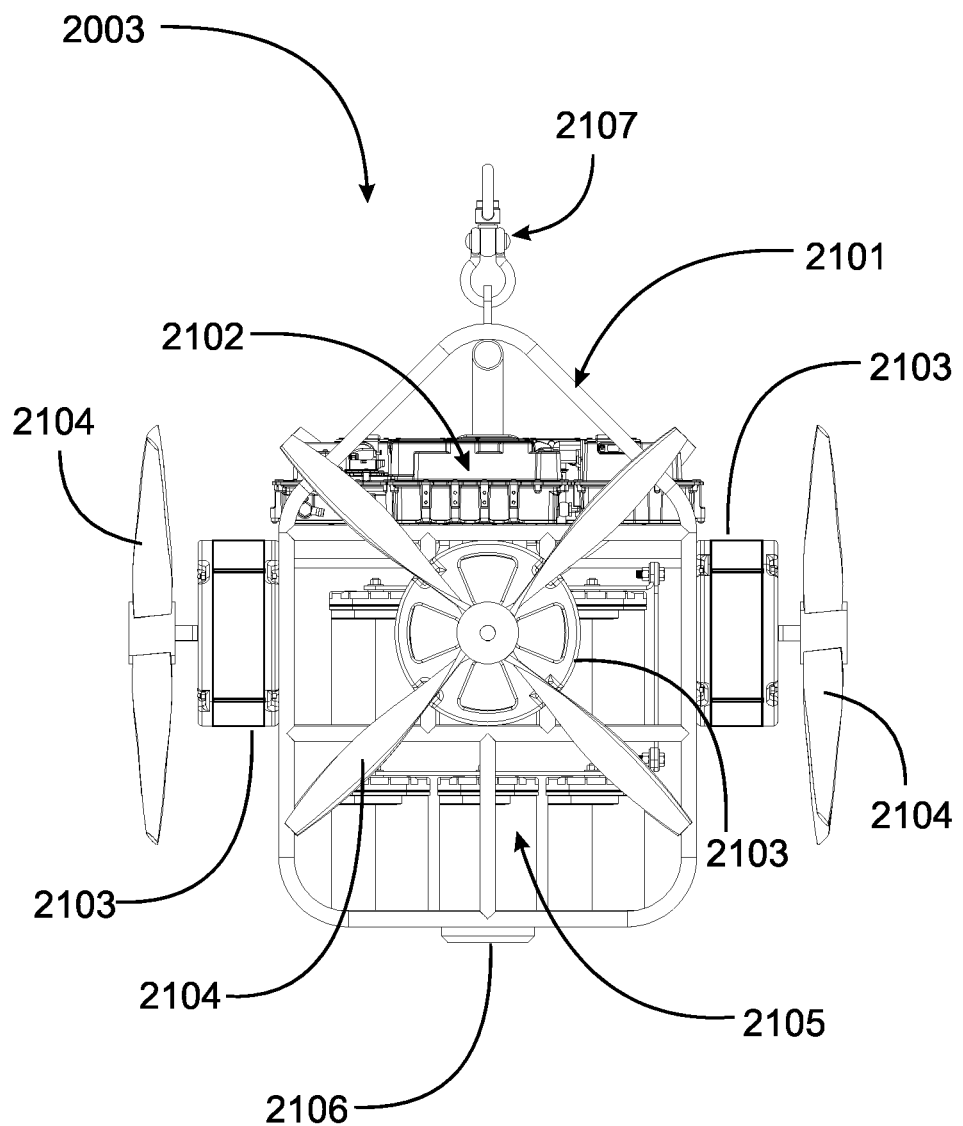
FIG. 21 is an enlarged view of the end effector apparatus of FIG. 20.

FIG. 21 is an enlarged view of end effector apparatus 2003. This end effector in some embodiments is a rather large and heavy apparatus, as ordnance to be delivered may be large and heavy as well. In this example the end effector apparatus has a metal frame 2001 surrounding and supporting internal elements. A region 2102 houses computerized circuitry and control apparatus in this example. The computerized circuitry operates thrusters to position the end effector for delivery of ordnance, and also triggering release of ordnance, either all-at-once or sequentially.

In this example there are four DC motors 2103 driving propellers 2104 as thrusters. The propellers face in orthogonal directions in the horizontal plane. The end effector is suspended at the lowermost end of the cable 2002 by a clevis 2107 such that the apparatus may rotate about a vertical axis.

In this example an ordnance region 2105, with for example delivery tubes for mortar shells surrounds an imaging apparatus 2106. In the gap between the control region 2102 and the magazine region 2105 there may be either a free dangling universal joint with damping struts going to the 4 corners, or a full-on multi-axis gimbal with powered servos to keep the magazine pointed straight down. Gravity is the power source for ordnance delivery. The orientation of the magazine is tracked by the imaging device and control is imposed with a master/slave loop with the master being the magazine orientation and the slave being the stabilizer/positioner.

Each motor 2103 is tied to a direction on a joystick operated in the helicopter. Imaging apparatus 2106 is directed straight down and is aligned with the motors. The orientation is not related to compass direction but rather like looking down through a viewport. Moving the joystick left moves the viewport left because a left motion proportionally turns the motor to the right of the camera. To move diagonally two motors would operate to provide that translation. In this example there are never more than two motors running at the same time.

In one example the propellers are as large as thirty-six inches in diameter. The various ordnance that may be delivers with appropriate magazines are too numerous to all be listed here, but may include such as grenades, leaflets, flechettes, rods, anti-tank missiles and so on. The imaging apparatus deployed in the center of the array may be video, still, color, B/W, UV, IR, and others.

Figure 22A:
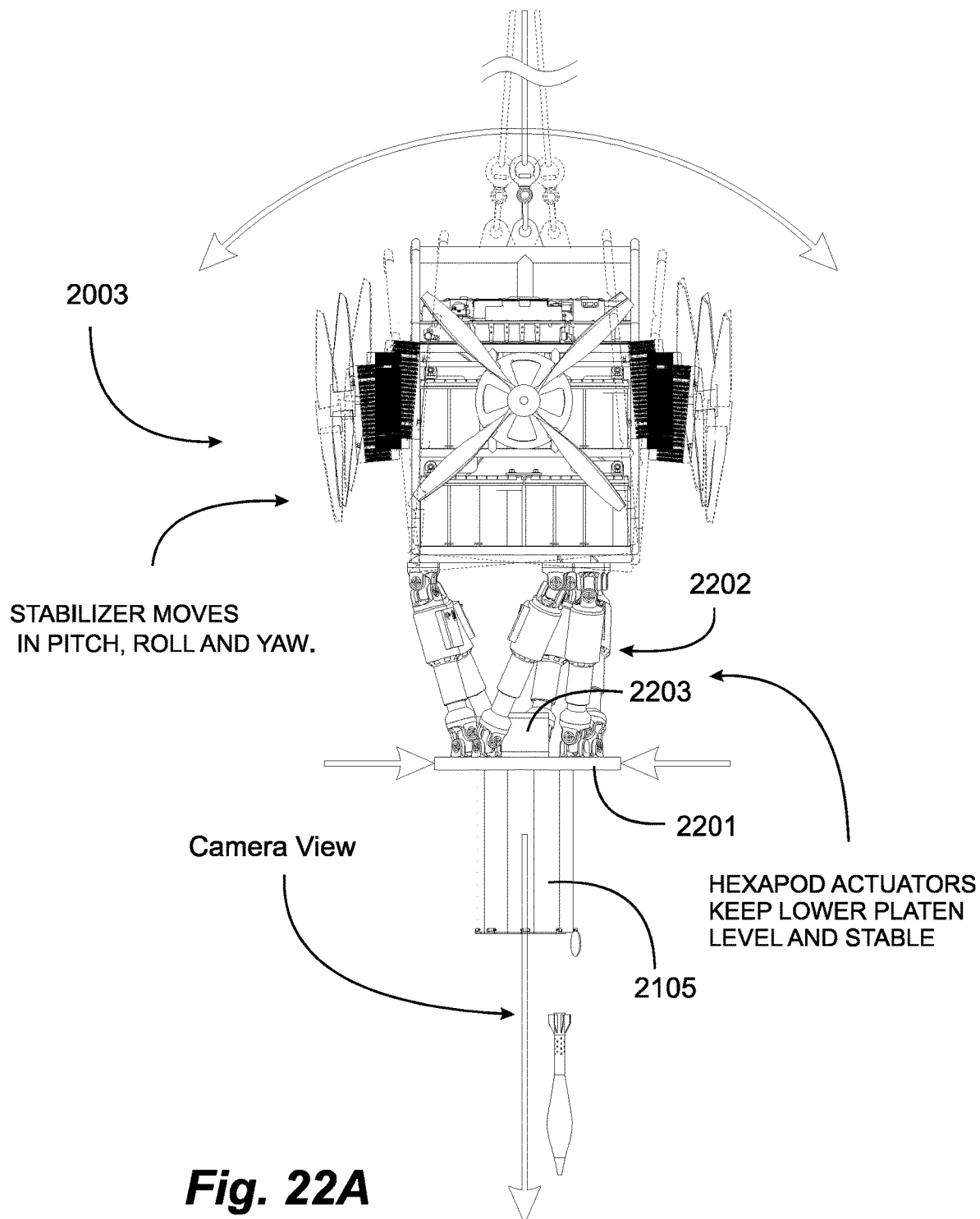
FIG. 22A is another view of the apparatus of FIG. 21, revealing additional detail.

FIG. 22A is another view of apparatus 2003, revealing additional detail. This ordnance dispenser can be tethered from a fixed-wing aircraft using the orbiting tether method described above, or from a helicopter or other hovering aircraft. The dispenser is rigidly attached to a platen 2201 that has a hexapod positioning system 2202 that articulates in 6 degrees of freedom, X-Y-Z and rotate around all three of those axes. It's important that the dispenser be pointed straight down because gravity is unforgiving when it comes to weapons delivery. There is a camera 2203 with a lens that is rigidly attached to the platen so that where the camera points is where the ordnance/munition goes. The camera view is indicated by an arrow. Control of 2003 is rather simple, wherein the operator, whether automatic or manual, is via joystick or other means but coordinated with the image. In other words, if the target is to the left on the screen, the operator pushes the joystick in the direction necessary to move to the target. Operation is not dependent on NS-EW orientation. The orientation is locked to the dispenser and camera.

The thruster box can move in lots of directions in order to track the target. The hexapod uses an autopilot and sensors to keep the barrels of the dispenser pointed straight down.

In operation, operatives in the helicopter 2001 may be informed via remote surveillance of target acquisition and may fly the helicopter to an appropriate location to engage a target. At the location the end effector is lowered on the winch cable, and the image from the image apparatus is acquired. For image acquisition and processing see again FIG. 13 and descriptions of the apparatus of FIG. 13. The operatives then simply maneuver the end effecter and the helicopter in tandem as needed to place the magazine directly over the target. Then the signal is given to release ordnance. Imagery may also be acquired to determine the effect of the release on the target.

Figure 22B:
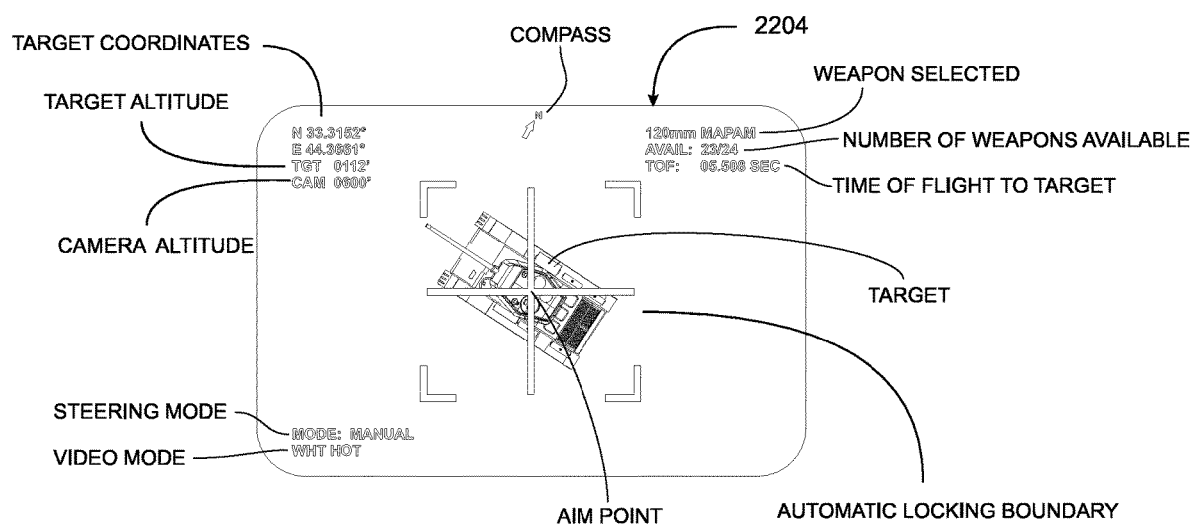
FIG. 22B is an illustration of a display that may be viewed by an operative in an aircraft in an embodiment of the invention.

FIG. 22B is an illustration of a display 2204 that may be viewed by an operative in the aircraft from which the ordnance delivery apparatus is suspended. The image of the target, in this example a tank, is from camera 2203, and there is a locking boundary around the target. Variables are indicated on the screen, including target coordinates, target altitude, camera altitude, weapon selected, number of weapons available, time of flight to target, and the steering mode and video mode that may be engaged at the moment.

The skilled person will understand that the descriptions of the ordnance delivery embodiment are entirely exemplary, and that there are other ways that many of the functions may be accomplished within the scope of the invention.

Fire Bomber Delivery

Fire bombers are a special class of aircraft ranging from single-pilot aircraft up to Boeing 747s. Some helicopters are also engaged in fire-fighting operations. Fire bombers are designed to deliver fire retardant agents such as water, gels and foams either to douse a fire or coat vulnerable areas to prevent the spread of wildfires. Delivering these agents conventionally involves flying directly over an area to be treated which can involve flying low, slow and in less than ideal conditions. Delivery parameters are dependent on the type of agent, but it can be assumed that these aircraft are going to be overflying fires over difficult terrain and through smoke at an altitude that allows visual confirmation by a pilot of the fire target and success of fire-retardant dispersal. Flying at even 500 ft can be demanding especially in mountainous terrain. It would be better if these aircraft could fly higher and on ground tracks offset from the infernos, but still be able to deliver their payloads at lesser altitudes optimized for performance and precision not possible by the tanker itself.

Based on research and flight testing of long-line tethers, the inventor proposes a tethered end effector towed behind a fire bomber, where the tether is a hose and the end effector is a gliding, winged apparatus that maneuvers behind and below the bomber to allow the bomber to fly at higher, safer altitudes and flight paths while still delivering agents directly at the source of a fire.

Figure 23:
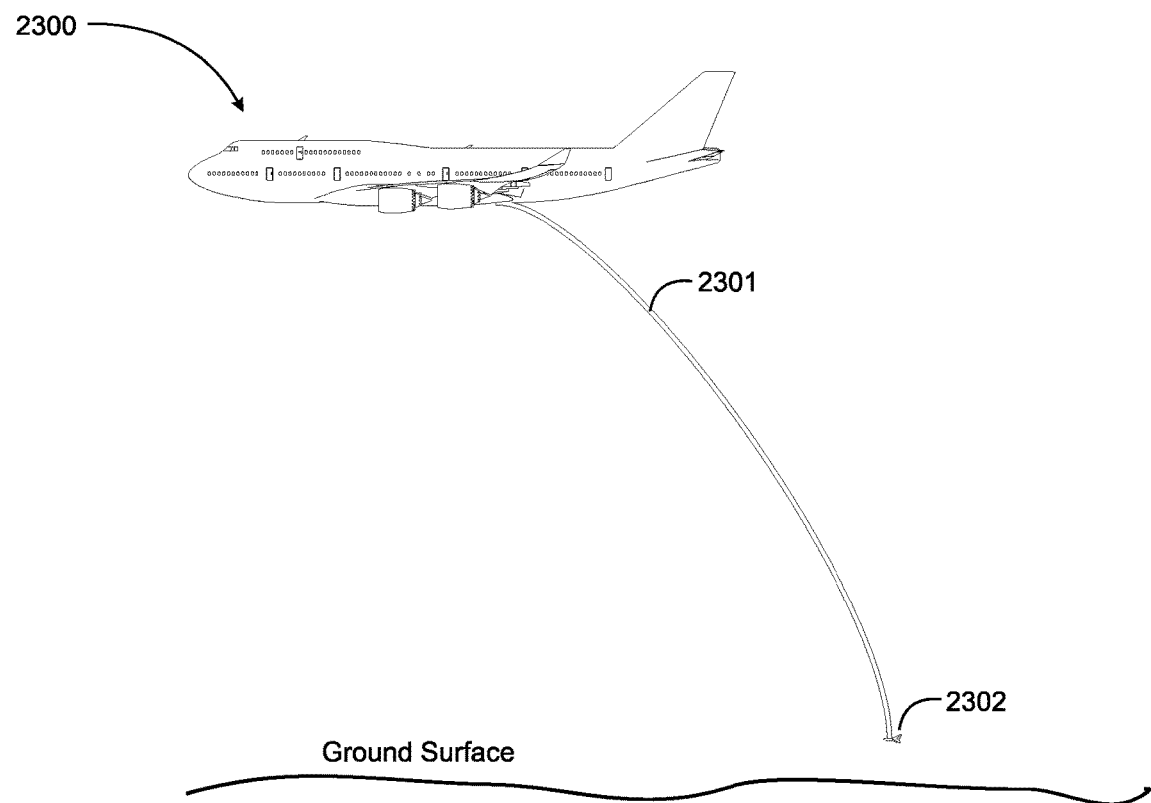
FIG. 23 illustrates a fire bomber trailing a delivery hose.

FIG. 23 illustrates a fire bomber 2300 trailing a delivery hose 2301 having, at a lowermost end, end effector 2302. It may be seen that the altitude of the end effector 2302 may be the altitude that the bomber may have to maintain to have the same effect as the delivery illustrated in FIG. 23, In this embodiment of the invention the bomber may maintain a safe altitude.

Figure 24:
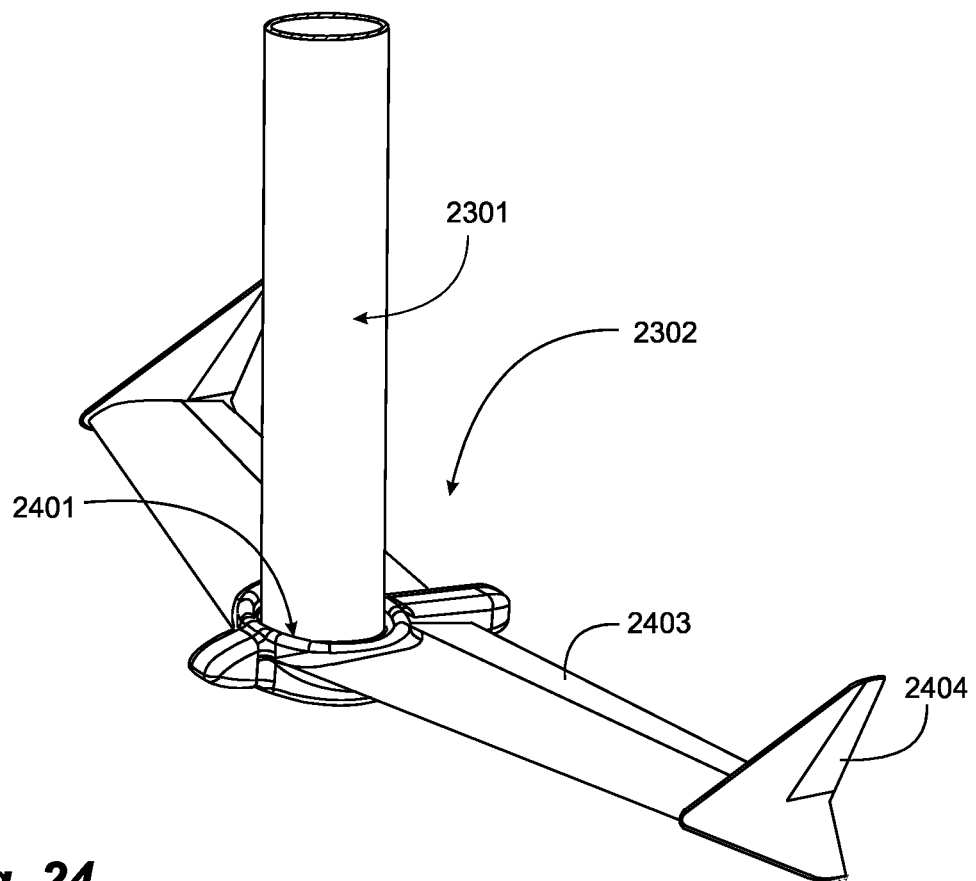
FIG. 24 is an enlarged view of an end effector trailed from the fire bomber of 23.

FIG. 24 is an enlarged view of end effector 2302. Hose 2301 terminates in the end effector in a multi-axis gimbal mechanism 2401, which allows the end effector to pitch, roll and yaw to a limited degree. In the example of FIG. 24 the wingspan of the end-effector is 20 ft. The delivery hose is 2 ft in diameter. The Bomber is 232 ft long with a 211 ft wingspan. The end effector, through movement of rudders 2404, elevators and ailerons 2403 is capable of side to side movement of about 100 ft in this configuration. The gimbal is not powered. It allows the end effector to move freely about its own center of gravity so it can pitch, roll and yaw in order to fly freely, and, in-so-doing, move the nozzle of the chute about to a desired position.

Guidance is provided by either radio control over the flight path by a human operator, automatically by an autopilot with a preselected flight path or autonomously by onboard sensors that fly to hotspots while avoiding terrain by sensors or data onboard the end effectors computers. The end effector has computerized circuitry on board, and wireless communication capability with the fire bomber. In an alternative embodiment there may be a propeller of other means of providing thrust to the end effector to make it more maneuverable.

Figure 25:
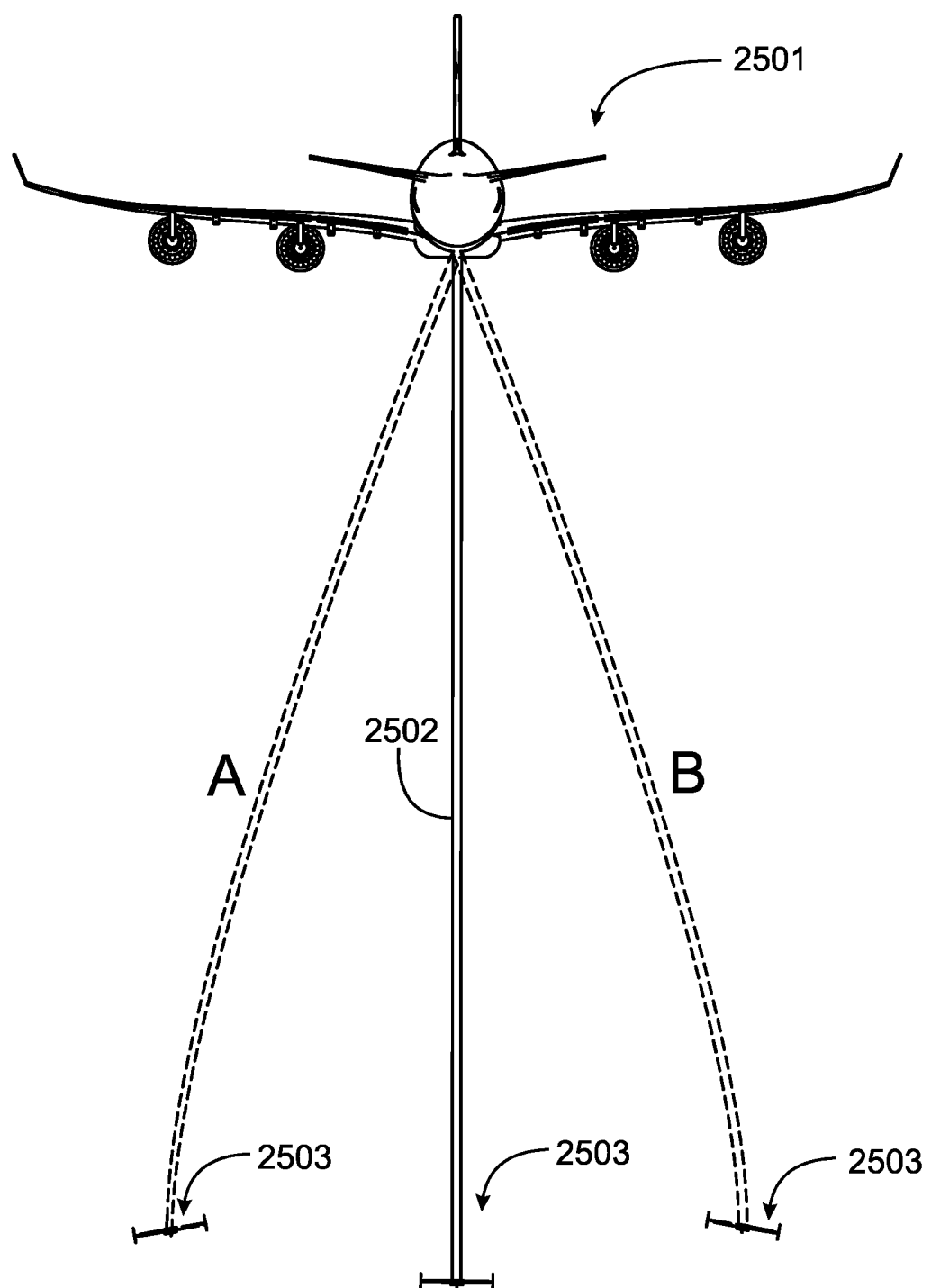
FIG. 25 is an illustration of a fire bomber trailing a hose, having an end effector 2503 at a lowermost end in alternative positions.

FIG. 25 is an illustration of a fire bomber 2501 trailing hose 2502, having an end effector 2503 at a lowermost end. The end effector is seen in a central view trailing directly below the fire bomber. In an alternate circumstance the end effector 2503 is shown in view A moved to one side and in view B moved to the opposite side. This illustrates the magnitude of displacement that the end effector may accomplish to move hose 2502 from side to side.

Figure 26:
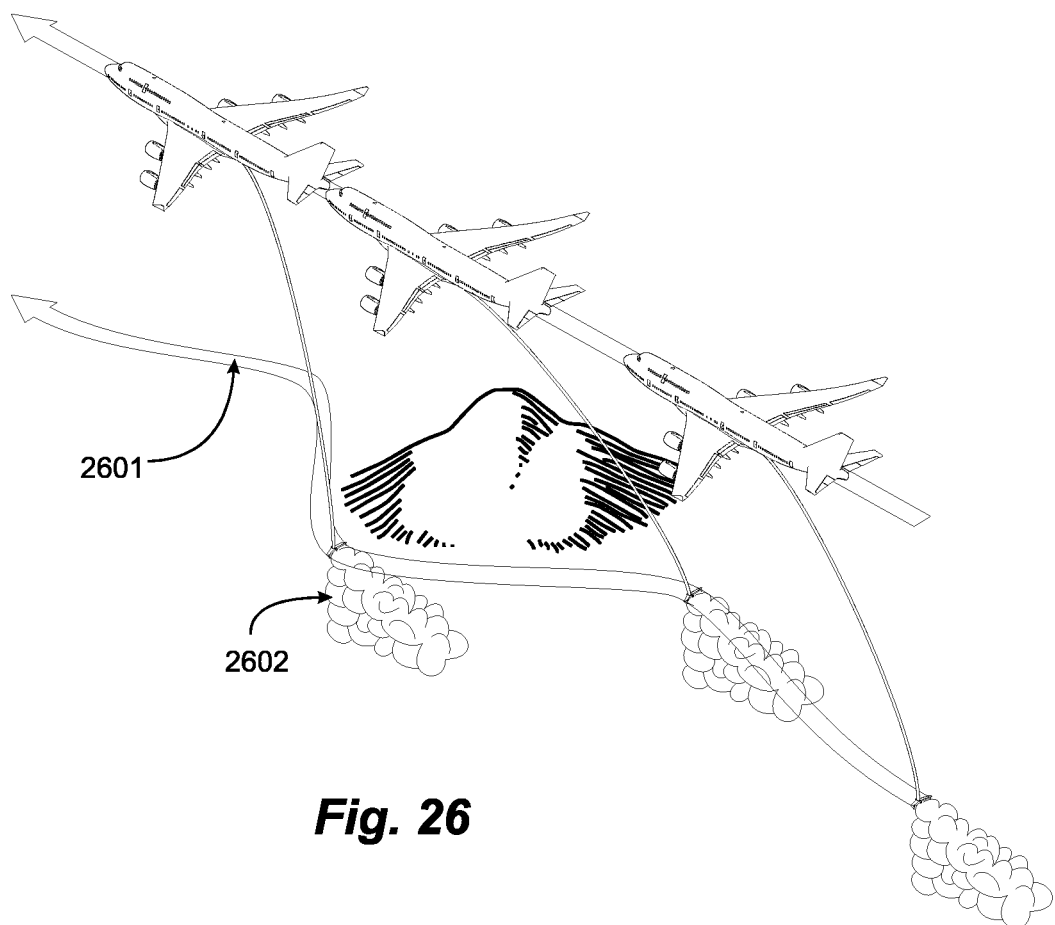
FIG. 26 illustrates a circumstance wherein a fire bomber flies a substantially straight path over a hill and the end effector is controlled to follow a curvilinear path.

FIG. 26 illustrates a circumstance wherein a fire bomber flies a substantially straight path over a hill and the end effector is controlled to follow a curvilinear path 2601. The hose in this example issues a fire retardant 2602. There may be valves and control apparatus in the tanker to start, stop and vary delivery of water or fire retardant.

The skilled person will understand that the figures and description are exemplary, and not limiting to the scope of the invention. There may other apparatus and functionality within the scope of the invention.

High Bandwidth Data Transfer

In yet another embodiment of the invention apparatus and functionality is provided, using a tethered end effector and hard-wired conductors in the tether, to accomplish substantially increased bandwidth in data transfer.

Figure 27:
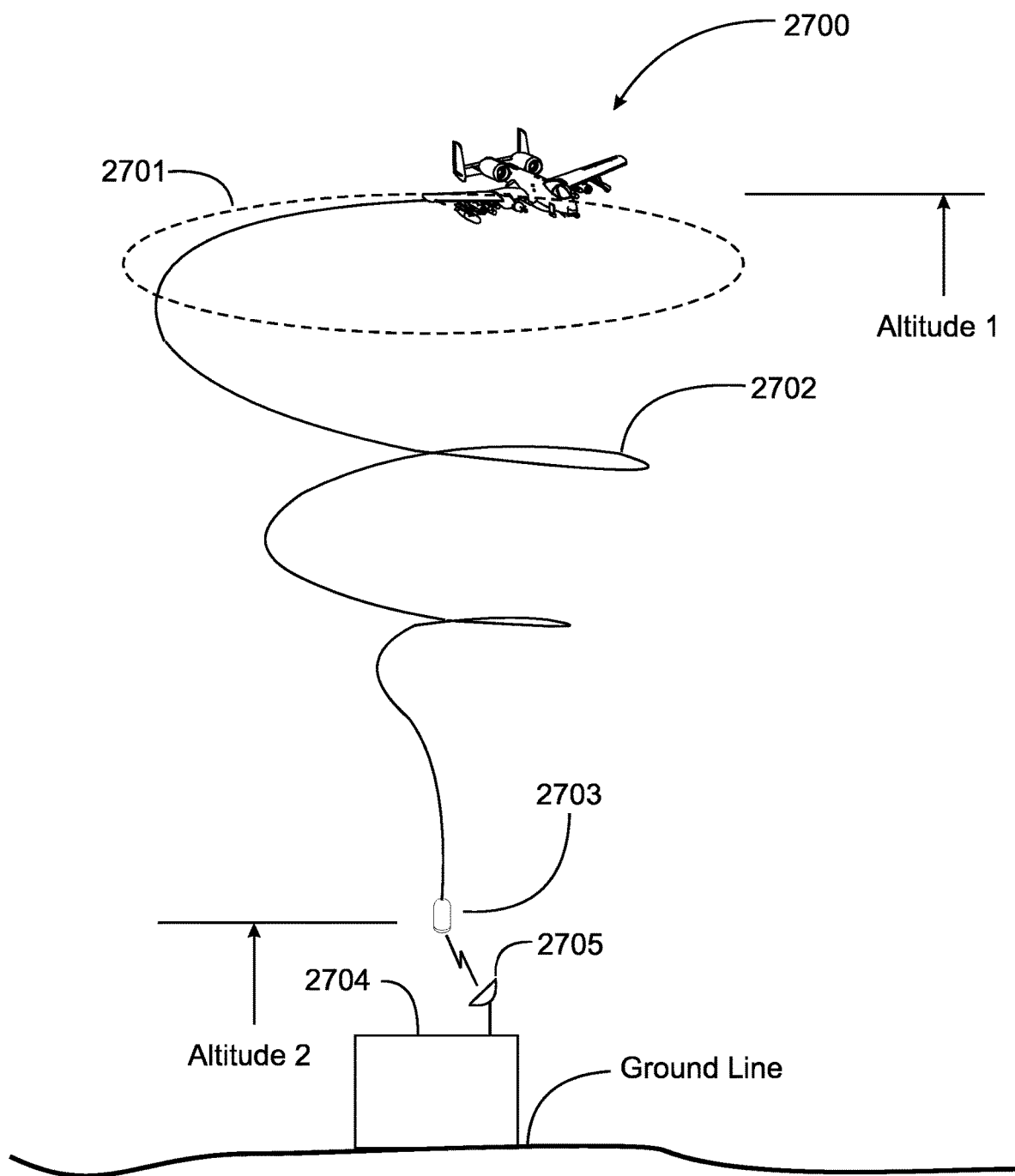
FIG. 27 is an illustration wherein operatives in an aircraft may get images of terrain or structure.

FIG. 27 is an illustration of a circumstance very much like the circumstance illustrated in FIG. 15, wherein operatives in an aircraft may get images of terrain or structure at a very much higher resolution than may be accomplished from an imaging device in the aircraft. In FIG. 27 a fixed wing aircraft 2700 is flying an orbital path 2701 at an altitude 1 and trailing a tether 2702 which describes a spiral descending pattern as described above in other circumstances. A communication pod 2703 is carried at a lowermost end of tether 2702 and maintains a fixed position at an altitude 2.

A receiving station 2704 is located on ground surface and has in this example an antenna 2705. Tether 2702 has one or more conductors between communication apparatus in the aircraft and pod 2703. Pod 2703 comprises wireless communication circuitry compatible with wireless circuitry in station 2704.

In the exemplary circumstance aircraft 2700 has powerful imaging equipment and is returned from a mission imaging perhaps enemy positions and movement. The imaging operations produce a great deal of digital data which is stored in data repositories on the aircraft. In a conventional operation aircraft 2700 may have radio equipment to download the data to a receiving station on ground surface.

It is known that the bandwidth for downloading the data is dependent to some extent on altitude 1. The shorter the transmission distance the higher the bandwidth may be. In this embodiment of the invention the aircraft operators release tether 2702 with pod 2703 and assume the proper orbit diameter and speed to lower pod 2703 to a fixed position proximate station 2704 at altitude 2.

Pod 2703, as mentioned above, comprises wireless communication circuitry compatible with wireless circuitry in station 2704, and this circuitry is connected through the conductors in the tether with data repositories and transmission circuitry in the aircraft.

When pod 2703 reaches its fixed position proximal station 2704 the wireless circuitry in the pod connects with the compatible wireless circuitry in station 2704, and data is transferred from the data repository in the aircraft to the pod and then to the station at whatever data rate the pod may maintain with antenna 2705 and station 2704. The data transfer rate may be far greater and more secure than may be accomplished from wireless circuitry in the aircraft, itself Helicopter Winch Cable Stabilizer Winch cables from helicopters are well-known in the art and are used for land and sea rescue operations. A rather serious unmet need in the use of such winches and cables is that movement of the helicopter when the cable is extended, and also prevailing wind may cause swinging of the cable and whatever load may be suspended by the cable.

Figure 28:
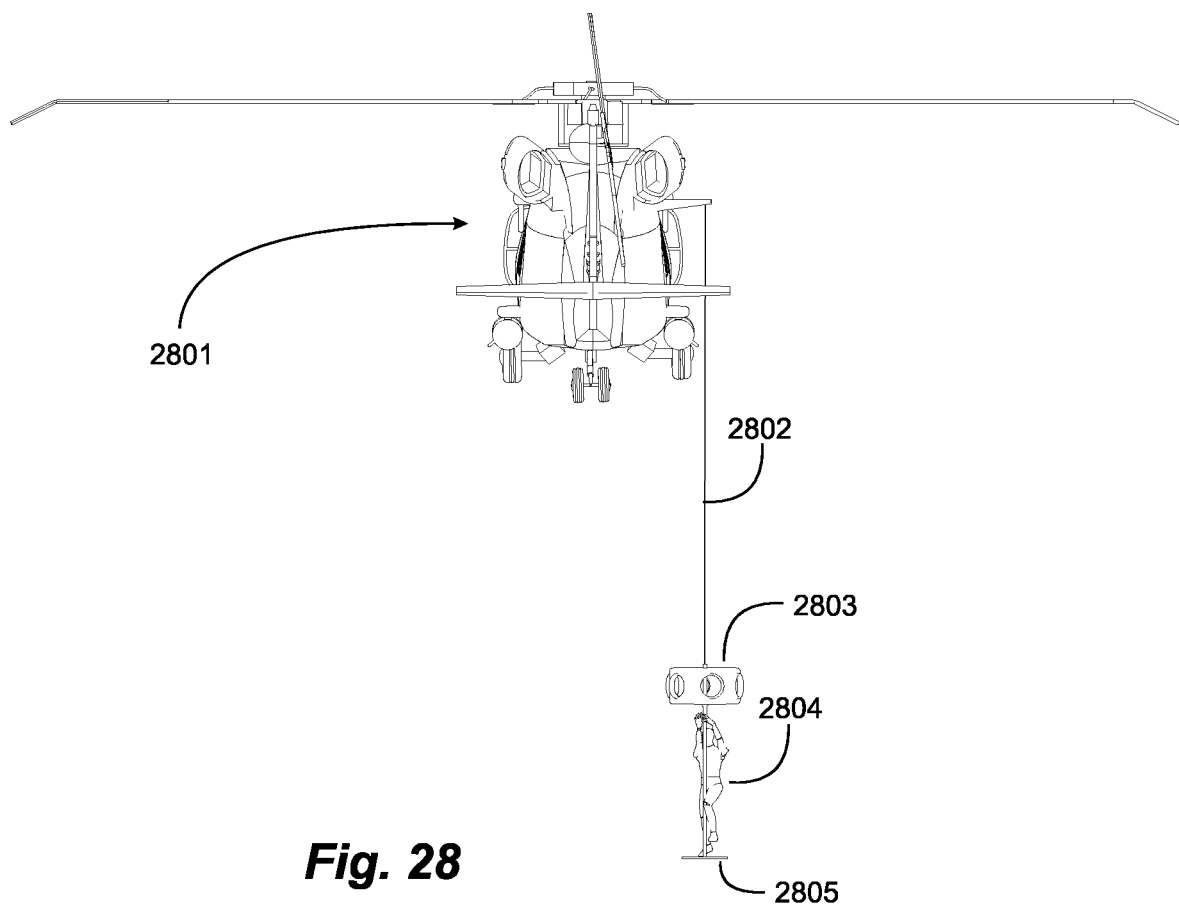
FIG. 28 illustrates a helicopter suspending a winch cable having a platform.

FIG. 28 illustrates a helicopter 2801 suspending a winch cable 2802 having a platform 2805 upon which a subject 2804 is standing, grasping the winch cable. There is a powered end effector 2803 joined to the winch cable just above the position of the subject person on the platform. A purpose of end effector 2803 is to minimize and eliminate swinging of the subject. The end effector in this example has an array of thrusters pointed outward and normal to the winch cable axis. With the thrusters properly controlled, this solves the problem of the pendulum effect of the weighted cable hanging from the helicopter.

Figure 29:
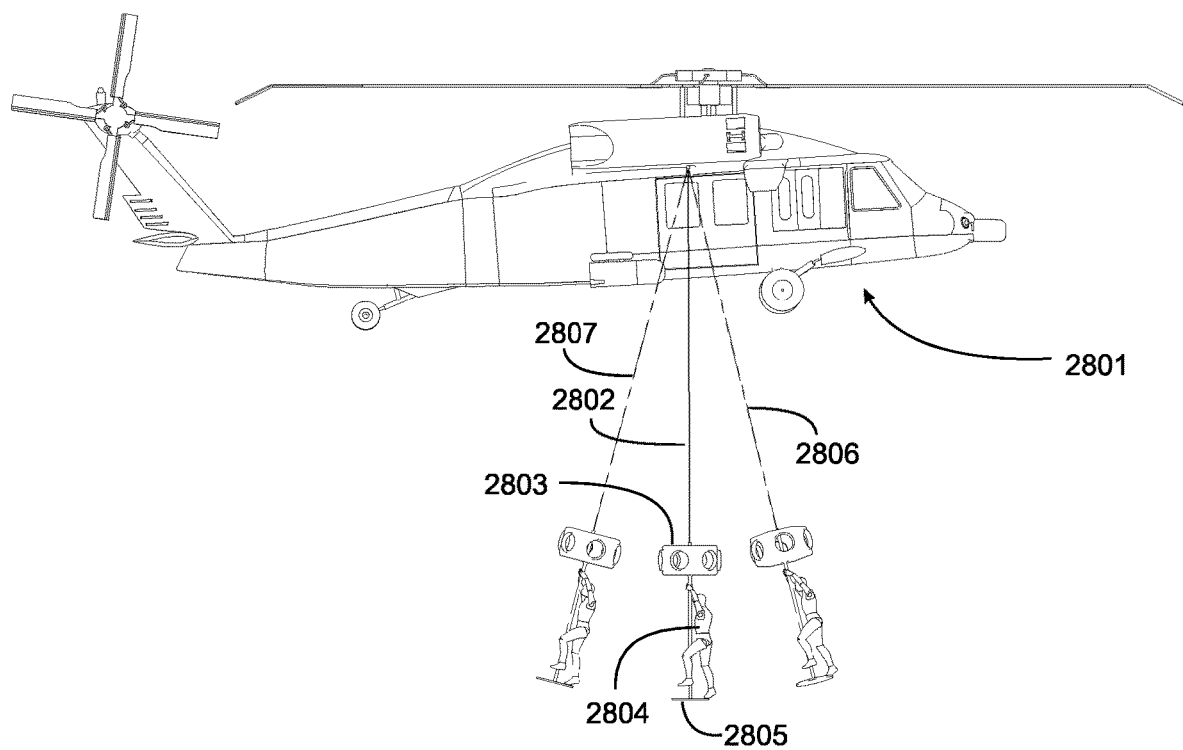
FIG. 29 illustrates a circumstance wherein a combination of forces has caused a load at the end of a winch cable to swing.

FIG. 29 illustrates a circumstance wherein a combination of forces, such as movement of the helicopter and wind, has caused the load at the end of the winch cable to swing. Broken lines 2806 and 2807 represent magnitude of swing of the winch cable in this circumstance.

In an embodiment of the invention the thrusters of the end effector automatically push air and hence a reaction force opposite the direction of swing. The thrusters are variably controlled in one embodiment by a system that comprises an imaging apparatus incorporated on an upper portion of end effector 2803, the imaging unit focused upward on a specific point on underside of the helicopter. Control circuitry in the end effector controls the thrusters to urge the end effector opposite any sensed movement of the end effector from vertical.

Figure 30A:
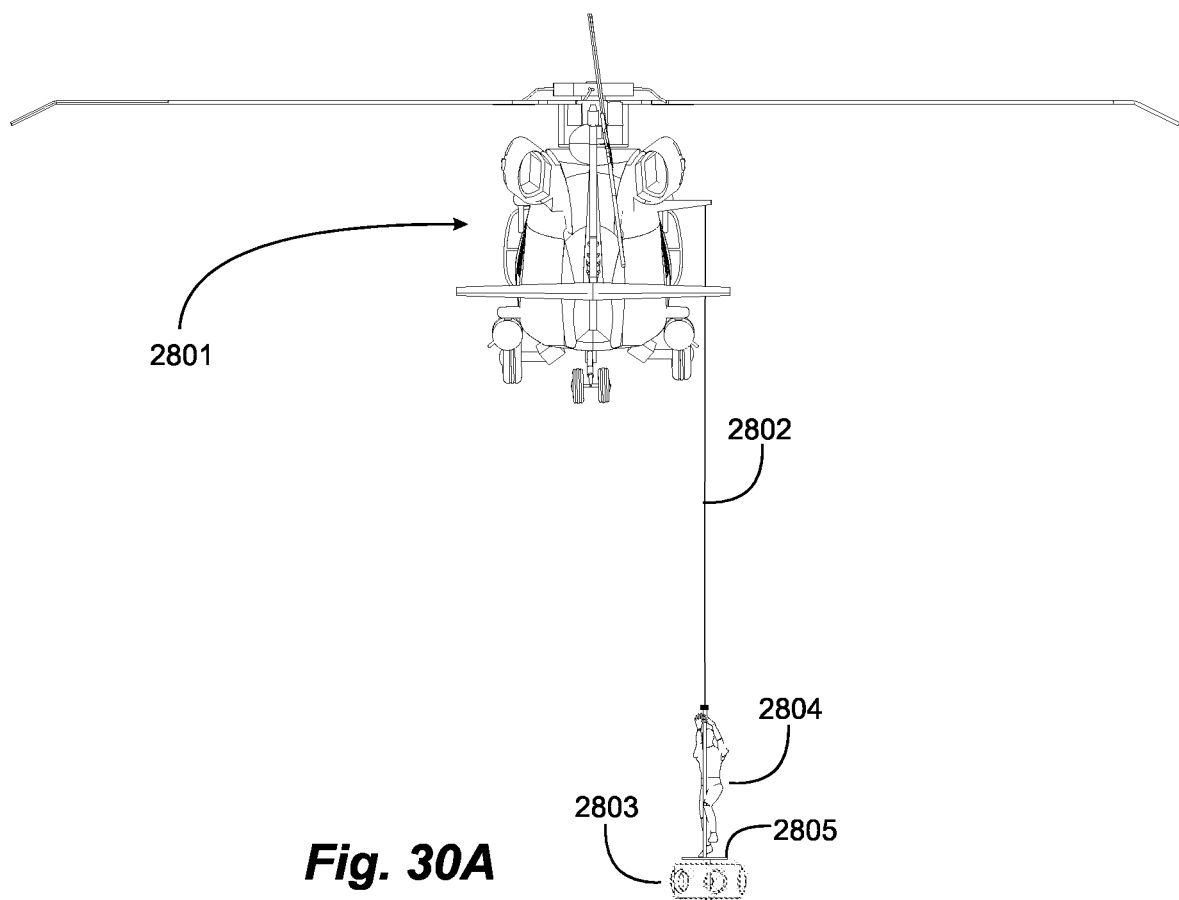
FIG. 30A illustrates a view of the end effector with the platform above the end effector.
Figure 30B:
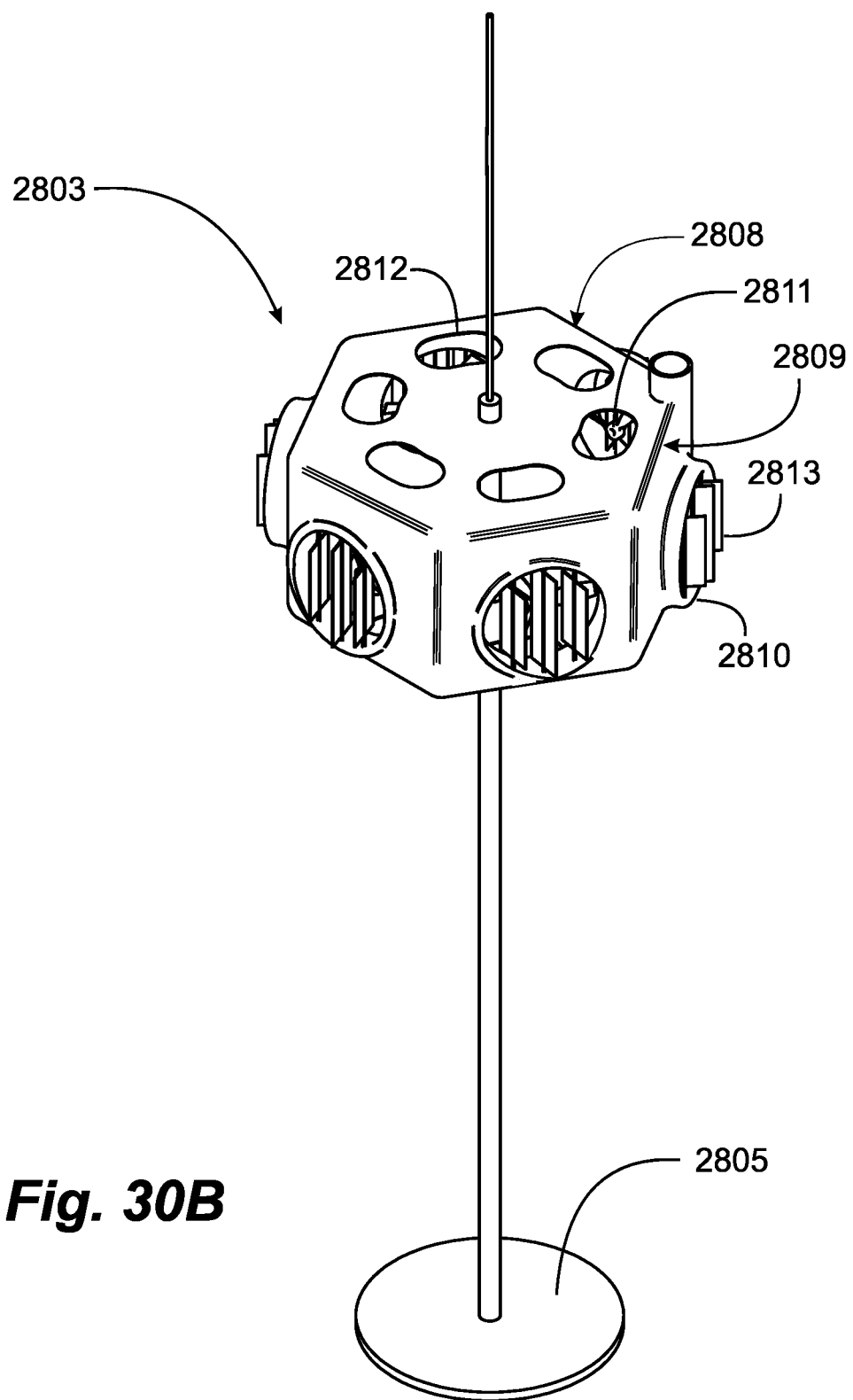
FIG. 30B illustrates a circumstance with an end effector below the platform.

End effector 2803 in this example is not the same as other end effectors thus far described. End effector 2803 is illustrated in FIG. 30B. End effector 2803 has a body 2808 implemented in a hexagonal configuration with six faces 2809. Body 2808 has openings through a top surface to allow air into the body which is expelled through each of six openings 2810 in the six faces. Six fans 2811, one for each face, draw air in and expel the air through the openings to provide thrust. Louvres 2813 are controllable to direct the expelled air in different directions. Turning all the louvres in the same way provides rotational thrust on the end effector.

In one embodiment end effector 2803 further comprises anti-rotational thrusters, and sensing apparatus in the computerized control circuitry to sense rotation about the vertical axis, and to control the anti-rotational thrusters to dampen and eliminate rotation about the vertical axis.

In an alternative embodiment of the invention for winch cable stabilization, the end effector is incorporated below the platform on which the subject stands, providing better leverage, and also affording a bigger platform for a subject. FIG. 30A illustrates this example, with end effector 2803 below platform 2805.

The skilled person will understand that the apparatus and functionality may take other forms within the scope of the invention, as the figures and description here are exemplary. For example, end effector 2803 may also have roller/grabber mechanisms enabling translation up and down the winch cable.

Helicopter Refueling

In one embodiment of the invention an end effector on a refueling hose from a helicopter or other aircraft enable to hover, is used to connect to a fuel source, such as a seagoing vessel that has no landing pad for a helicopter.

Figure 31:
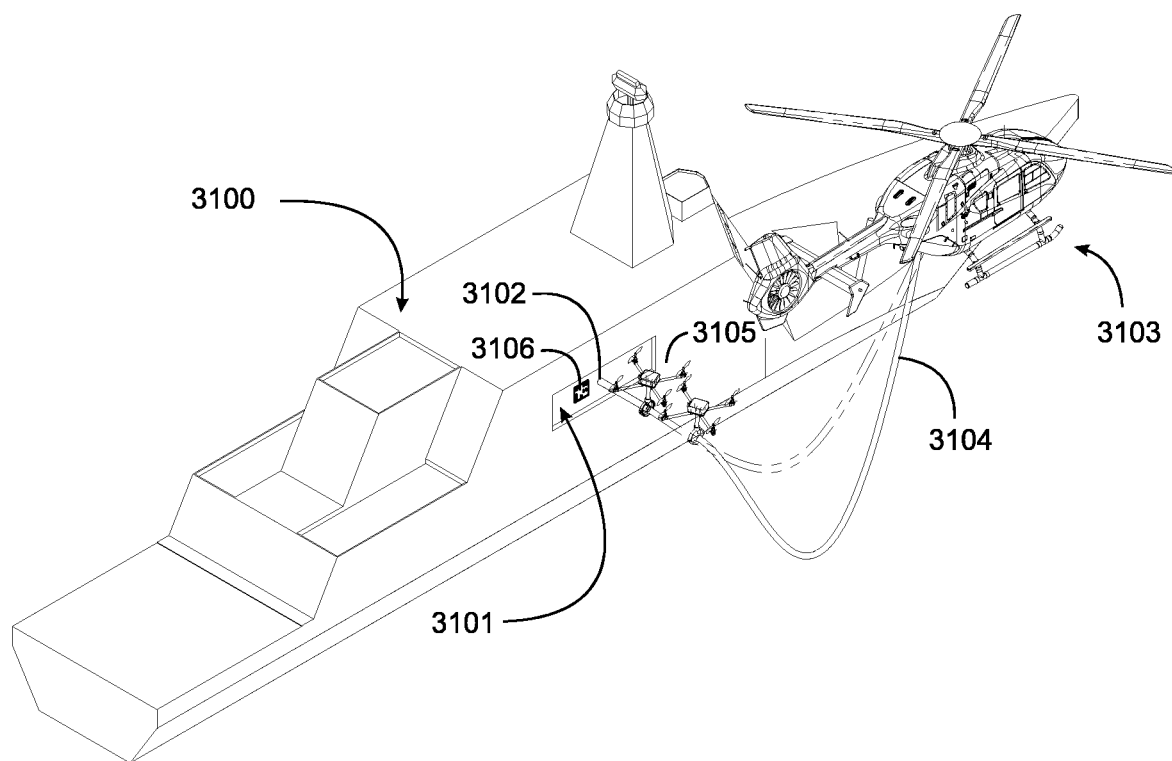
FIG. 31 is a perspective view of a seagoing vessel refuel system that is not equipped for accommodating a helicopter to land on the vessel.

FIG. 31 is a perspective view of a seagoing vessel 3100 that is not equipped for accommodating a helicopter to land on the vessel. Vessel 3100, however, has in this example, a refueling panel 3101 with a port 3102 that may be connected to a refueling hose from a helicopter. In this example a helicopter 3103 is equipped to extend a refueling hose 3104 with an end effector 3105, in this example a quad drone, the end effector connected to the hose 3104 at an end having a nozzle compatible with port 3102.

End effector 3105 has an imaging device as shown and described in previous figures, and panel 3101 has at least one AprilTag 3106, which the imaging device may access to determine distance and alignment for the nozzle and the port that are to be connected. In this example the end effector may have computerized circuitry to automatically seek, find and connect to the port on panel 3101. In another embodiment images from the imaging device may be transmitted through conductors in parallel with the hose, to control equipment in the helicopter, where an operative may control the end effector to seek, find and connect. Once the nozzle at the end of the hose is connected to the port at panel 3101, fuel may begin to flow through the hose from the vessel to fuel tanks of the helicopter 3103.

In one embodiment the end effector may be more of the order of end effector 1802 illustrated in detail in FIG. 19, having dual imaging devices and a grasping mechanism for pulling the nozzle into the refueling port, and assuring the connection.

The skilled person will understand that the figures and description provided here are exemplary, and that the apparatus and functionality may vary within the scope of the invention.

In an alternative embodiment the refueling system might be implemented for ship-to-ship refueling, in a situation where one ship has a deployable tether with a maneuverable end effector, and two ships may be connected for a refueling event. Once the connection is made the refueling might occur in either direction.

Tanker Boom Control

It is well-known that aircraft refueling is in many cases conventionally accomplished by a tanker with a rigid and extendable boom, that may be extended, retracted and angled up, down and sideways to mate with a refueling port on a receiving aircraft. In the conventional apparatus and operation there is typically an imaging device (camera) on the refueling aircraft viewing back toward the boom, by which an operator in the aircraft in control of the boom may view and control the boom to mate with the receiving port.

Figure 32:
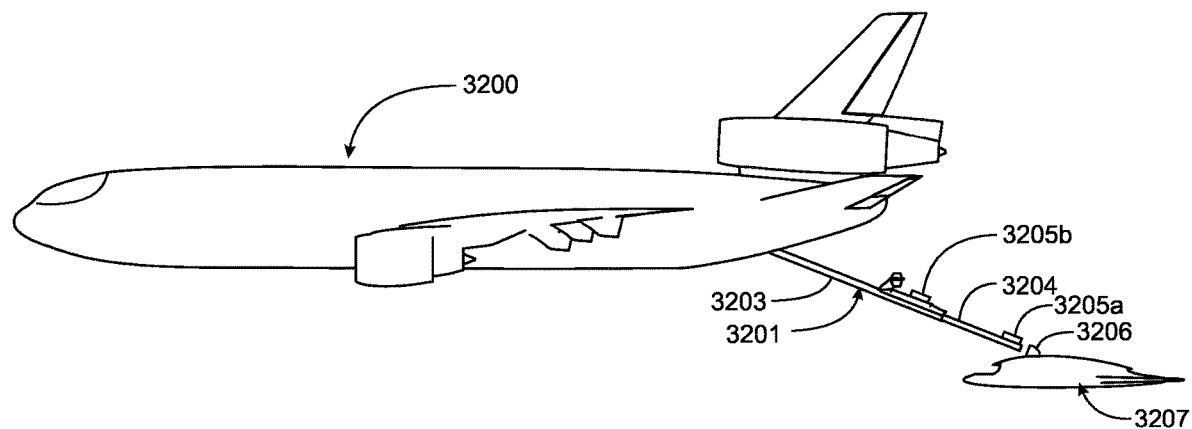
FIG. 32 is an illustration of a refueling aircraft trailing a rigid extendable boom.

FIG. 32 is an illustration of a refueling aircraft 3200, trailing a rigid extendable boom 3201, that has a fixed portion 3203 and an extendible portion 3204. In this example there is an imaging device 3205 near the end of the extendable portion of the boom. The imaging device transmits images back to an operative in the refueling aircraft through conductors implemented in or on the boom. Images from device 3205, being much closer to the eventual target than an imaging device in the refueling aircraft, as in the conventional art, are much more useful for fine manipulation and correction, and result in more rapid and secure operation.

In another embodiment the imaging device is located on the rigid, non-telescoping part of the boom 3203, and still provides a closer and more advantageous operation than in the conventional art.

The skilled person will understand that the figures and description provided here are exemplary, and that the apparatus and functionality may vary within the scope of the invention.

Smart Fire Hose

The inventor has considered many and varied applications for powered end effectors, as is evident by the descriptions of disparate systems above. One such application is in delivering water or other fire retardant to fight fires in ground structures, such as residences, office structures, apartment buildings and the like.

It is well known that taking a firehose into a burning building is a very dangerous endeavor. If there were a way to get a fire hose into a developing active fire, and to train a nozzle of that hose in a way to deliver water or retardant of another sort, without a fireman or woman having to be exposed to flames and falling debris, it should be a very useful apparatus and system.

Figure 33A:
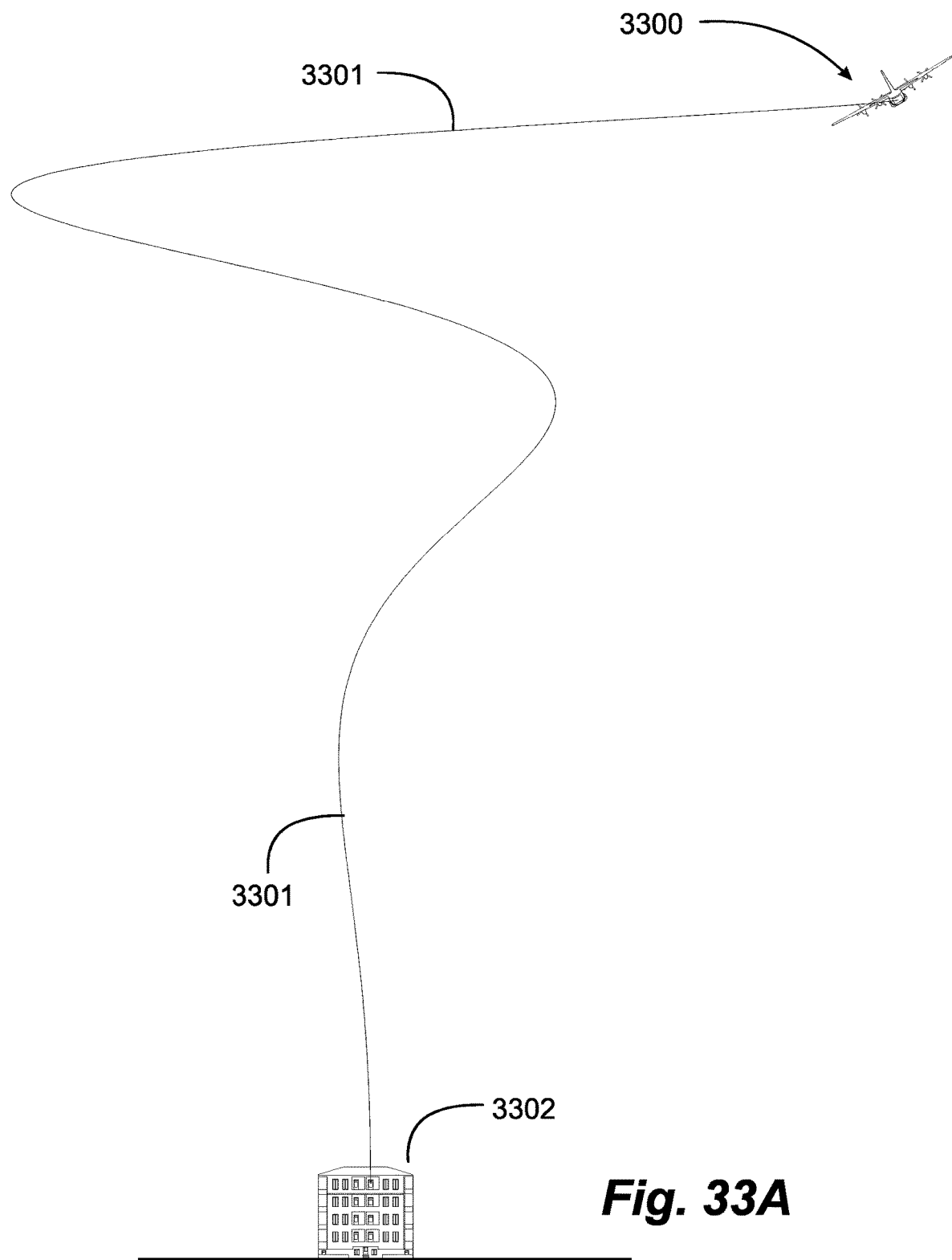
FIG. 33A is an illustration showing a tanker fixed wing aircraft following a circular orbit at an altitude, trailing a fire hose tether.

FIG. 33A is an illustration showing a tanker fixed wing aircraft 3300 following a circular orbit at an altitude, trailing a fire hose tether 3301 having an end effector too small to be seen in any detail. The circumstance of a fixed wing aircraft flying a circular orbit, trailing a tether that assumes a spiral downward path, and suspending an apparatus at a lowermost end at a fixed point at a fixed altitude, is described in some detail above in the section entitled Tethered Sensor for Close-Up Investigation and Viewing, with reference to FIG. 15.

Figure 33B:
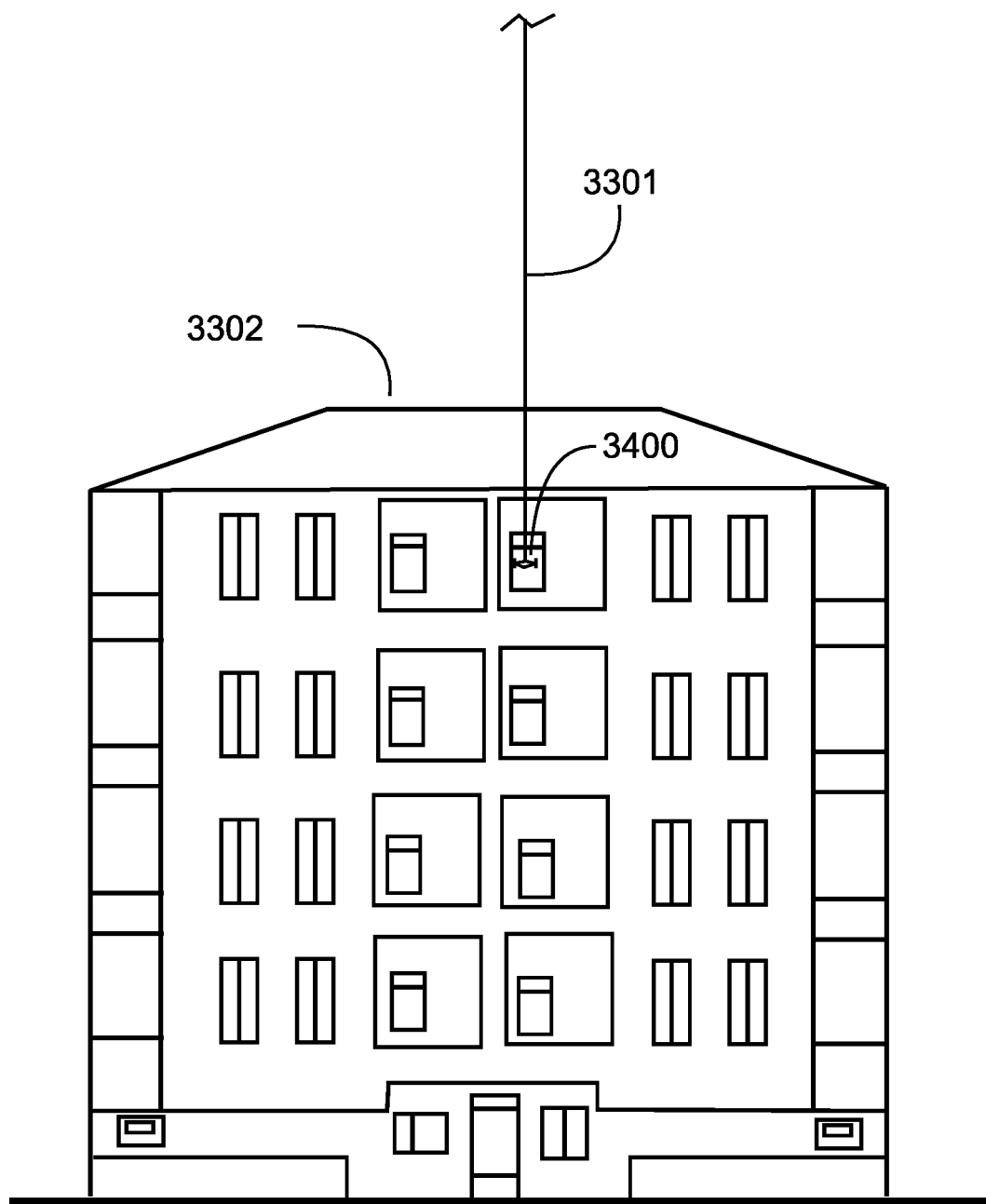
FIG. 33B is an enlarged view of a building from FIG. 33A in an embodiment of the invention.

FIG. 33B shows a close in view of building 3302, wherein the end effector 3400 may enter the building through a window, for example. In this embodiment, recovery of the end effector is more likely being on a tether 3301 in case of damage or malicious actions to render the end effector inoperable.

Figure 34:
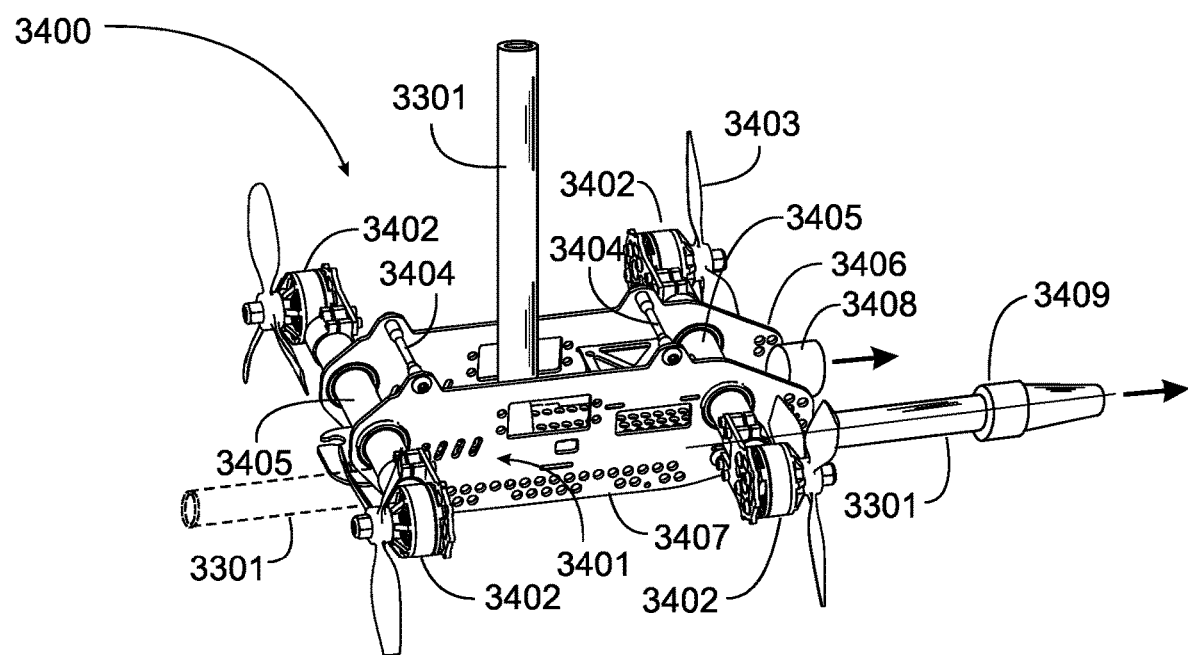
FIG. 34 is an enlarged view of an end effector that may be used at the lowermost end of the fire hose tether in an embodiment of the invention.

FIG. 34 is an enlarged view of an end effector 3400 that may be used at the lowermost end of tether 3301. End effector 3400 has a frame 3401 comprising parallel side plates 3406 and 3407 spaced apart by spacers such as spacers 3404. DC motors 3402 are implemented at the ends of axels or shafts 3405 such that rotating the axels in the horizontal plane directs thrust from propellers 3403. All four thrusters may, for example, be directed straight down to hover the end effector, or straight up for the same purpose, with the propellers reversed. Rotation around a vertical axis may be controlled by varying the thrust of the thrusters individually.

In this example tether 3301 is joined to the end effector with a right-hand elbow (not seen) that directs the end of the tether to a nozzle 3409 in the horizontal. An imaging apparatus 3408 is directed parallel to the axis of nozzle 3409. Computerized control circuitry is enclosed in the framework of the end effector and transmits images to an operator in the aircraft by conductors in or parallel to tether 3301. The same conductors also transmit a command stream to the control circuitry from the operative in the aircraft, to vary thrust and thrust direction among the four thrusters to maneuver the end effector, and to direct a stream of water or retardant from nozzle 3409.

Control circuitry and apparatus may be much the same as that described above with regard to FIG. 13, in the section describing helicopter rescue operations.

In embodiments of the invention an aircraft such as tanker aircraft 3300 may be dispatched to an active fire, in, for example, a building like building 3302. The aircraft may assume an appropriate orbit for the altitude and mass of the end effector and trail the end effector to a close proximity of the building. At that point an operative in the aircraft, having visual through camera 3408, may fly nozzle 3409 via end effector 3400 right up to, for example, a window where the fire may be paramount. The operative may operate valving to release water or other retardant and direct flow into the window.

The inventor is aware of thrust balancing issues that may accrue due to the flow of water or retardant, and there may be computerized sensing that compensates thrust to maintain position for the end effector under such circumstances.

In alternative embodiments of the invention thrusters of more or less power may be utilized as needed by different uses.

In an alternative embodiment tethers comprising fire hose may be deployed on the ground surface or from ladder apparatus at an active fire, with end effectors much like end effector 3400, and water supplied by powerful pumps from tanks of fire trucks, or from fire hydrants. Hoses may be carried and uncoiled by maneuvering an end effector, and water and other retardant may be directed to active points in the fire. In some cases, there need not be imaging apparatus and remote-control apparatus, but in other cases all of the control apparatus and technique described above may be used. End effectors and tethers may be adapted for different requirements. In some embodiments the tether 3301 may pass through end effector 3400 horizontally, as is shown in dotted aspect in FIG. 34.

In yet other embodiments fire fighting apparatus adapted for fighting wildfires may be provided. For example, an embodiment may be provided wherein a firehose from a tanker truck may be deployed with an end effector like that of FIG. 34, and that may be controlled to direct water and retardant into brush fires and the like.

In yet other embodiments the same or closely similar apparatus and procedures may be used for delivering disinfectant solutions and vapor into structures and onto infrastructure, to eradicate viruses and other microbial material.

Catch and Release System for Deploying and Retrieving UAVs

There are many circumstances wherein deploying UAVs from a fixed wing aircraft is very desirable. Re-acquiring UAVs that have been deployed, however, has never been adequately accomplished. A particular example is use of the Gremlin™ UAV as developed by The Defense Advanced Research Projects Agency (DARPA). DARPA is an agency of the United States Department of Defense responsible for the development of emerging technologies for use by the military.

It is known that the conventional launch procedure for a UAV is to drop the UAV from a carrier aircraft. The UAV typically has a small turbojet that requires a substantially higher than normal RPM to operate, on the order of 100 k to 150 k RPM. The UAV, then, has to dive on the order of 2000 ft. or more to develop sufficient wind speed to light the engine. If the engine does not light the Gremlin is lost, at a substantial cost.

It may also be seen that recovery of a UAV in the conventional sense is by a capturing apparatus towed on a cable tether from a recovery aircraft, the capturing apparatus engaging a compatible apparatus extended upward from the UAV.

In an embodiment of the present invention an improved system with substantial advantages is provided wherein launch is from a tether that doubles as a refueling hose, wherein the Gremlin is towed for a sufficient time to ignite the engine before the tether releases. If an engine does not ignite the Gremlin is simply retrieved by the tether.

In one embodiment of the invention the tether, which is also a refueling hose, has a powered end effector at the end of the tether, which has new and unique apparatus and functionality for finding and acquiring the Gremlin. These unique features are described in enabling detail below with reference to formal drawings.

Figure 35:
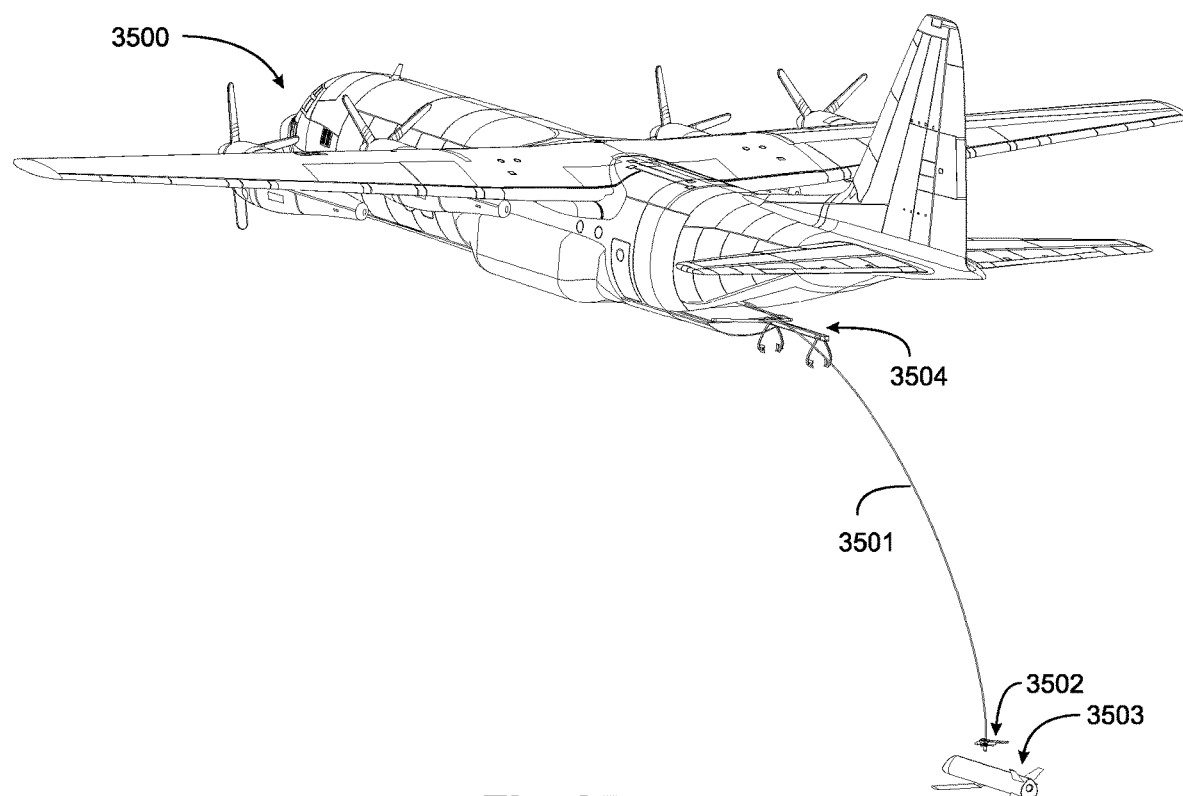
FIG. 35 is an illustration of a fixed wing aircraft trailing a tether hose having an end effector at the end of the tether proximate a UAV in an embodiment of the invention.

FIG. 35 is an illustration of a fixed wing aircraft 3500 trailing a tether hose 3501 having an end effector 3502 at the end of the tether. The end effector is shown just above, but not engaged, to a Gremlin 3503. The Gremlin is altered from standard format to engage with end effector 3502 in a unique way, both for retrieval and for refueling. Details are described in enabling detail below. A retrieval cradle apparatus 3504 is shown extended from a rear cargo bay of aircraft 3500. Apparatus 3504 is purposed for grasping a Gremlin that may be engaged by the end effector and brought to the aircraft, and for bring the retrieved Gremlin into the aircraft.

The system comprising end effector 3502, tether/hose 3501, and apparatus 3504, along with communication and control systems associated, is adapted to deploy a plurality of Gremlins from the mother aircraft, to control and monitor the Gremlins in diverse operations, to refuel Gremlins/UAVs as needed, and to physically engage and retrieve individual ones of the Gremlins for such as maintenance, repair and reloading of ordnance.

Figure 36:
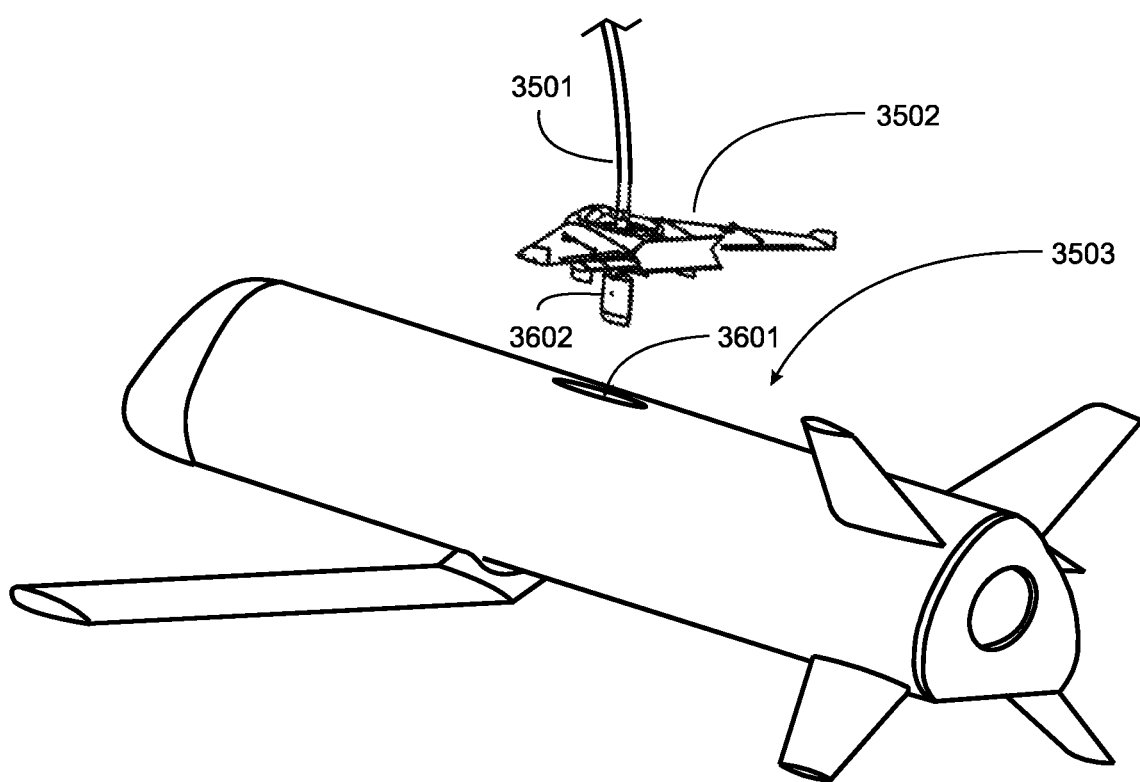
FIG. 36 is a perspective, enlarged view of the end effector and UAV of FIG. 35.

FIG. 36 is a perspective, enlarged view of end effector 3502 and Gremlin 3503 in a circumstance of proximity, such that end effector 3502 may be about to connect to Gremlin 3503, or alternatively, may have just disconnected after, perhaps, a refueling event. It may be seen in FIG. 36 that end effector 3502 has a downward extending blade 3602 that is adapted to engage a port 3601 in a top portion of Gremlin 3503, the port shaped in the fashion of the blade.

Figure 37:
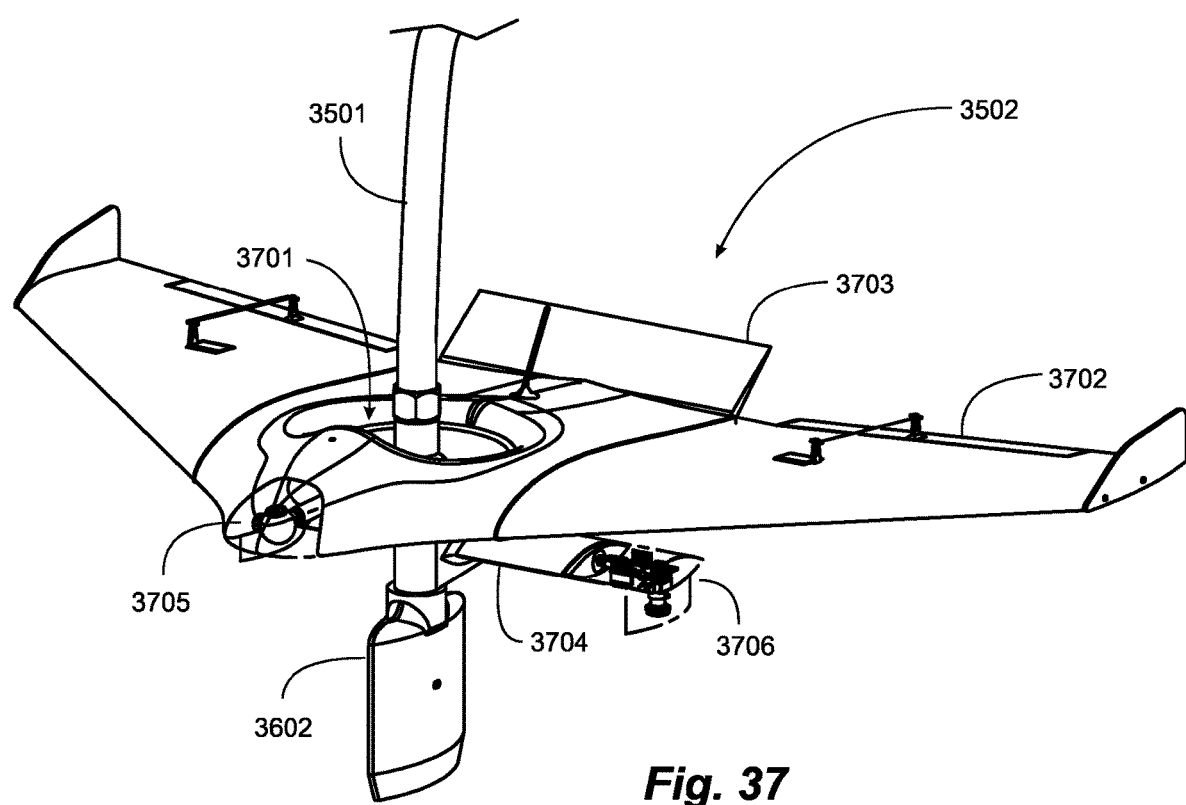
FIG. 37 is a perspective view of the end effector of FIG. 36 providing additional detail.

FIG. 37 is a perspective view of end effector 3502 providing additional detail. An especially important feature is a multi-axis gimbal mechanism 3701 by which hose/tether 3501 is joined to the end effector. It may be seen that blade 3602, rigidly joined to hose 3501, has a small wing portion 3704, only one side of which may be seen in FIG. 37. This wing aids in stabilizing blade 3602 to a vertical aspect, to point straight down, even though the end effector may well move angularly about multi-axis gimbal mechanism 3701. It is important that the blade remain vertical to facilitate mating with portal 3601 in the UAV.

In this example end effector 3502 has ailerons 3702, a rudder and speed brakes 3703 to provide maneuverability to translate and position hose/tether 3501. There is control circuitry within the end effector for remotely manipulating the elements responsible for flying the end effector, and for wireless communication with the mother aircraft. Additionally, there are image devices on the opposite ends of wing 3704, as well as another imaging device 3705 in the nose of the end effector, the nose-mounted imaging device gimballed to be able to look both up and down.

In some applications end effector 3502 is a glider, without thrusters, and maneuvers the end of hose/tether 3501 by operating the has ailerons, rudder and speed brakes, to turn the end effector and speed it up and slow it down. In some alternative embodiments there may be thrusters, as described in other sections of this specification, with reference to other figures. The end effector is in two-way wireless communication with the mother aircraft enabling operatives in the aircraft to maneuver the end effector through commands to move the airflow elements, as well as to vary the thrust of thrusters on those end effectors that employ thrusters.

Referring now back to FIGS. 3-8 of this specification, and description of apparatus and functions with reference to these previous figures, blade 3602, in this example depended from the end effector, is constructed much like blade 303 in FIG. 3B. In the descriptions above related to FIGS. 3-8 the blade extends upward from a wing of an aircraft to be refueled. In this example, however the blade is made a part of the end effector.

Referring now to FIGS. 7 and 8, a roller mechanism is illustrated and described as a part of miniature flyer 103 which is now called an end effector. The roller mechanism of flyer 103 engages blade 303 and draws the blade to the flyer as seen in FIG. 8. In the system now described with the UAV/Gremlin and end effector 3502 the blade is made a part of the end effector, and the roller mechanism is adapted inside the Gremlin beneath port 3601. In engagement the end effector is piloted to the UAV, homes on port 3601, engages, and the roller mechanism operates to draw the blade into the port until a refueling nozzle on an end of the blade (see FIG. 3B) is engaged to a refueling port of the UAV Engagement sensed and assured, and refueling may commence.

In operation there may be a substantial number of UAVs/Gremlins originally loaded to the mother aircraft, in some cases twenty or more. This plurality may be referred to as a swarm. At start of a mission operating personnel load the Gremlins with fuel and whatever other items are needed for a mission, such as ordnance for delivery on targets. Each UAV/Gremlin is launched in flight by being connected to an end effector 3502 attached to a hose/tether 3501, and the hose/tether is deployed from the cargo bay to a predetermined altitude. The Gremlin being launched is retained on the tether for a period of time to run up the turbine engine to operating RPM, as described above, at which point the engine is ignited and the Gremlin is released from blade 3602 of the end effector. The launched Gremlin is then tasked by control systems communicating between the Gremlin and the aircraft. As many Gremlins as a mission requires may be sequentially launched.

At need, UAVs may be recalled to a refueling position, and the end effector may be piloted to approach the UAV. AprilTags on the wings of the Gremlin may be read by imaging devices 3706 with images transmitted to operatives in the aircraft, to facilitate docking. This procedure is described in enabling detail above in the sections for refueling aircraft, and also for refueling satellites. When securely docked the UAV may be refueled, then released to continue on a preplanned mission.

A Gremlin in need of repair, ordnance reloading, or at the end of a mission may, instead of being refueled, by simply drawn upward by tether 3501 to be accessed by apparatus 3504, with turbine shut off and perhaps wings folded, and drawn into the aircraft through the cargo bay. Imaging device 3705 may be rotated to view upward to provide imaging to aid operators in retrieval of Gremlins.

Anchored Tether for Delivery and Retrieval of Personnel and Cargo

In yet another embodiment of the present invention apparatus and a method for securely and efficiently delivering personnel and cargo to a known fixed point on the ground surface from a fixed wing aircraft in orbit at altitude is provided, and personnel and cargo may similarly be retrieved from the ground surface to the fixed wing aircraft.

The system and method to lower an apparatus on a tether from an orbiting aircraft at a first altitude, bringing the apparatus to a fixed point at a second, much lower altitude has been described above for more than one embodiment of the invention, for example the section titled "High Bandwidth Data Transfer", referring to FIG. 27 and description of FIG. 27. Similar description is a part of the section above titled "Tethered Sensor for Close-Up Investigation and Viewing", referring to FIG. 15 and description of FIG. 15. There is considerable description and illustration above as well for powered and maneuverable end effectors in several embodiments of the invention, the end effectors controllable by operatives in a host aircraft, either a helicopter or a fixed wing aircraft.

Figure 38:
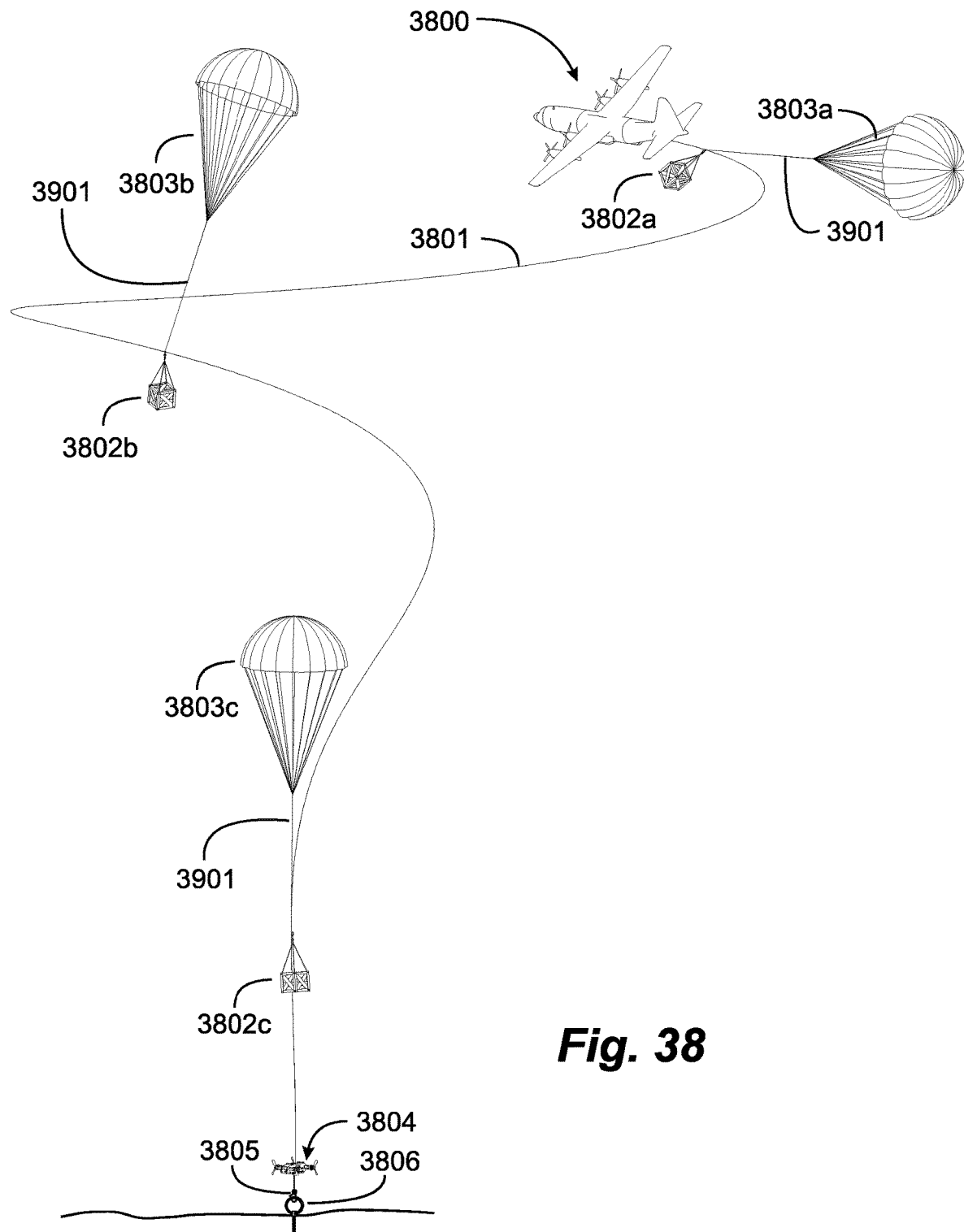
FIG. 38 is an illustration of a system for delivery of cargo on an anchored tether in an embodiment of the invention.

FIG. 38 is a representation of a system wherein a fixed wing aircraft 3800 orbiting at a first altitude extends a tether 3801 with a powered and controllable end effector 3804 to a relatively stable position at a second altitude near ground surface. A stable ring or other connector 3806 has been anchored securely to ground prior to the tether and end effector being deployed. In one circumstance anchor 3806 is placed and secured by personnel on the ground.

The aircraft deploys the tether with end effector to a position in some proximity to the anchor, and the end effector is then maneuvered to engage a hook 3805 to the anchor. The end effector may be the same or similar to end effector 1006 illustrated in FIG. 12 and described above with reference to FIG. 12.

Once the tether is anchored by the hook, delivery of personnel or cargo may commence. In this example tree instances of cargo 3802*a*, 3802*b* and 3802*c* are represented at different stages of delivery. Cargo 3802*c* is connected to a parachute 3803*c* that slows the rate of descent enough to avoid damage at the end of delivery. A cargo 3802*b* is in an earlier stage of delivery and is connected to a parachute 3803*b*. Cargo 3802*a* has just been ejected from the cargo door of the aircraft, and parachute 3803*a* acts as a drag chute to aid in bring cargo 3802*a* out of the aircraft.

As cargo containers reach ground surface, operative personnel on the ground may disconnect the cargo and parachutes from the tether and await the next. These personnel are in communication with operatives in the aircraft. When delivery is complete, a ground operative may disconnect the tether from the anchor, and the tether may be retrieved to the aircraft.

Although only cargo is illustrated it should be understood that there may be protective harness for personnel, as well, and personnel may be delivered from the aircraft in the same manner.

This method of cargo and personnel delivery is effective for circumstances where there is rugged terrain and no local landing facility for a fixed wing aircraft.

Figure 39:
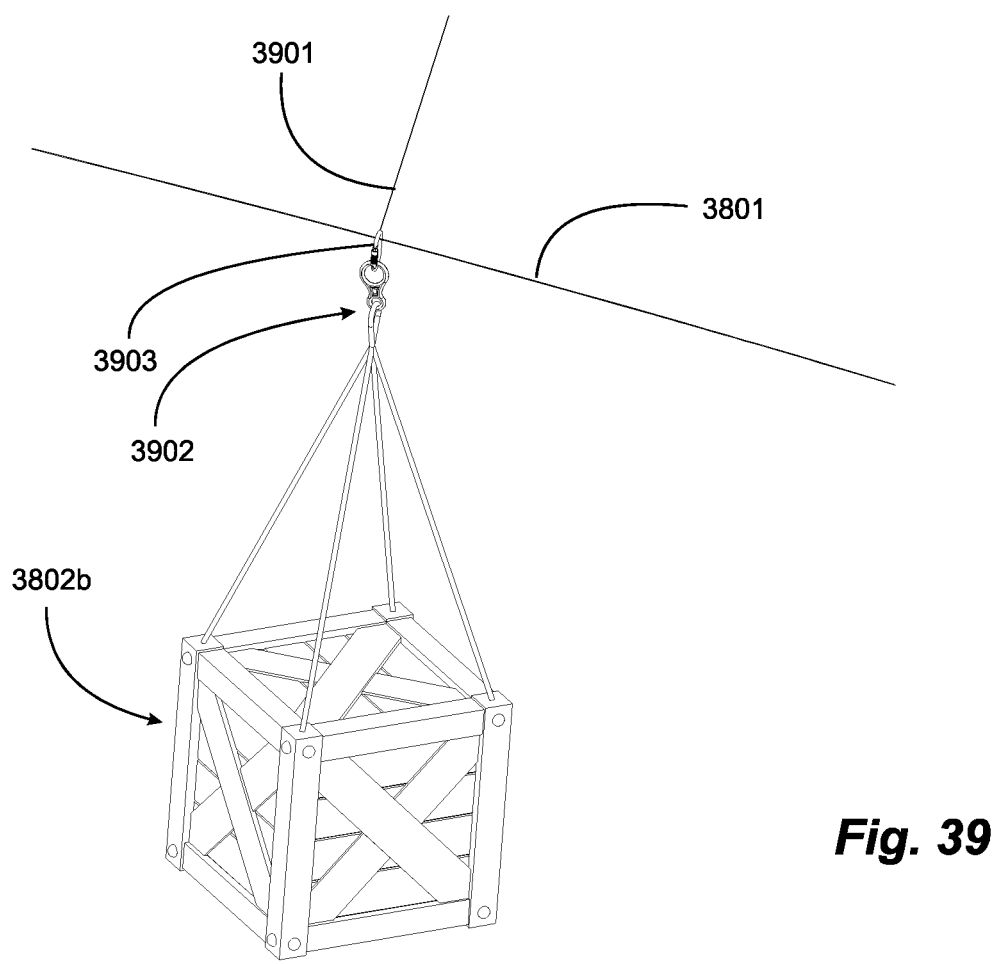
FIG. 39 is an enlarged view of a cargo being delivered by the system of FIG. 38.

FIG. 39 is a magnified view of cargo 3802*b* in process of being lowered along tether 3801 in FIG. 38 by parachute 3802*b* connected to cargo 3802*b* by line 3901. The cargo container is suspended by a harness 3902 from a ring 3903 that slides along tether 3901.

Figure 40:
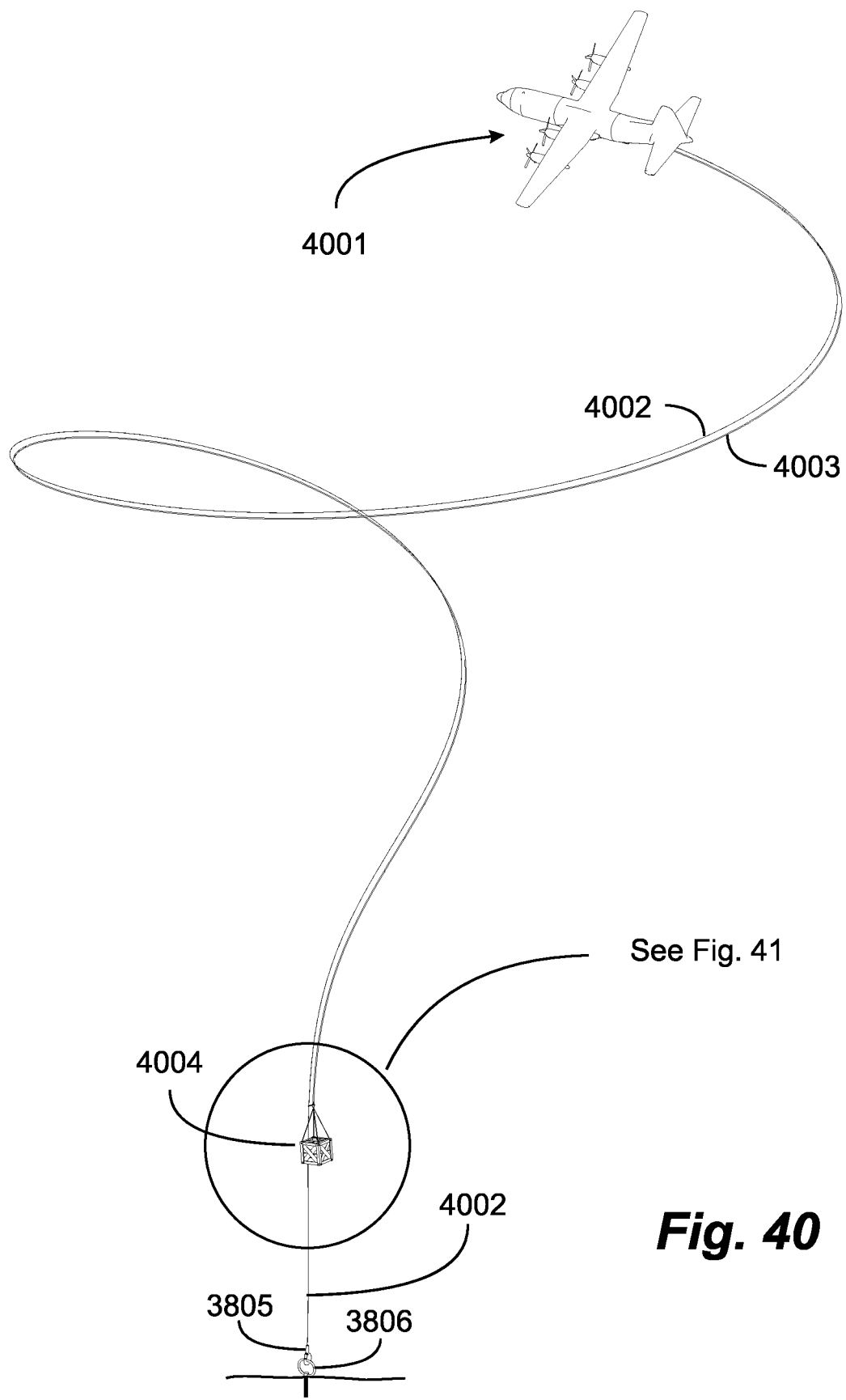
FIG. 40 is an illustration of a system useful for both delivery and retrieval of cargo between an aircraft and ground in an embodiment of the invention.

In an alternative embodiment of the invention a system with an anchored tether is provided in a way that cargo and personnel may be delivered and uploaded as well from the ground to the orbiting aircraft. FIG. 40 illustrates such a system in which an orbiting aircraft 4001 has a tether 4002 anchored to ground just as in the system illustrated in FIG. 38, which may be implemented just as described above with reference to FIGS. 38 and 39. The end effector in this case is not illustrated.

Figure 41:
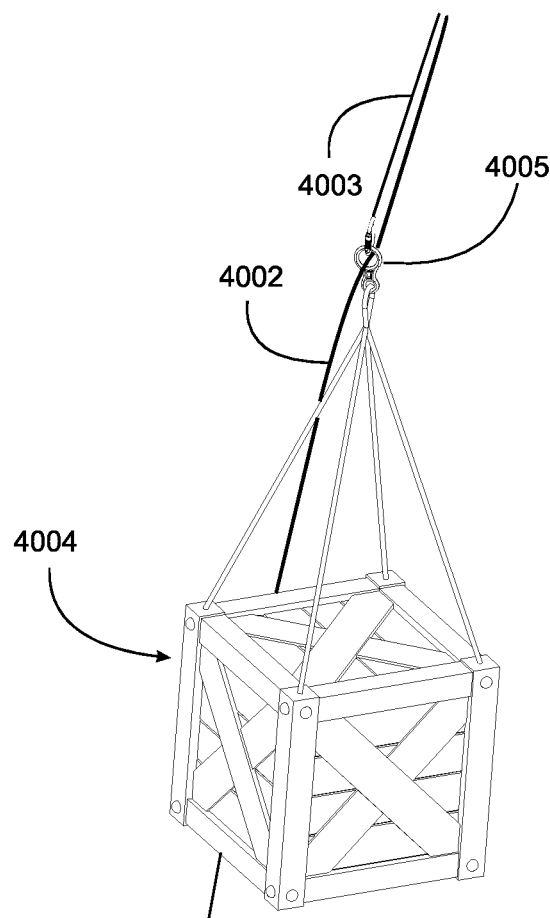
FIG. 41 is an enlarged view of a cargo in delivery or retrieval by the system of FIG. 40.

In this embodiment aircraft 4001 has a second winch and a second tether 4003 which is used to slow the descent of cargo and personnel to the ground, rather than parachutes. FIG. 41 is an enlarged view of cargo 4004 and the two tethers. The second tether 4003 connects to a ring 4005 from which the cargo is suspended, and the anchored tether 4002 passes through this ring.

In operation, once tether 4002 is anchored, operatives in the aircraft may deploy cargo 4004 by tether 4003 and reel out the tether until the cargo touches down. In this embodiment once tether 4003 is at ground, operatives on the ground may connect a person in a carrier harness, or a cargo to be raised to the aircraft, and operatives in the aircraft may then reel in tether 4003 and bring the person or the cargo from the ground to the aircraft.

It will be apparent to the skilled person that the implementations illustrated and described in this application are exemplary only, and not limiting to the scope of the invention. There are many variations that may be made in the examples described, all within the scope of the invention. For example, tanker aircraft may take many and varied forms, and fuel hoses may be extended and retracted in a variety of ways. Flyers may also be employed in various sizes and configurations, and not all will have the same maneuvering apparatus. Control circuitry and apparatus will vary, as well, and may be computerized in a variety of ways. There are many other alterations that might be made within the scope of the invention, and the invention may be practiced incorporating any or all of the examples described, singly or in combination. The invention is limited only by the scope of the claims that follow.

What is claimed is:

1. A stabilizing system for a winch cable, comprising:
a winch cable deployed and suspended from a helicopter;
a cargo support attached at a deployed end of the winch cable;
an end effector attached to the winch cable, the end effector comprising a single housing having a top, bottom, multiple sides, a uniform depth and a width, the housing attached to the winch cable at a midpoint of the housing with the winch cable extending through the midpoint into the housing, wherein the multiple sides are of an equal distance from the midpoint, the housing including two or more thrusters within the housing, each of the thrusters positioned opposite one another across the midpoint thereby providing thrust orthogonal to the midpoint and orthogonal to a vertical axis of the winch cable;
first control circuitry in the helicopter; and
second control circuitry in the end effector;
wherein thrust of individual thrusters is controlled through the first and second control circuitry maintaining the axis of the winch cable vertical, damping swinging of the cable.

2. The stabilizing system of claim 1 wherein the end effector is attached above the cargo support.

3. The stabilizing system of claim 1 wherein the end effector is attached below the cargo support.

4. The system of claim 1 wherein thrusters comprise fans in directed ducts through the sides, the fans driven by electric motors.

5. The system of claim 4 comprising a rechargeable battery in the end effector powering the electric motors.

6. The system of claim 4 further comprising controllable louvres over faces of the directed ducts, the louvres rotatable about vertical axes to deflect air to a side, providing a torque around the axis of the winch cable, wherein the attitude of the louvres is controlled to dampen rotation of the cargo support around the axis of the winch cable.

7. The system of claim 4 further comprising anti-rotational thrusters and sensors in the second control circuitry in the end effector to sense rotational attitude and rotation, data from the sensors used to control thrust of the anti-rotational thrusters to dampen rotation of the cargo support around the axis of the winch cable.

8. The system of claim 1 further comprising power and control conductors joining the control circuitry in the helicopter with second control circuitry in the end effector, whereby the electric motors of the fans are powered through the power conductors from a power source in the helicopter, and the second control circuitry enables the first control circuitry to vary the rotational velocity of each electric motor.

9. The system of claim 1 further comprising first wireless communication circuitry in the helicopter and second wireless communication circuitry in the end effector, wherein control signals are transmitted from the first control circuitry in the helicopter to the second control circuitry in the end effector wirelessly.

10. The system of claim 1 further comprising an imaging device on an upper region of the end effector, focused on a specific point on the helicopter above the end effector, the imaging device sensing movement of the end effector horizontally relative to the fixed point on the helicopter, and providing the deviation information to the first control circuitry in the helicopter, which uses the deviation information in controlling the individual thrusters in a manner to minimize horizontal movement of the end effector relative to the helicopter.

11. A winch cable stabilizing method, comprising:
deploying and suspending a winch cable from a helicopter with a cargo support attached at a deployed end of the winch cable, and an end effector also attached to the winch cable, the end effector comprising a single housing having a top, bottom, multiple sides, a uniform depth and a width, the housing attached to the winch cable at a midpoint of the housing with the winch cable extending through the midpoint into the housing, wherein all of the multiple sides are of an equal distance from the midpoint, the housing including two or more thrusters directed in a plurality of directions orthogonal to the midpoint and a vertical axis of the winch cable; and
controlling thrust of individual thrusters of the end effector through first control circuitry in the helicopter and second control circuitry in the end effector, maintaining the axis of the winch cable vertical, damping swinging of the cable.

12. The stabilizing method of claim 11 comprising attaching the end effector to the winch cable below the cargo support.

13. The stabilizing method of claim 11 comprising attaching the end effector to the winch cable above the cargo support.

14. The stabilizing method of claim 11 wherein thrusters comprise fans mounted in directed ducts, one each in one of the multiple sides, the fans driven by electric motors, comprising controlling thrust by controlling the rotational velocity of the electric motors.

15. The stabilizing method of claim 14 comprising a rechargeable battery in the end effector, comprising powering the electric motors from the rechargeable battery.

16. The stabilizing method of claim 14 further comprising controllable louvres over faces of the directed ducts, the louvres rotatable about vertical axes to deflect air to a side, providing a torque around the axis of the winch cable, comprising dampening rotation by controlling the attitude of the louvres, dampening rotation of the cargo support around the axis of the winch cable.

17. The stabilizing method of claim 14 further comprising anti-rotational thrusters and sensors in the second control circuitry in the end effector sensing rotational attitude and rotation, comprising using data from the sensors to control thrust of the anti-rotational thrusters to dampen rotation of the cargo support around the axis of the winch cable.

18. The stabilizing method of claim 11 further comprising power and control conductors joining the control circuitry in the helicopter with second control circuitry in the end effector, whereby the electric motors of the fans are powered through the power conductors from a power source in the helicopter, comprising powering the electric motors and controlling the velocity of the electric motors via the control conductors.

19. The stabilizing method of claim 11 further comprising first wireless communication circuitry in the helicopter and second wireless communication circuitry in the end effector, comprising controlling the electric motors with signals transmitted from the helicopter to the end effector wirelessly.

20. The stabilizing method of claim 11 further comprising an imaging device on an upper region of the end effector, focused on a specific point on the helicopter above the end effector, the imaging device sensing movement of the end effector horizontally relative to the fixed point on the helicopter, and providing the deviation information to the first control circuitry in the helicopter, comprising controlling the individual thrusters according to the deviation information in a manner to minimize horizontal movement of the end effector relative to the helicopter.

\* \* \* \* \*